Sept. 27, 1966 A. L. BROWN ETAL 3,275,327

RECORD PLAYER

Filed July 14, 1961 21 Sheets-Sheet 1

Arlie L. Brown,
Norbert F. Cook,
Harry E. Hackney,
Edward J. Hulsey,
Carl H. Mueller,
Jerome B. Wegmann,
Wilfred C. Swanker,
Inventors.

Koenig, Pope, Sanniger and Powers,
attorneys.

Sept. 27, 1966 A. L. BROWN ETAL 3,275,327

RECORD PLAYER

Filed July 14, 1961 21 Sheets-Sheet 2

Sept. 27, 1966 A. L. BROWN ETAL 3,275,327

RECORD PLAYER

Filed July 14, 1961 21 Sheets-Sheet 3

Sept. 27, 1966 A. L. BROWN ETAL 3,275,327

RECORD PLAYER

Filed July 14, 1961 21 Sheets-Sheet 5

Sept. 27, 1966 A. L. BROWN ETAL 3,275,327

RECORD PLAYER

Filed July 14, 1961 21 Sheets-Sheet 7

Sept. 27, 1966 A. L. BROWN ETAL 3,275,327

RECORD PLAYER

Filed July 14, 1961 21 Sheets-Sheet 11

Sept. 27, 1966 A. L. BROWN ETAL 3,275,327

RECORD PLAYER

Filed July 14, 1961 21 Sheets-Sheet 13

Sept. 27, 1966 A. L. BROWN ETAL 3,275,327

RECORD PLAYER

Filed July 14, 1961 21 Sheets-Sheet 16

Sept. 27, 1966 A. L. BROWN ETAL 3,275,327

RECORD PLAYER

Filed July 14, 1961 21 Sheets-Sheet 18

Sept. 27, 1966 A. L. BROWN ET AL 3,275,327

RECORD PLAYER

Filed July 14, 1961 21 Sheets-Sheet 21

United States Patent Office 3,275,327

Patented Sept. 27, 1966

3,275,327
RECORD PLAYER

Arlie L. Brown, Cleveland, Ohio, Norbert F. Cook, Berkeley, Mo., Harry E. Hackney, Cleveland, Ohio, Edward J. Hulsey, Jennings, Carl H. Mueller, Pasadena Hills, and Jerome B. Wegmann, Florissant, Mo., and Wilfred C. Swanker, Bay Village, Ohio, assignors to McNeil Corporation, Akron, Ohio, a corporation of Ohio Filed July 14, 1961, Ser. No. 124,159
50 Claims. (Cl. 274—10)

This invention relates to record players, and more particular to record players of the so-called "double side" or "turnover" type.

This invention is an improvement upon the record player disclosed in the co-assigned United States patent of Victor G. Klein, Rudy F. Schneller and Carl H. Mueller No. 2,735,683, patented February 21, 1956.

In the record player disclosed in said patent, there is provided an invertible vacuum-grip turntable and a record transfer arm having a vacuum-grip record lifter adapted to pick up a record from a supply stack and place it on the turntable when the latter is upright. After the first side of the record on the turntable is played, the turntable is inverted. The second side may then be played after which vacuum grip of the turntable on the record is released to allow the record to drop. Or the record may be dropped without playing the second side. Then the turntable is turned back to upright position and the record transfer arm picks up another record and places it on the turntable. The sequence of operation and the timing of the various steps in the sequence is determined by a series of rotary cams. In the manufacture of this record player, careful adjustments must be made to insure proper sequential operation, i.e., to insure completion of each successive step in the operation before initiation of the succeeding step, and it is necessary to provide intervals between successive steps which increases the total time required for a change cycle.

Among the several objects of this invention may be noted the provision of an improved record player of the class described in which the invertible turntable is carried by the transfer arm and serves as a record lifter as well as a turntable, thus eliminating the necessity for a separate record lifter; the provision of a record player such as described having an improved sequence-control arrangement which is such that each successive step in the sequence of operations is triggered in response to completion of the preceding step, thereby eliminating any necessity for careful adjustment and for provision of intervals between successive steps; the provision of a record player such as described which is adapted not only to play both sides of each of a series of records or the first side only of each record, but also to repeat the playing of the first and then the second side of a record, or to repeat the first side only, or to repeat the second side only, as desired; the provision of a record player such as described which is adapted automatically to play different speed records, enabling records of different speeds to be indiscriminately intermixed in the supply stack; the provision of a record player such as described in which the turntable is stopped for application to a record carried by the turntable of the needle on the tone arm of the record player; and the provision of a record player such as described which is reliable in operation and economical to manufacture considering its performance. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 (Sheet 1) is a perspective of a record player of this invention, illustrating parts in a so-called transition position;

Figure 4:
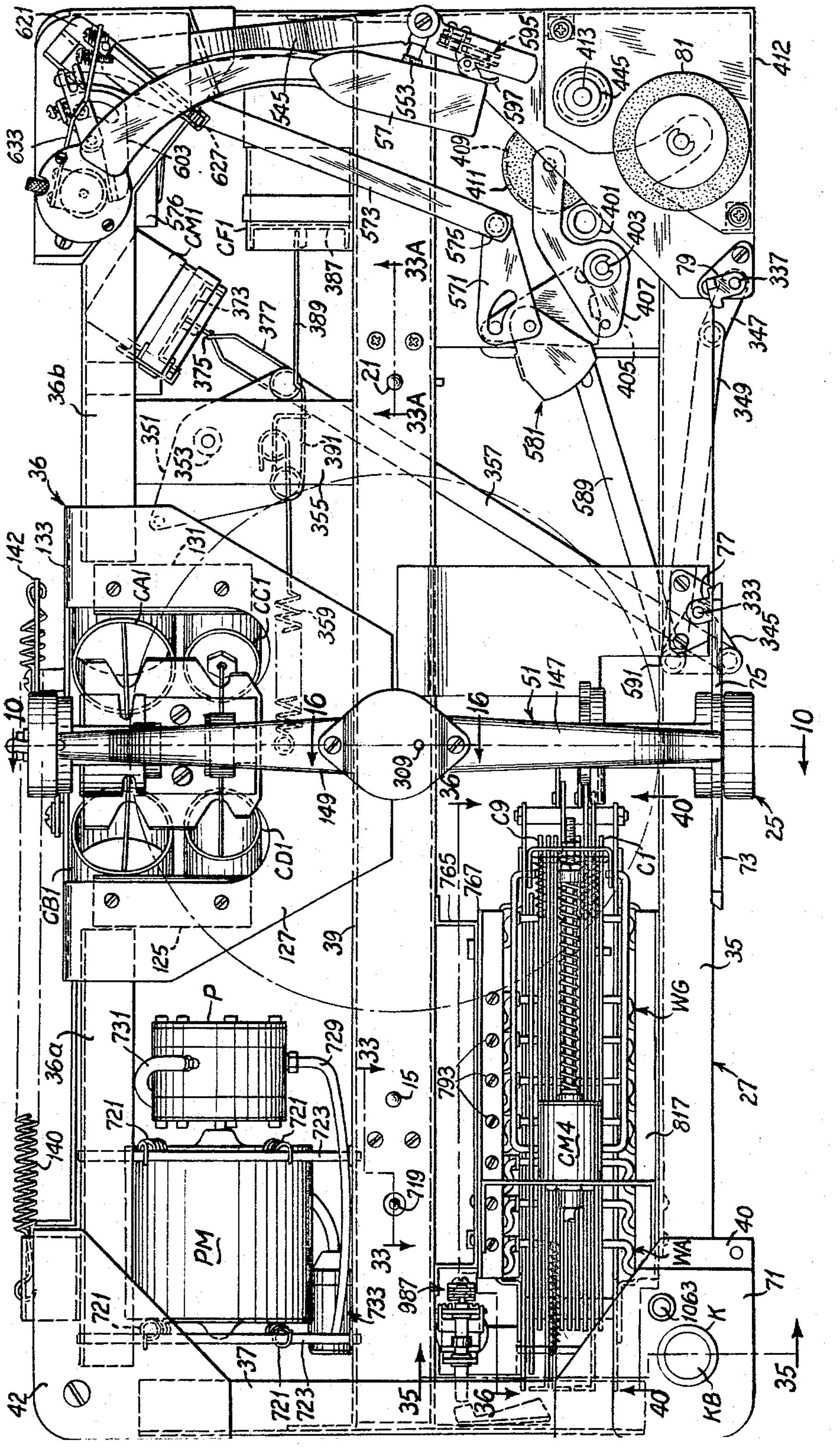
FIG. 4 (Sheet 4) is a plan view of the record player with a housing thereof removed to show interior detail.
Figure 5:
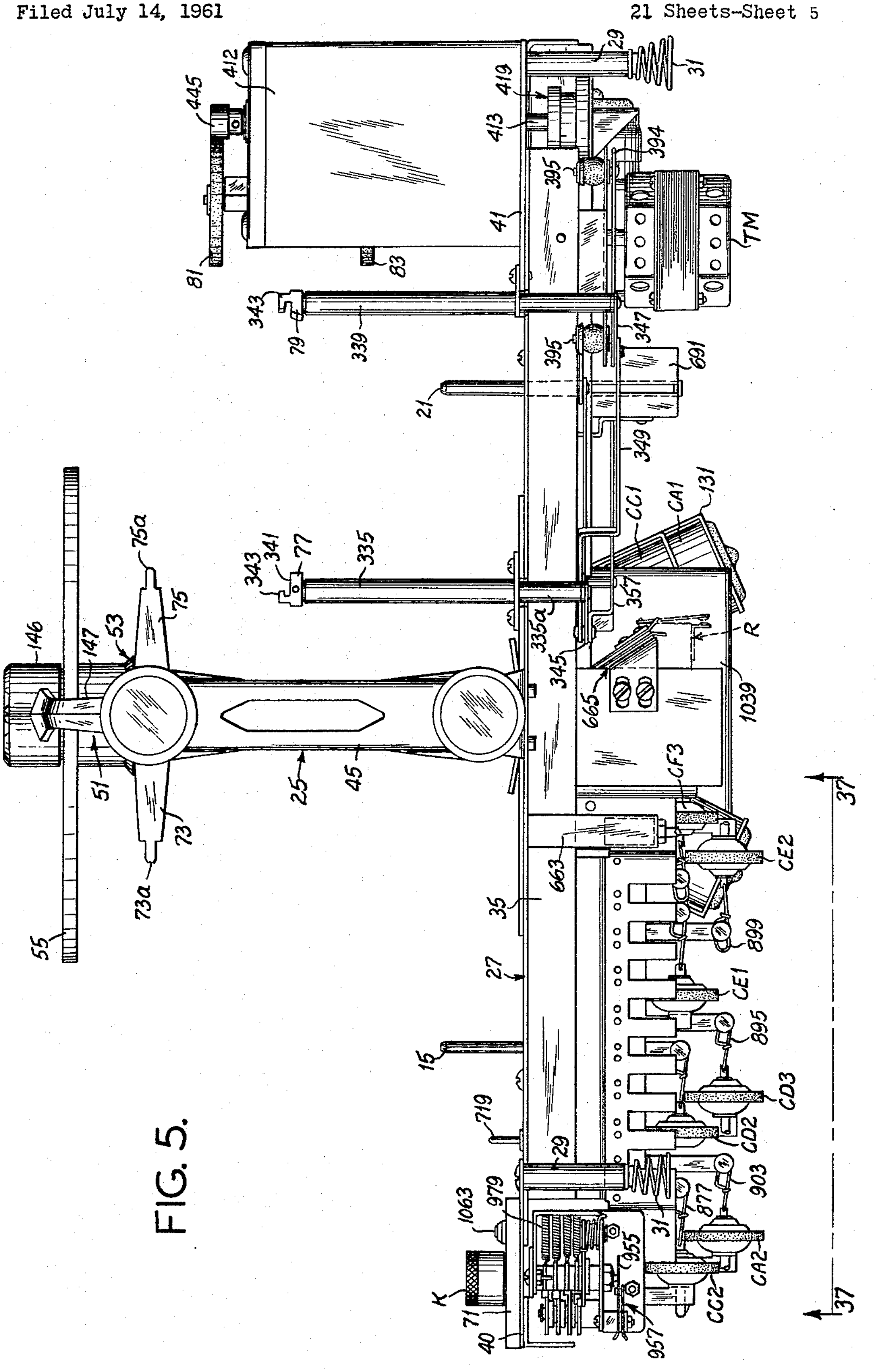
FIG. 5 (Sheet 5) is a front elevation of FIG. 4.
Figures 6, 47:
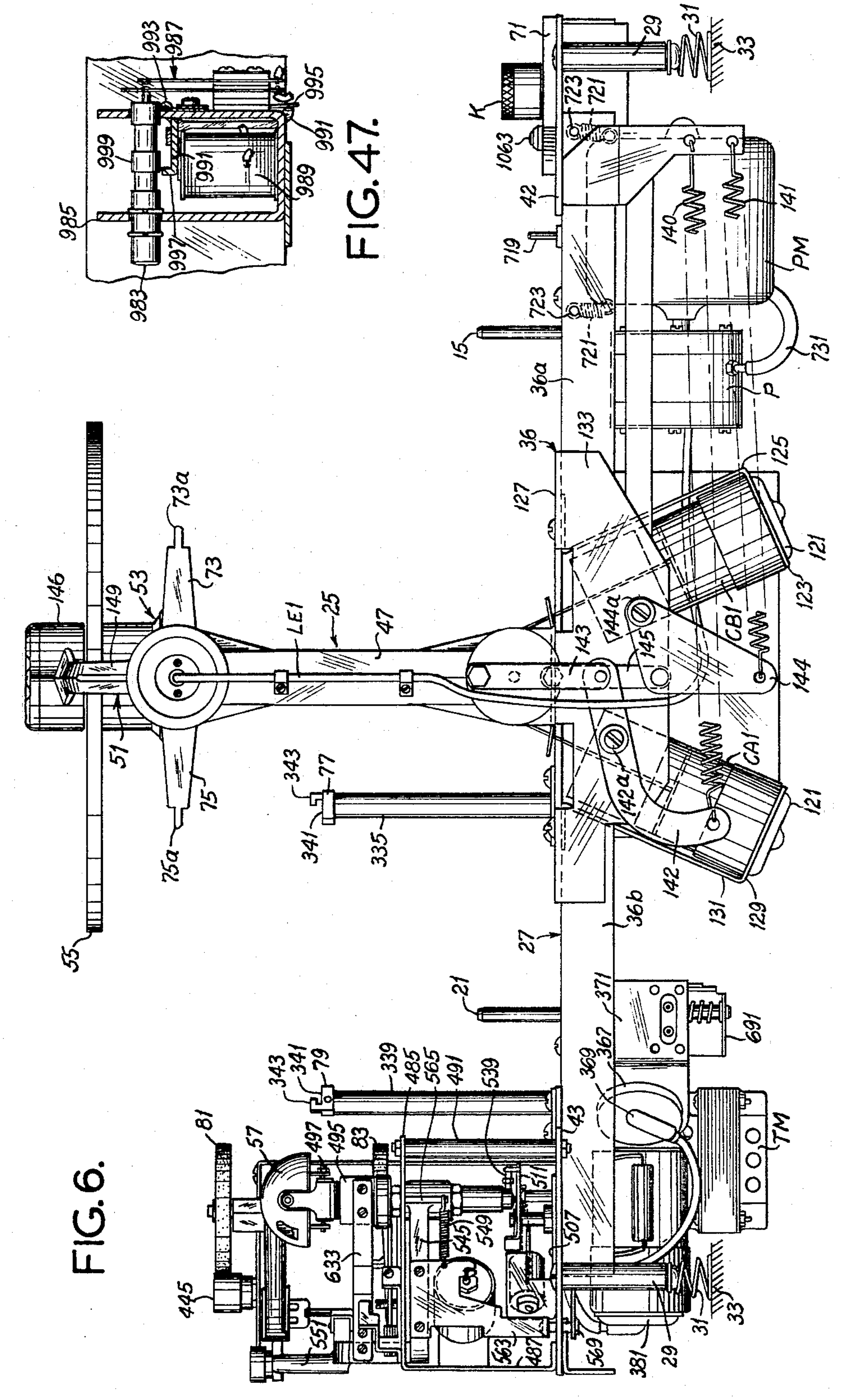
FIG. 6 (Sheet 6) is a rear elevation of FIG. 4.
Figure 33A:
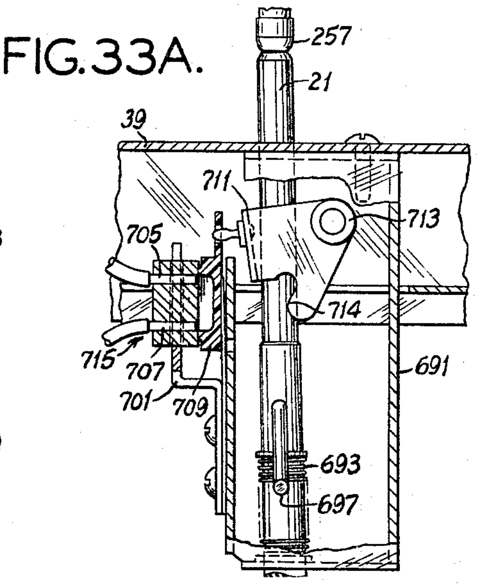
Figure 9:
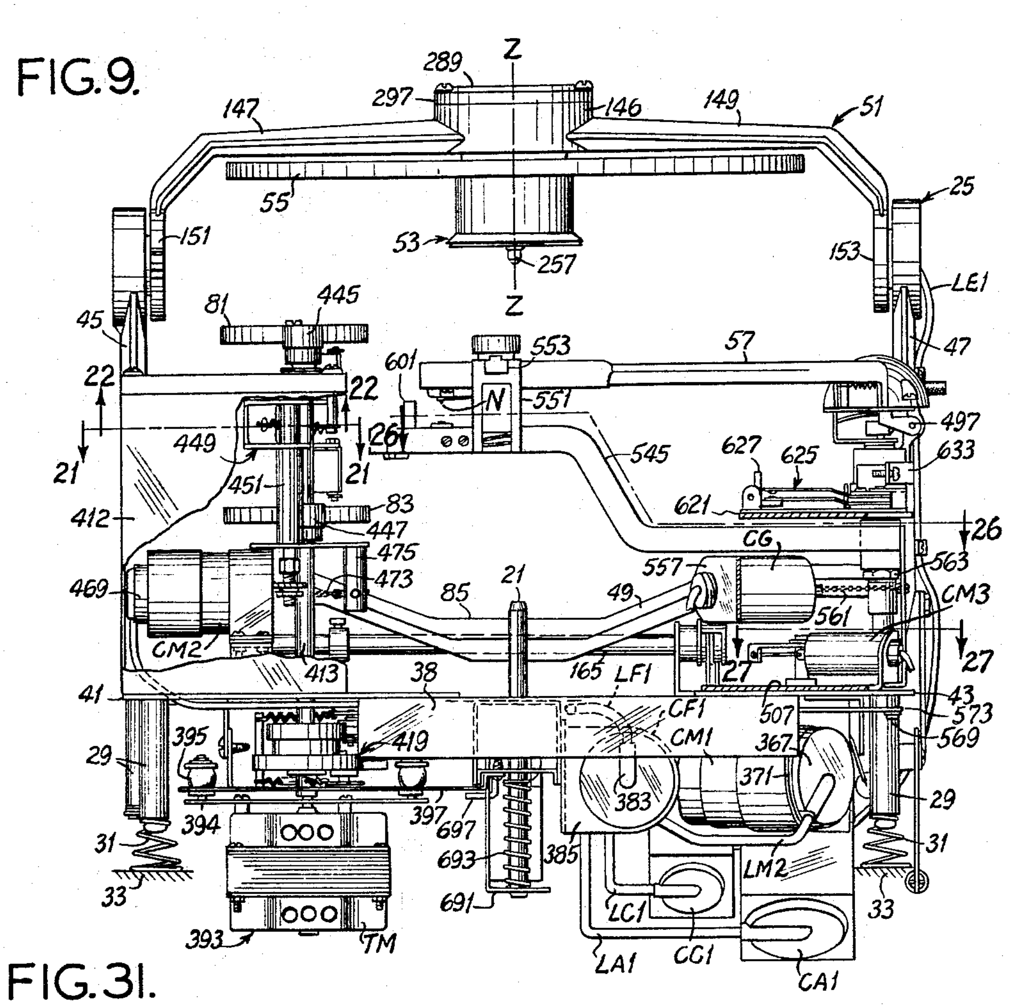
FIG. 9 (Sheet 8) is a right end elevation of FIG. 4.
Figures 31, 32:
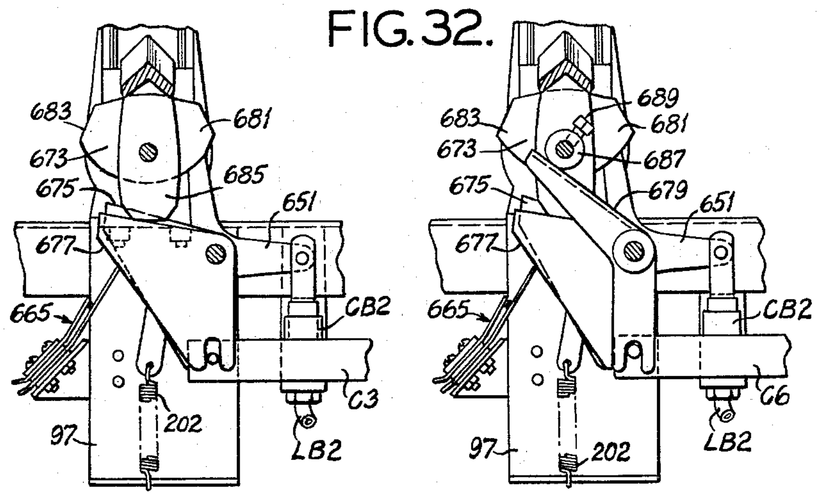
Figures 10, 11, 12, 13:
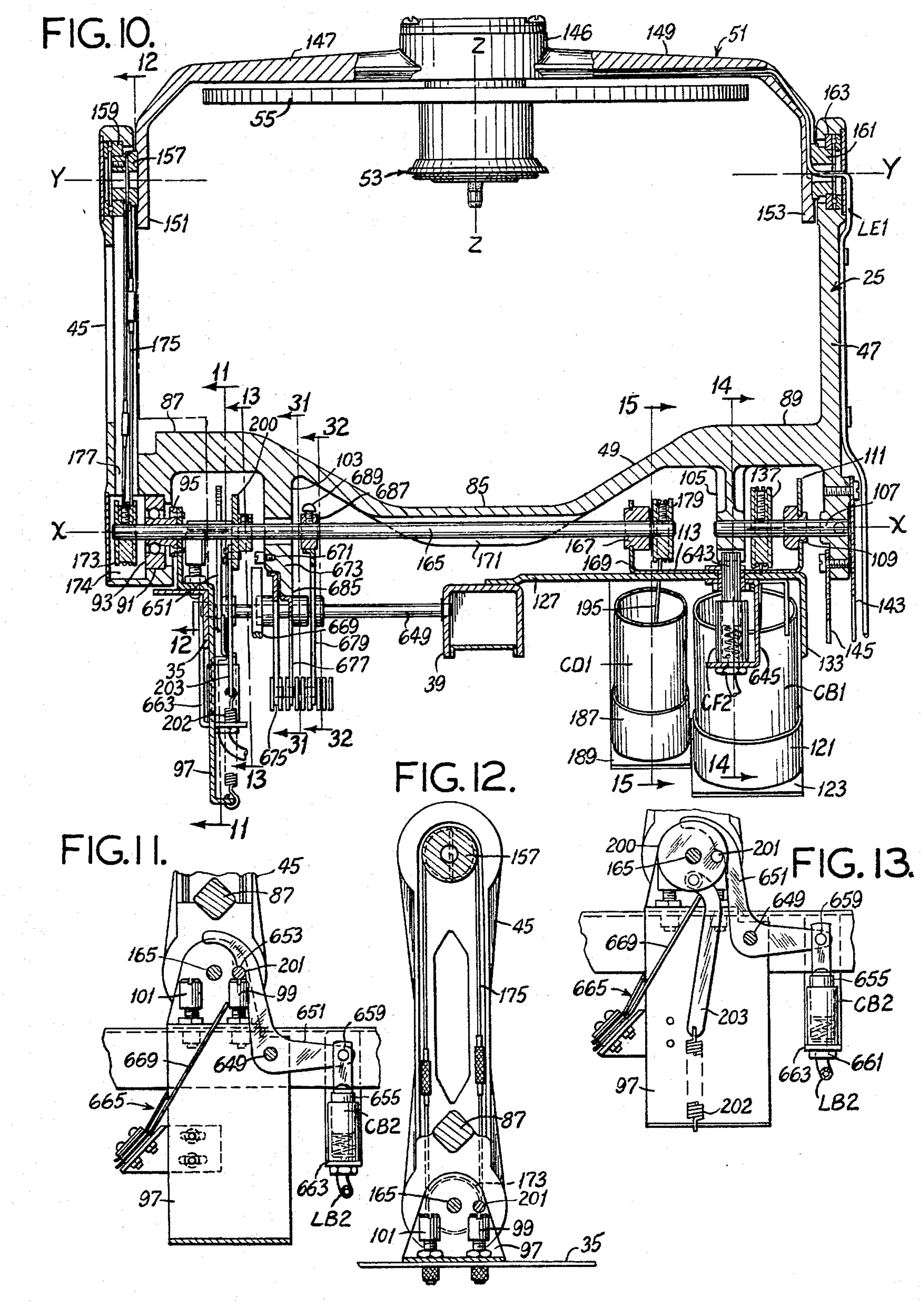
FIG. 10 (Sheet 9) is an enlarged vertical section taken one line 10—10 of FIG. 4.
Figure 14:
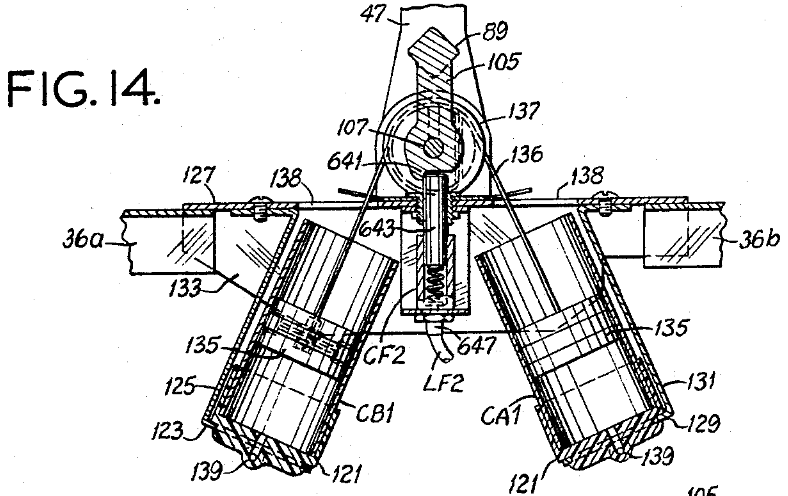
Figures 15, 18, 48:
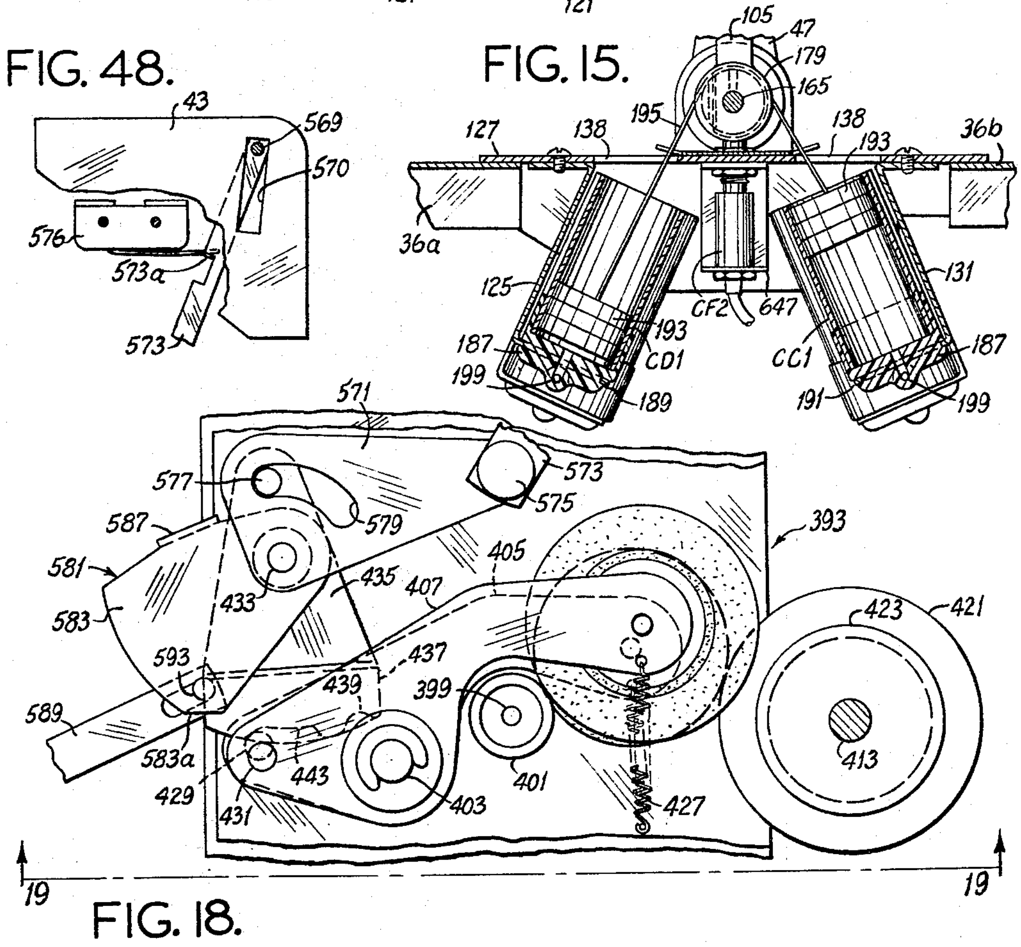
Figure 17:
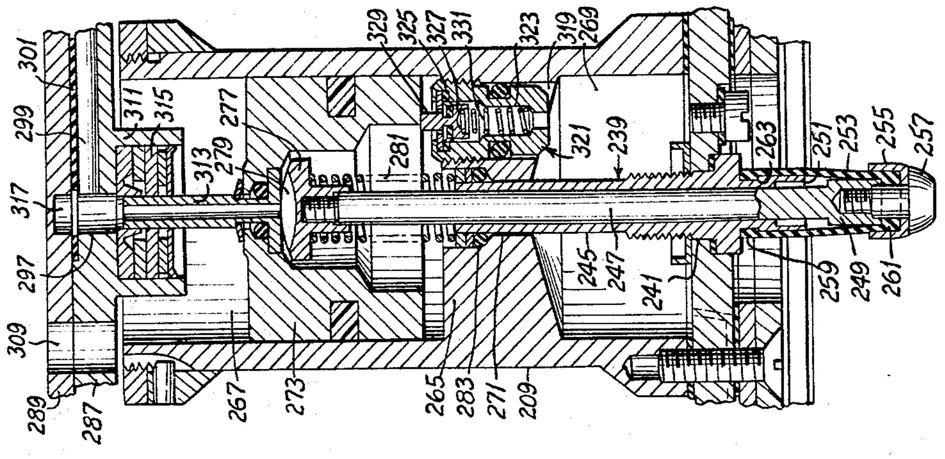
Figure 16:
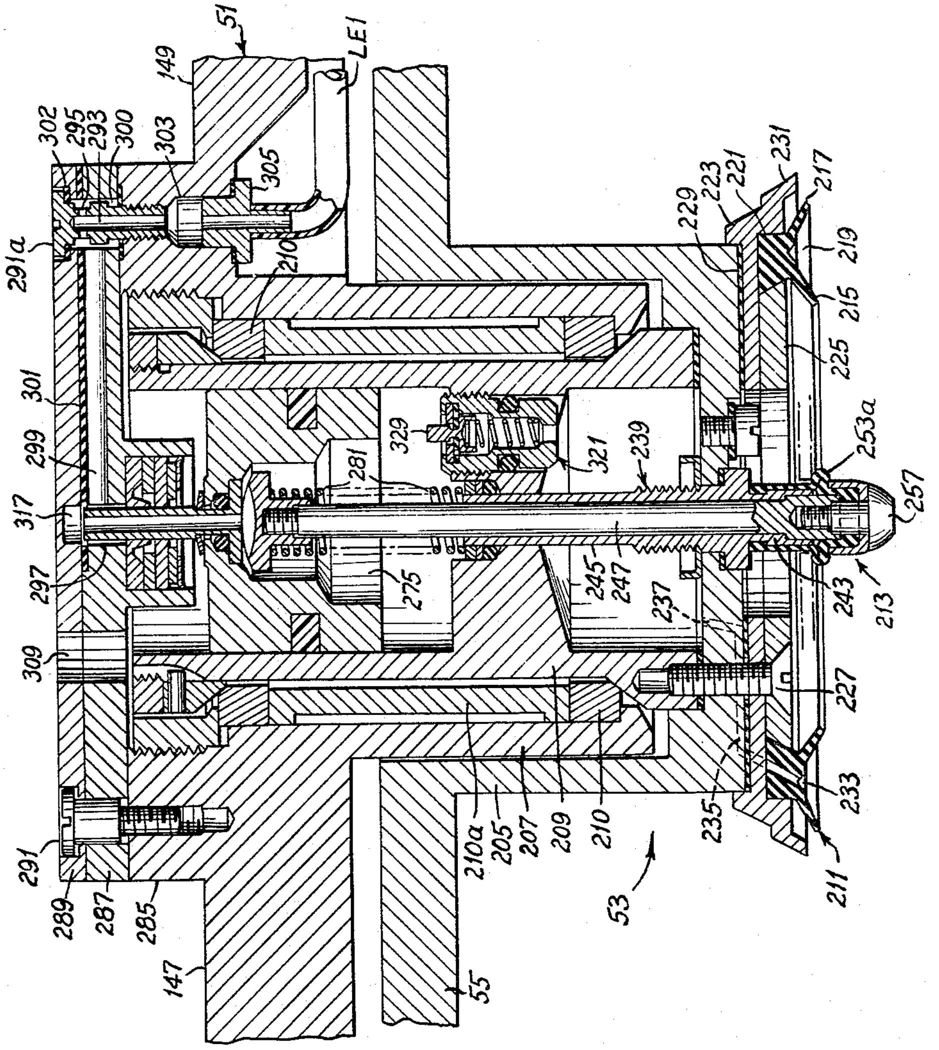
Figure 19:
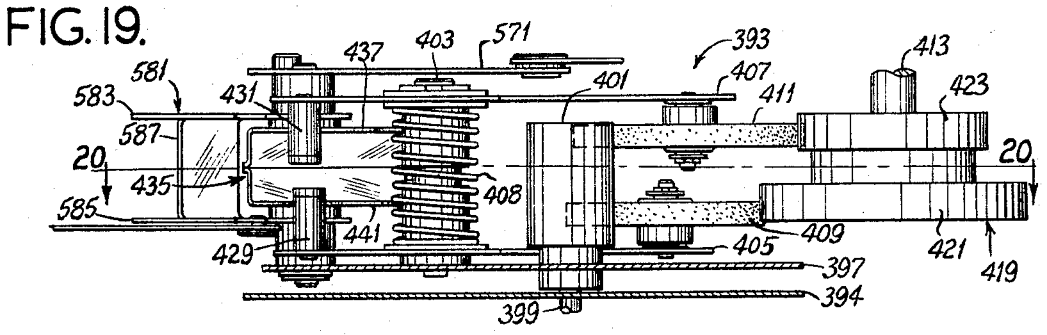
Figure 20:
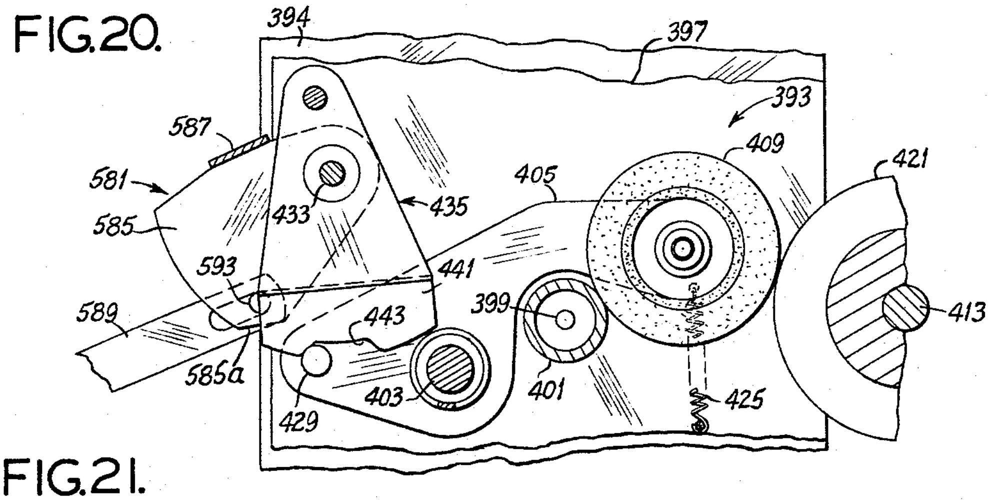
Figure 21:
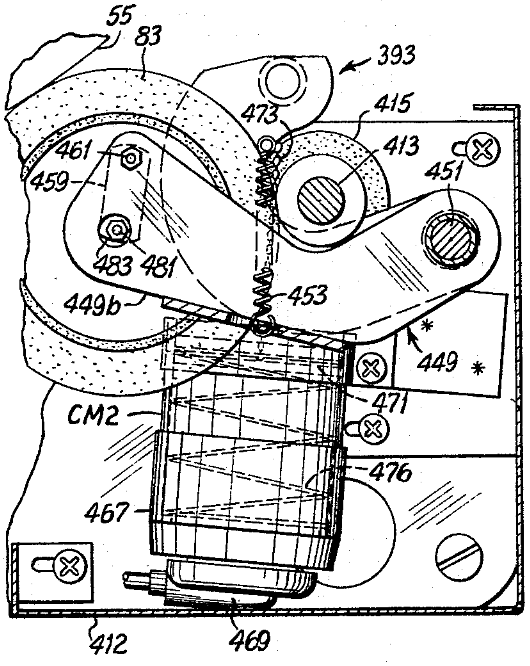
Figure 22:
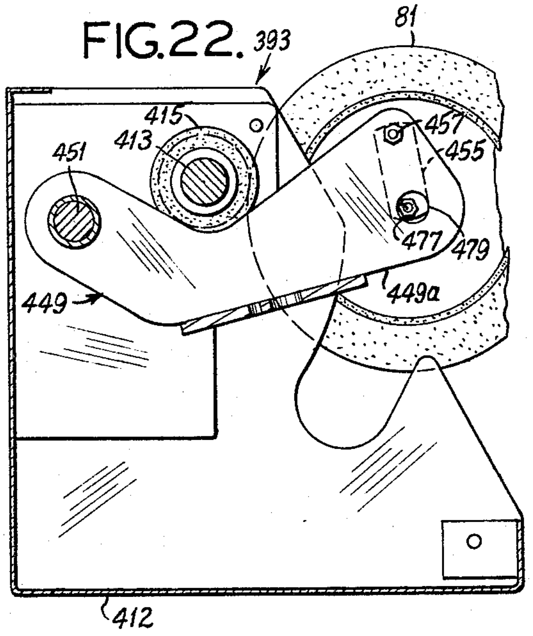
Figures 23, 24, 25, 26, 27, 28, 29:
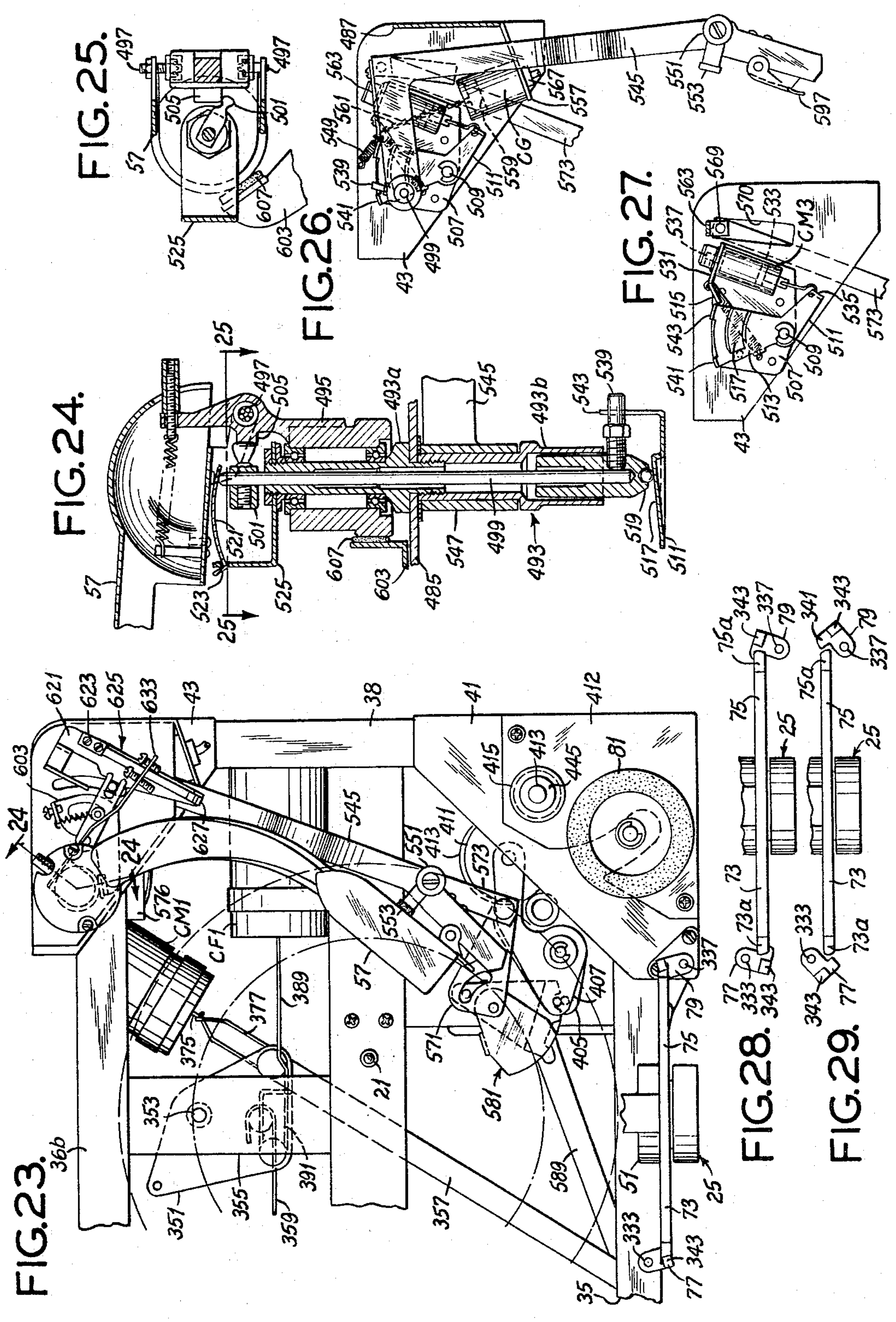
Figure 30:
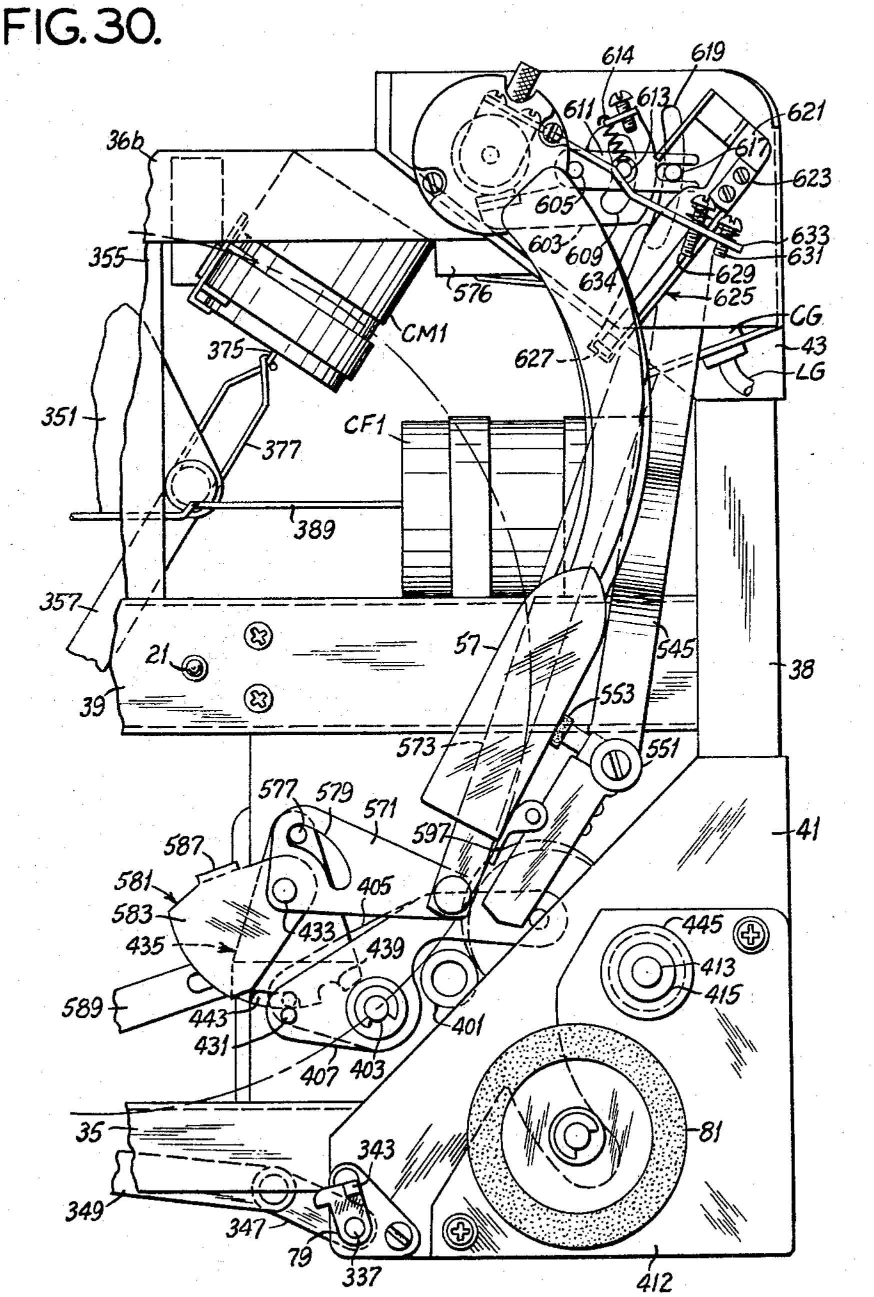
Figures 33, 34, 35, 38:
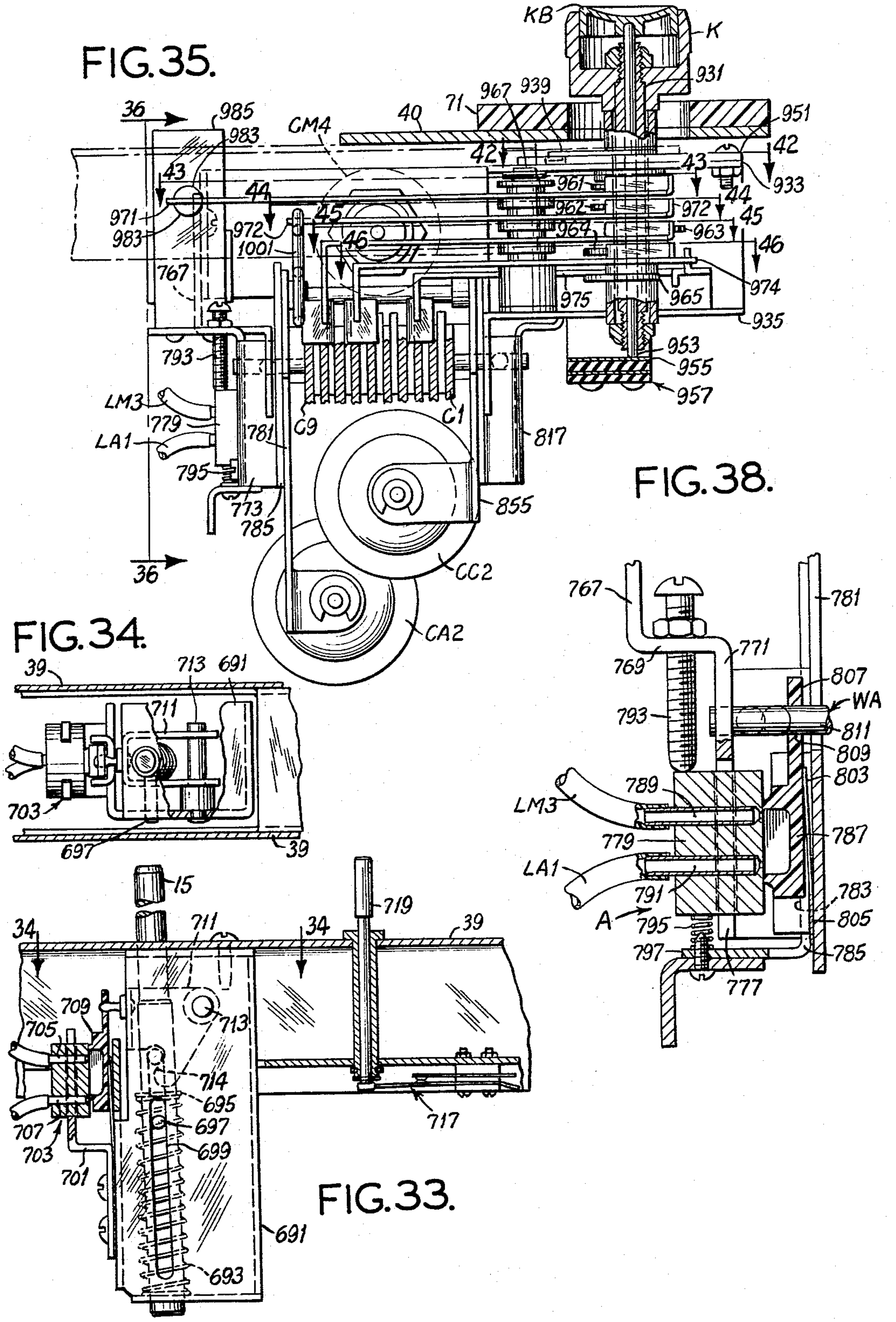
Figures 36, 37:
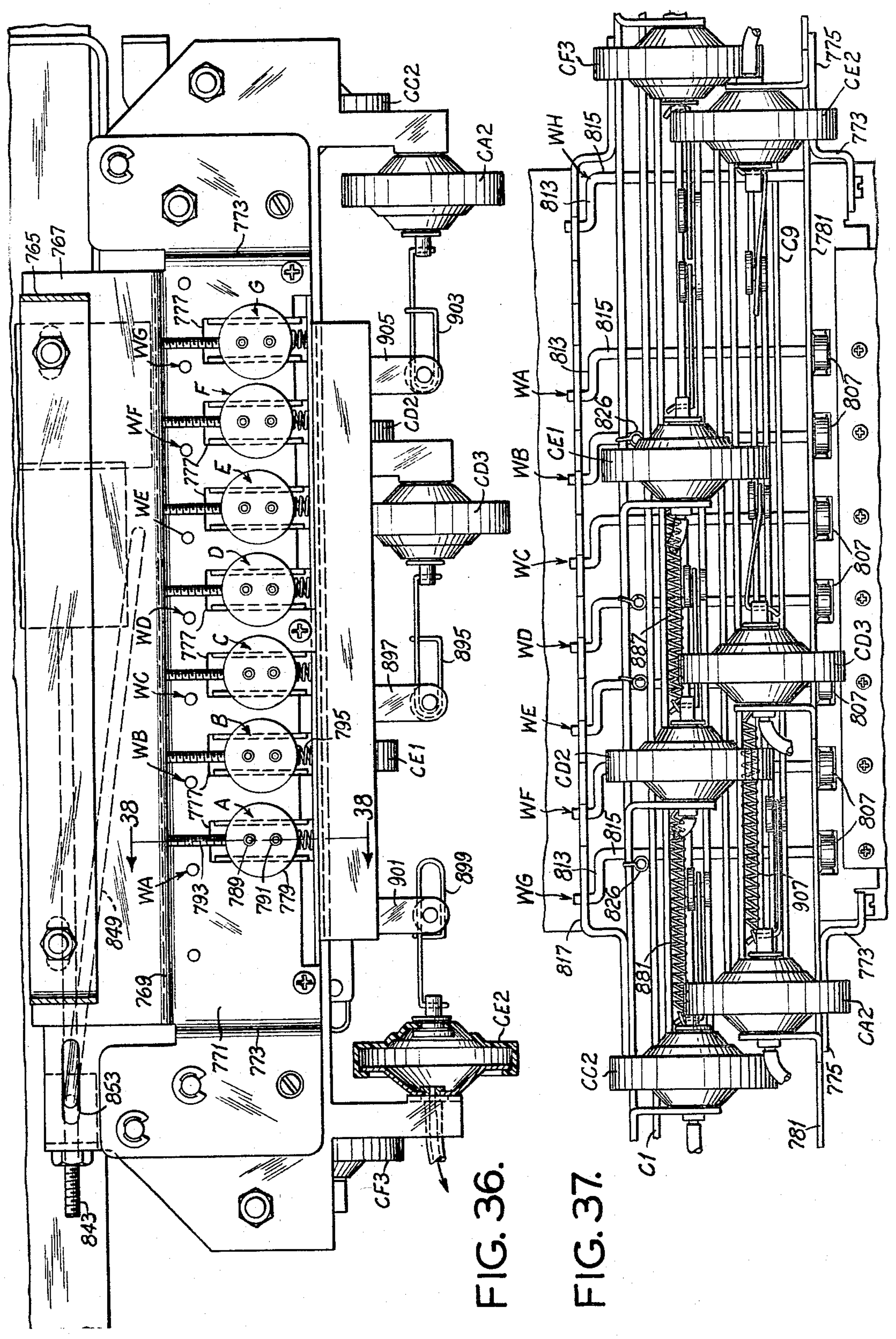
Figures 39, 40:
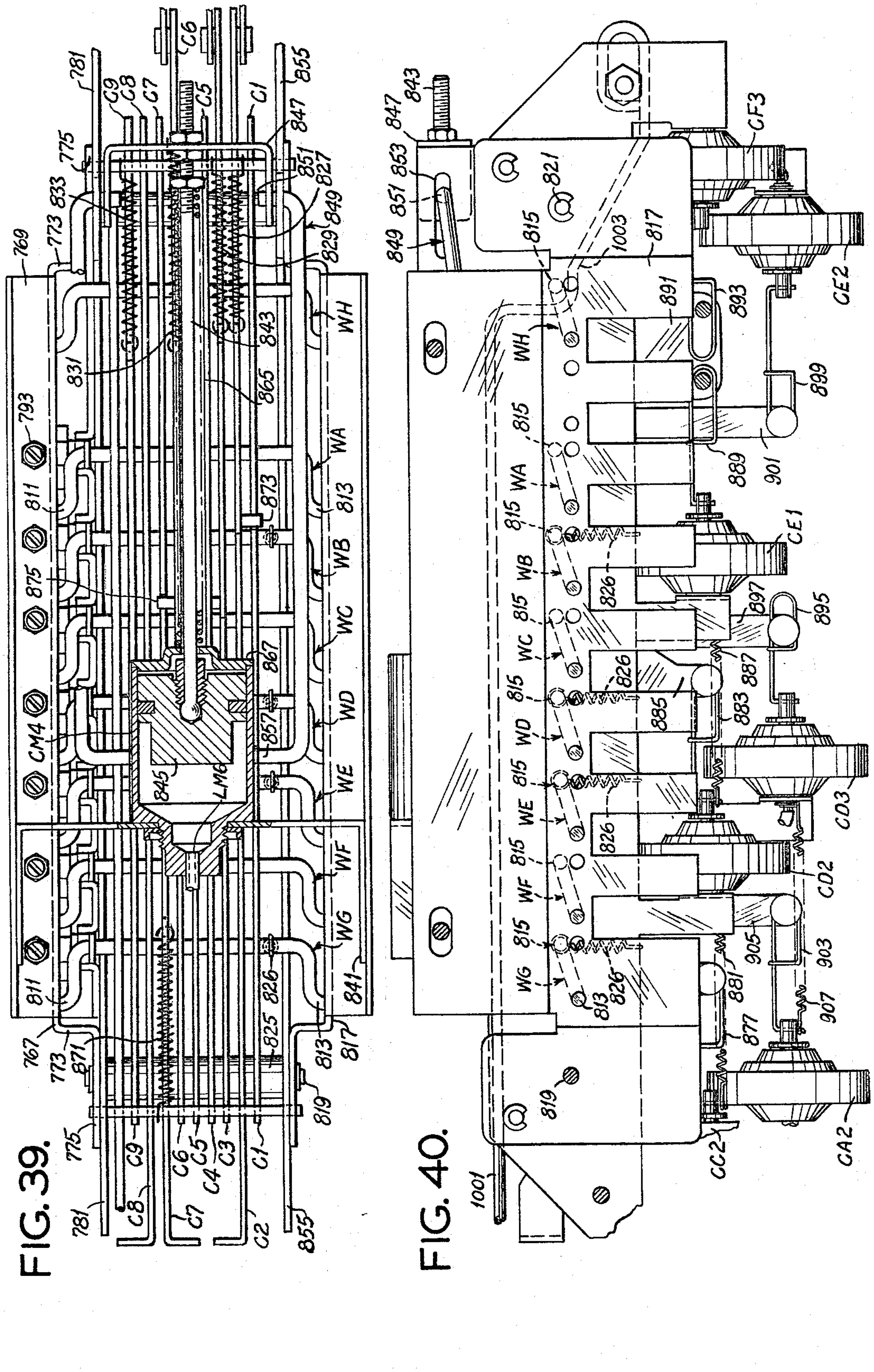
Figure 41:
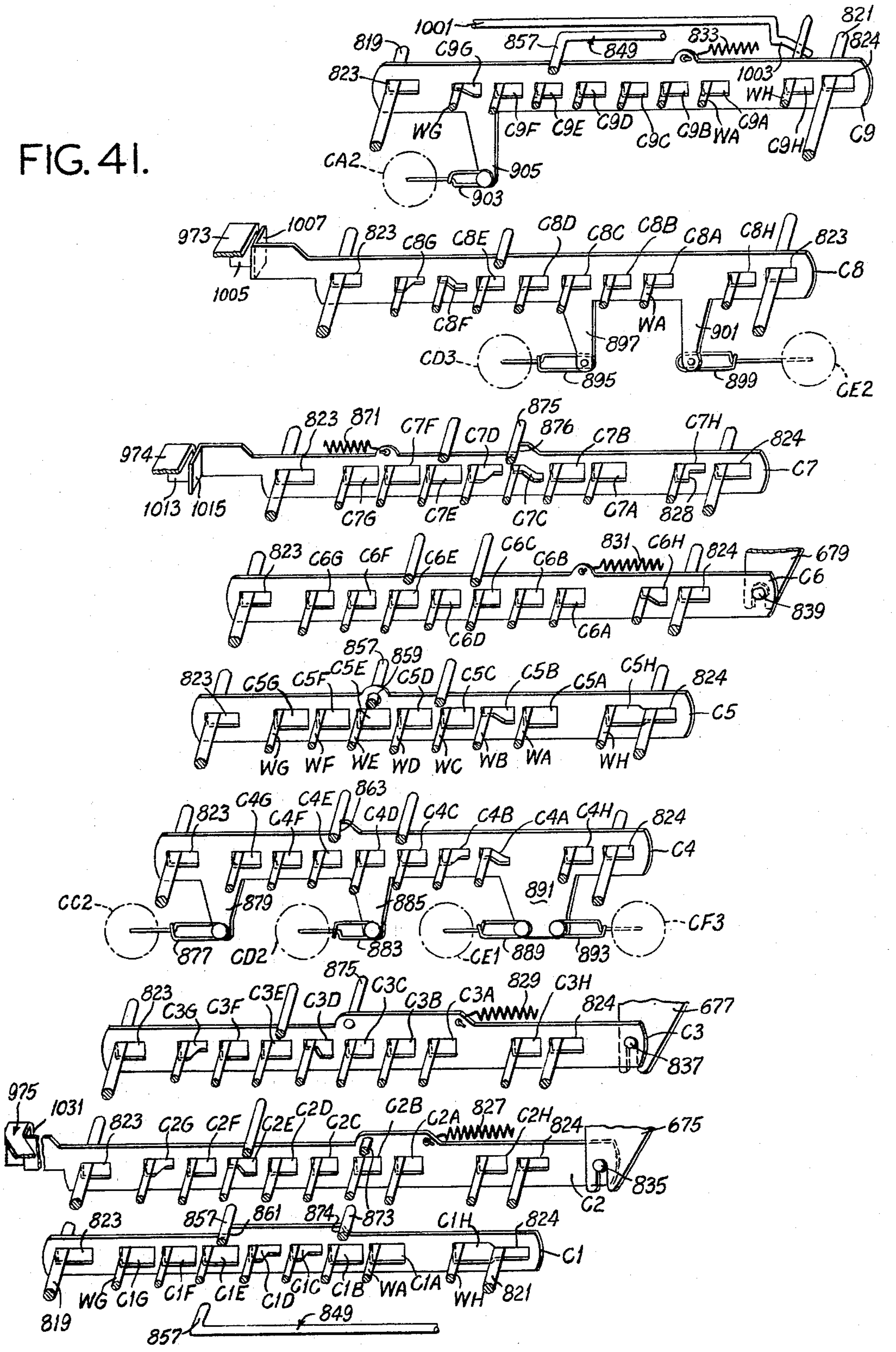
Figures 42, 43, 44, 45, 46:
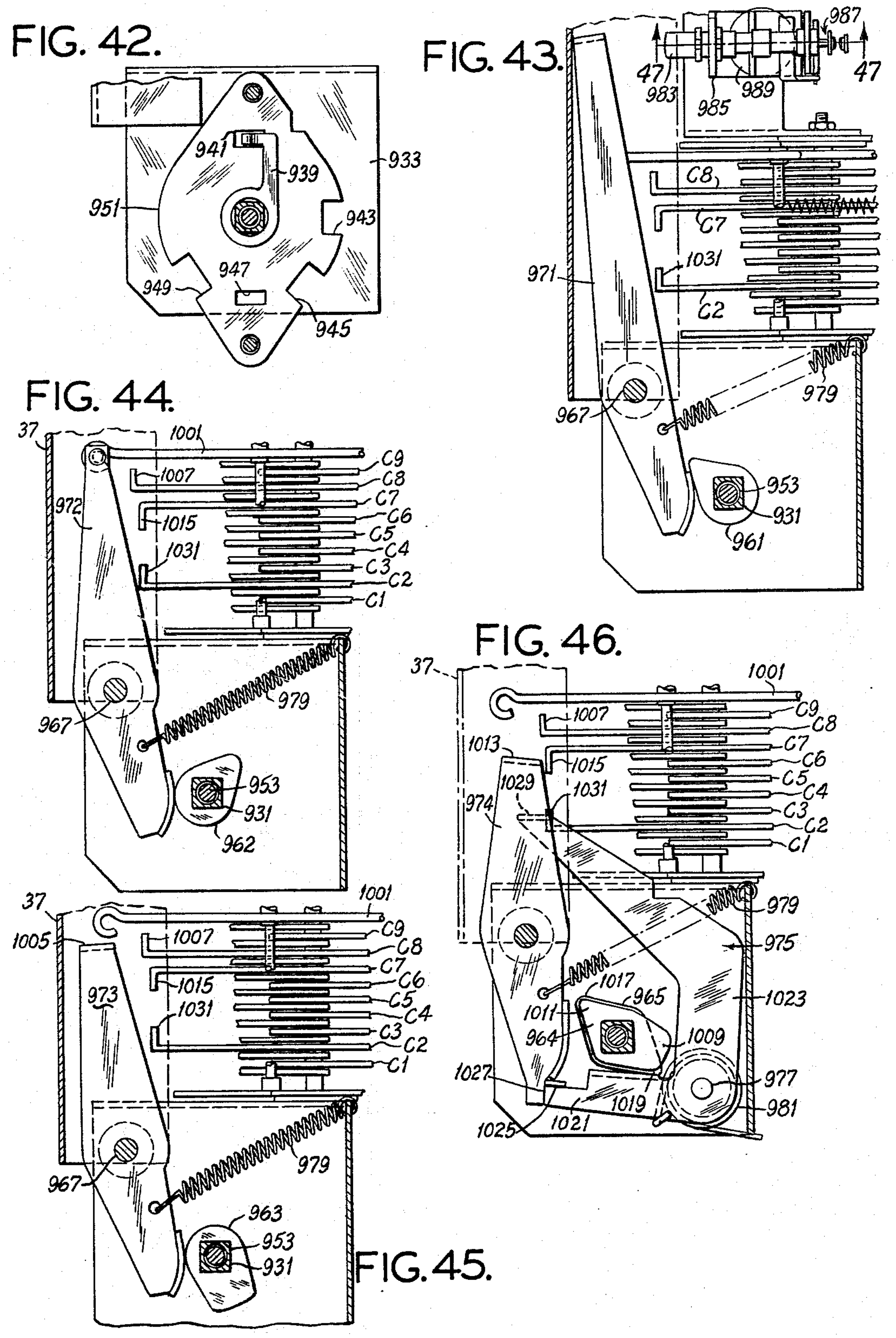
Figure 49:
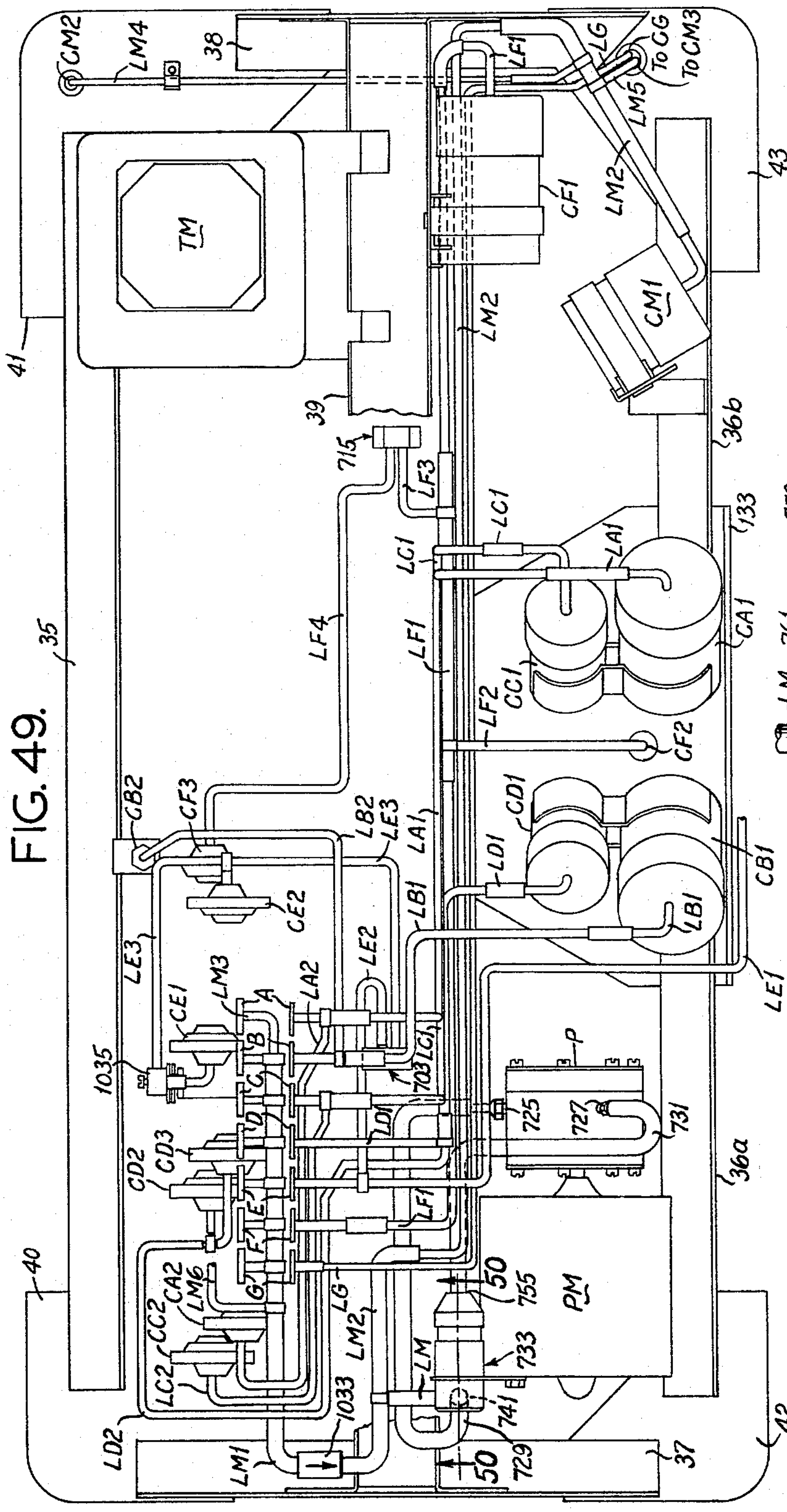
Figure 50:
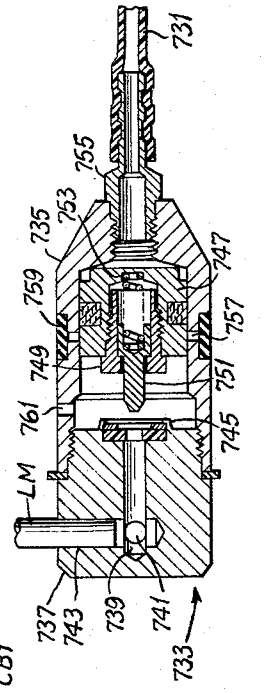
Figure 51:
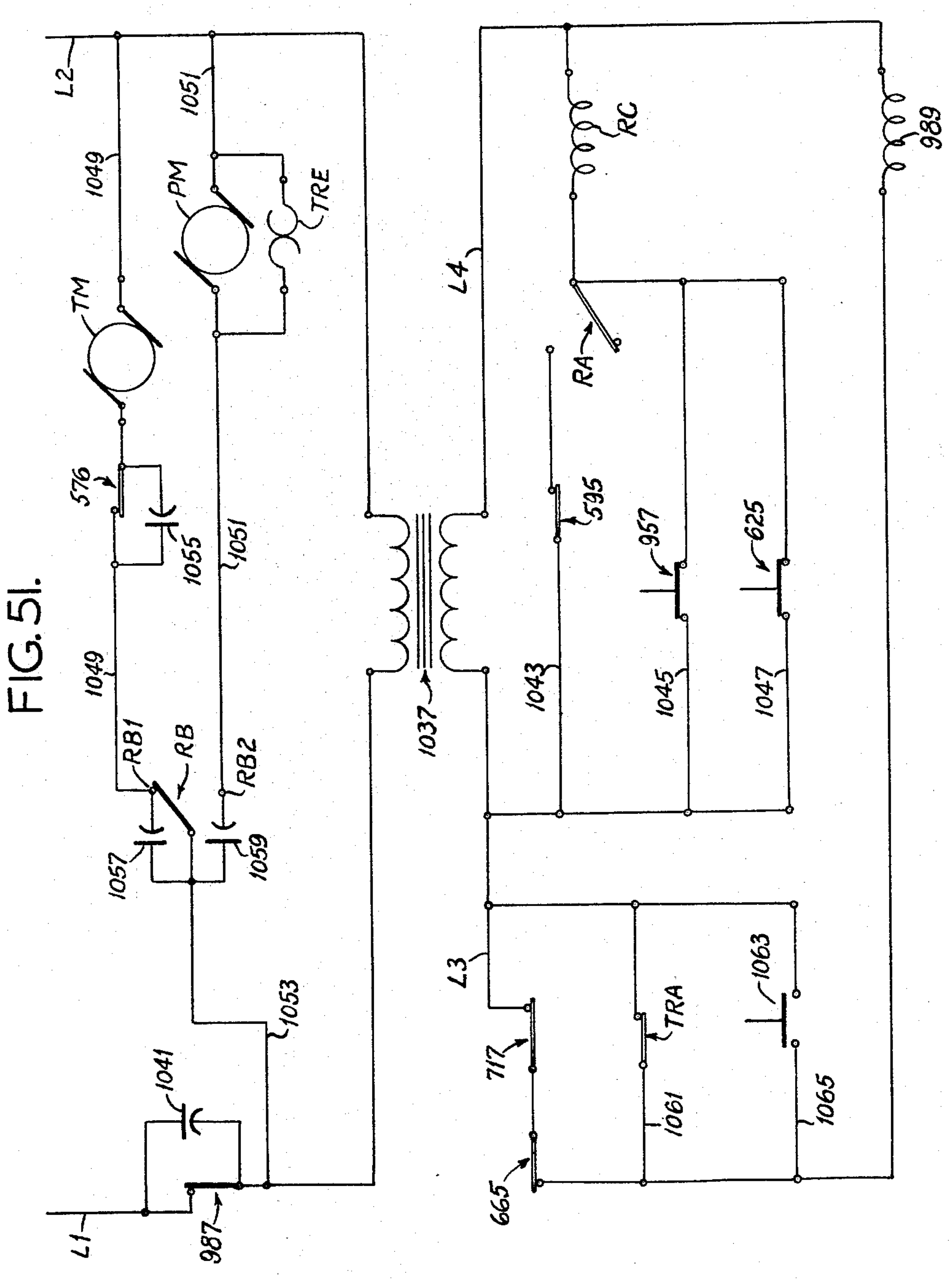

FIGS. 11, 12 and 13 (Sheet 9) are vertical sections taken on lines 11—11, 12—12 and 13—13, respectively, of FIG. 10;

FIGS. 14 and 15 (Sheet 10) are vertical sections taken on lines 14—14 and 15—15, respectively, of FIG. 10;

FIG. 16 (Sheet 11) is an enlarged vertical section taken on line 16—16 of FIG. 4, illustrating certain record gripping means in record gripping position;

FIG. 17 (Sheet 11) is a fragment of FIG. 16 illustrating the record gripping means in an extended or released position;

FIG. 18 (Sheet 10) is an enlarged fragment of FIG. 4, with certain parts removed to show detail, and showing a moved position of certain parts;

FIG. 19 (Sheet 12) is a vertical section taken on line 19—19 of FIG. 18;

FIG. 20 (Sheet 12) is a horizontal section taken on line 20—20 of FIG. 19;

FIG. 21 (Sheet 12) is an enlarged horizontal section taken on line 21—21 of FIG. 9;

FIG. 22 (Sheet 12) is an enlarged horizontal section taken on line 22—22 of FIG. 9;

FIG. 23 (Sheet 13) is a fragment of FIG. 4, illustrating a moved position of parts;

FIG. 24 (Sheet 13) is an enlarged vertical section taken on line 24—24 of FIG. 23;

FIG. 25 (Sheet 13) is a horizontal section taken on line 25—25 of FIG. 24;

FIG. 26 (Sheet 13) is a horizontal section taken on line 26—26 of FIG. 9;

FIG. 27 (Sheet 13) is a horizontal section taken on line 27—27 of FIG. 9;

FIGS. 28 and 29 (Sheet 13) are plan views showing moved positions of certain stops;

FIG. 30 (Sheet 14) is an enlarged fragment of FIG. 4 illustrating a moved position of parts;

FIGS. 31 and 32 (Sheet 8) are vertical sections taken on lines 31—31 and 32—32, respectively, of FIG. 10;

FIG. 33 (Sheet 15) is an enlarged section taken on line 33—33 of FIG. 4;

FIG. 33A (Sheet 7) is an enlarged vertical section taken on line 33A—33A of FIG. 4;

FIG. 34 (Sheet 15) is a horizontal section taken on line 34—34 of FIG. 33;

FIG. 35 (Sheet 15) is an enlarged vertical section taken on line 35—35 of FIG. 4;

FIG. 36 (Sheet 16) is a vertical section taken on line 36—36 of FIGS. 4 and 35;

FIG. 37 (Sheet 16) is an enlarged bottom plan view taken on line 37—37 of FIG. 5;

FIG. 38 (Sheet 15) is an enlarged vertical section taken on line 38—38 of FIG. 36;

FIG. 39 (Sheet 17) is an enlarged fragment of FIG. 4 with parts broken away and shown in section;

FIG. 40 (Sheet 17) is an enlarged vertical section taken on line 40—40 of FIG. 4;

FIG. 41 (Sheet 18) is an exploded view showing certain slidable cams of the record player;

FIGS. 42–46 (Sheet 19) are horizontal sections taken on lines 42—42, 43—43, 44—44, 45—45 and 46—46, respectively, of FIG. 35;

FIG. 47 (Sheet 6) is a vertical section taken on line 47—47 of FIG. 43;

FIG. 48 (Sheet 10) is a fragment of FIG. 4 with parts broken away;

FIG. 49 (Sheet 20) is a diagram of the vacuum system of the record player superimposed on a bottom plan;

FIG. 50 (Sheet 20) is an enlarged section taken on line 50—50 of FIG. 49 showing a combination quick vent and movable valve of the vacuum system; and FIG. 51 (Sheet 21) is a wiring diagram.

Corresponding reference characters indicate corresponding parts throughout the several views of the drawings.

Figure 1:
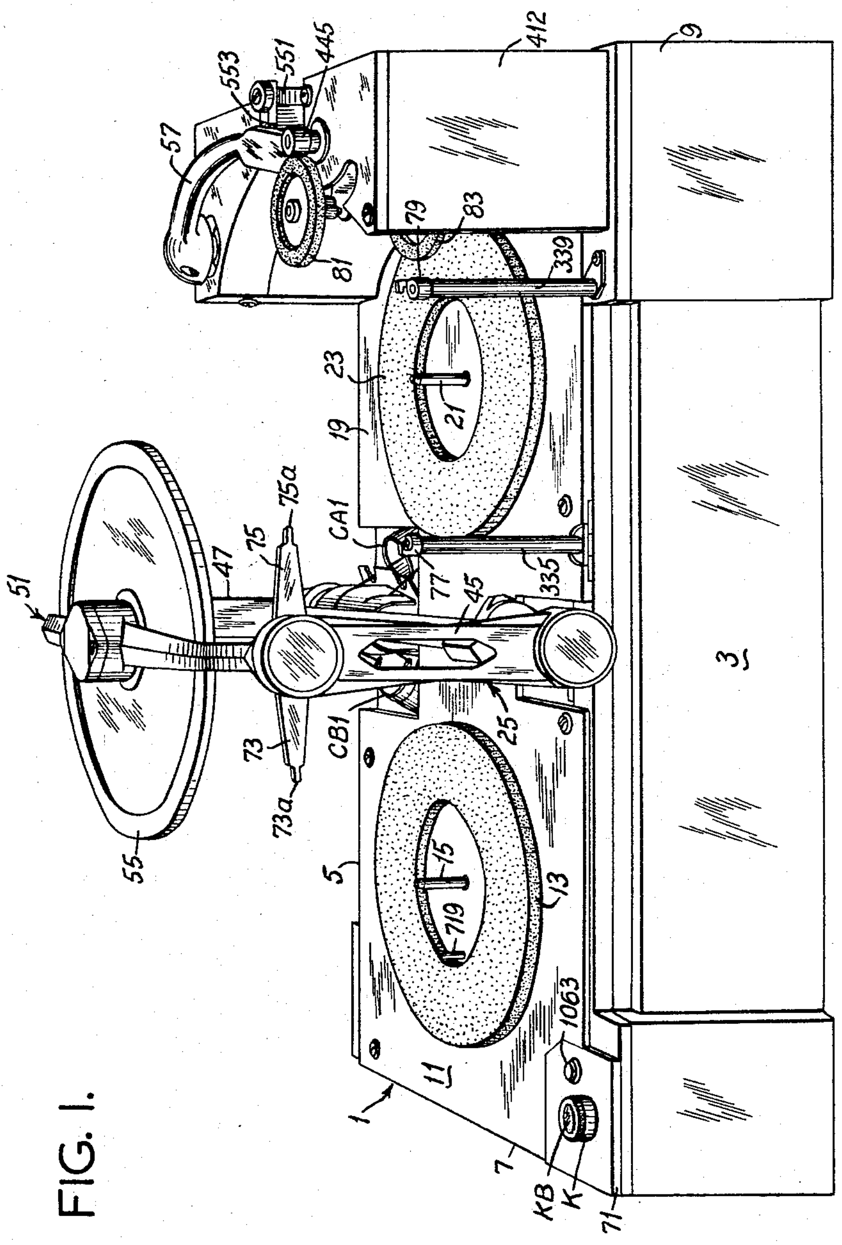
Figure 2:
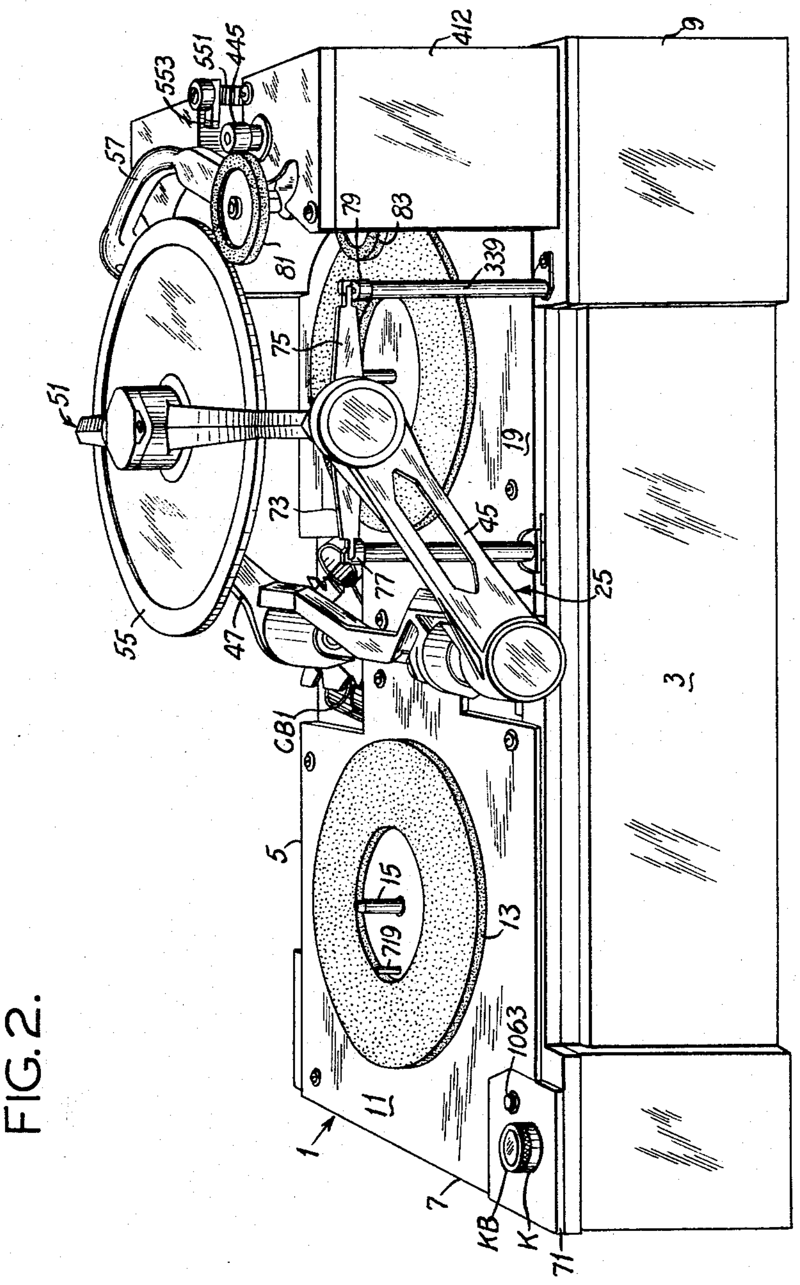
FIG. 2 (Sheet 2) is a view similar to FIG. 1 illustrating parts in position for playing the first side of a record, the turntable being inverted.
Figure 3:
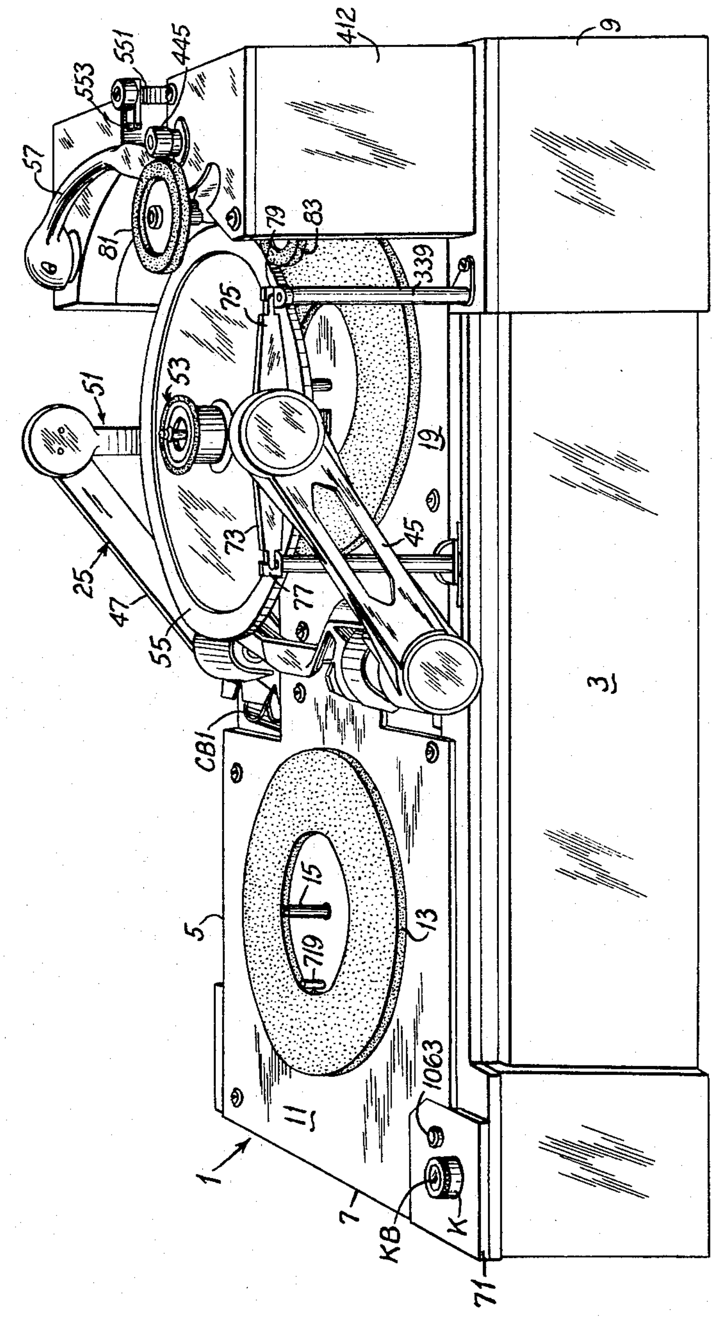
FIG. 3 (Sheet 3) is a view similar to FIG. 2 illustrating parts in position for playing the second side of a record, the turntable being upright.

Referring to the drawings, first more particularly to FIGS. 1–3, a record player of this invention is shown to comprise a rectangular sheet metal housing 1 having a front wall 3, a rear wall 5, and left and right end walls 7 and 9. On top of housing 1 at the left is a platform or deck 11 for supporting a supply stack of records to be played. These may be intermixed 33 r.p.m. records or 45 r.p.m. records. It will be understood that the 33 r.p.m. records may be ten inches or twelve inches in diameter. The 45 r.p.m. records are seven inches in diameter. Deck 11 has a pad 13 thereon for cushioning the supply stack. Records in the supply stack are held centered on deck 11 by a vertical pin 15 extending upward through the center holes of 33 r.p.m. records and the center holes in suitable conventional adaptors in 45 r.p.m. records (which conventionally have large center holes). This pin 15 is vertically movable and is spring-biased upward to a raised position as will be made clear. On top of housing 1 at the right is a platform or deck 19 for receiving records which have been played, the records piling up in a stack centered on a vertical pin 21 extending upward from deck 19. Pin 21, like pin 15, is vertically movable and spring-biased upward to a raised position. Deck 19 has a cushioning pad 23 thereon. Pins 15 and 21 are spaced a distance greater than the diameter of the largest record to be played (i.e., a twelve-inch record).

A yoke 25 constituting the transfer arm of the record player is pivoted for swinging movement on a horizontal axis X—X which extends in front-to-rear direction midway between the pins 15 and 21 and above the top of housing 1. This yoke is pivotally mounted on a rectangular main frame 27 (see FIG. 4). Frame 27 has legs 29 at its four corners (see FIGS. 5–7 and 9) bearing on compression springs 31 mounted on ledges such as indicated at 33 which are provided at the corners of housing 1, the frame thereby floating in respect to housing 1. Frame 27 comprises front and rear rails 35 and 36, left and right end rails 37 and 38, a channel-section central longitudinal rail 39 spanning the end rails, left and right front corner plates 40 and 41 and left and right rear corner plates 42 and 43. The yoke 25 comprises a generally U-shaped casting (see FIGS. 7 and 10) consisting of a front arm 45 and a rear arm 47 interconnected by a crossbar 49. A turntable cradle 51 is pivotally carried by the yoke extending between the free ends of the yoke arms 45 and 47. Cradle 51 is rotatable relative to the yoke on an axis Y—Y parallel to the pivotal axis X—X of the yoke. Axis X—X is spaced from axis Y—Y a distance corresponding to the spacing of axis X—X from the record-centering pins 15 and 21.

A turntable 53 is journalled at the center of the cradle for rotation on an axis Z—Z at right angles to the cradle axis Y—Y. A flywheel 55 is rotatable with the turntable. The turntable is rotatable on its axis Z—Z relative to the cradle, and is rotatable with the cradle between the inverted position in which it appears in FIGS. 1 and 2 wherein it faces downward, and the upright position in which it appears in FIG. 3 wherein it faces upward. The turntable is of somewhat smaller diameter than the central ungrooved portion of any record and is adapted to grip a record only at the central ungrooved portion thereof to expose the playing grooves on the side of the record toward the turntable as well as on the other side of the record. At 57 is indicated the tone arm of the record player.

Figure 8:
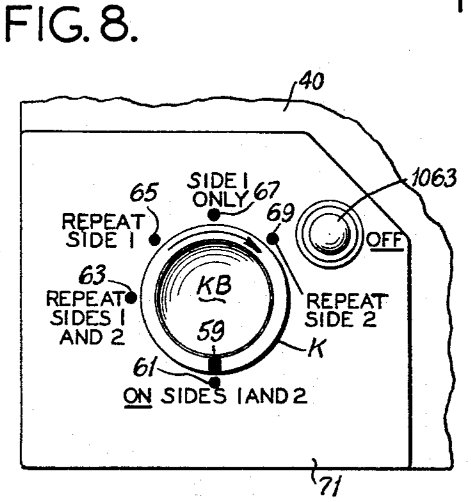
FIG. 8 (Sheet 7) is an enlarged fragment of FIG. 4.

At the left front corner of the record player is a control knob K. This is rotatable on a vertical axis to a number of different angular positions determining different modes of play. As shown in FIG. 8, the knob has an index mark 59. It is rotatable clockwise as viewed from above to bring this index mark into register with any one of five markings 61, 63, 65, 67 and 69 on a plastic plate 71 mounted on the left front corner plate 40 of frame 27. Marking 61 is labelled "ON-SIDES 1 AND 2" (see FIG. 8). Knob K must be rotated to bring index 59 into register with marking 61 to turn the record player on, and, when so positioned, establishes a mode of play in which records are taken successively from the supply stack on deck 11, each record being played on its first side, turned over, played on its second side, and dropped on deck 19. Marking 63 is labelled "REPEAT SIDES 1 AND 2." By rotating knob K to bring index 59 into register with this marking, repetitive play of both sides of any record on the turntable 53 may be had. Marking 65 is labelled "REPEAT SIDE 1." By rotating knob K to bring index 59 into register with this marking, repetitive play of the first side of any record on the turntable may be had. Marking 67 is labelled "SIDE 1 ONLY." With index 59 in register with this marking, records are taken successively from the supply stack on deck 11, each record being played only on its first side, and then dropped on deck 19. Marking 69 is labelled "REPEAT SIDE 2." By rotating knob K to bring index 59 into register with this marking, repetitive play of the second side of any record on the turntable may be had. The "first side" of a record is the top side thereof as stacked on deck 11, and the "second side" is the bottom side thereof as stacked on deck 11. Turning knob K to bring index 59 to or beyond marking 61 turns the record player on. Knob K has a start button KB vertically slidable thereon. Playing of records is initiated after turning of knob K by pushing down this button.

In general, a stack of records to be played is placed on deck 11, centered on pin 15. Initially, the yoke 25 occupies an "OFF" position somewhat to the right of its FIG. 1 transition position, and the turntable 53 is inverted. Assuming that knob K is turned to bring index 59 into register with marking 61 for playing the first side and then the second side of each successive record, when button KB is pushed down, the yoke 25 swings to the left to its vertical transition position, then to the right and down toward deck 19, then all the way to the left to bring the inverted turntable 53 down on the first record (the top record) of the supply stack on deck 11. The yoke then swings to the right, the turntable remaining inverted and carrying the first record along with it. The yoke swings over to a playing position, in which it is shown in FIG. 2, and which is determined by the engagement of arms 73 and 75 on the turntable cradle 51 with a pair of retractable stops 77 and 79. A turntable driving wheel 81 then moves into engagement with the rim of flywheel 55 to drive the turntable in the proper direction for playing the first side of the record, which is clockwise as viewed from above. The tone arm 57 then moves in to play the first side. At the conclusion of playing the first side, the tone arm is retracted. The yoke 25 then swings to transition position, and the turntable cradle 51 is rotated to bring the turntable with the record thereon to upright position. The second side of the record then faces upward. The yoke then swings back to playing position (FIG. 3). A second turntable driving wheel 83 then moves into engagement with the flywheel 55 to drive the turntable clockwise as viewed from above. Then the tone arm moves in to play the second side of the record. At the conclusion of playing the second side, the tone arm is retracted, the yoke swings to transition position, the turntable is inverted, the stops 77 and 79 are retracted to be clear of arms 73 and 75, and the yoke then makes a full swing to the right to bring the inverted turntable with the played record thereon into centered position in respect to pin 21. Then the record is released and deposited on deck 19. The yoke 25 then swings back to the left to pick up another record. and the above-described operations are repeated.

When playing the first side only of each record (index 59 set on marking 67), the operation corresponds to that above described except that the playing of the second side of each record is omitted. After the first side of a record has been played, the yoke 25 swings to transition position, then swings to the right to record-drop position to deposit the record on deck 19, and then swings to the left to pick up the next record. When the record player is set to repeat both the first and second sides of a record (index 59 on marking 63), after the first playing of the first side, the yoke 25 swings to transition position, the cradle 51 is rotated to bring the turntable 53 to upright position, the yoke swings to playing position, and the second side is played. Then the yoke swings back to transition position, the turntable is inverted, the yoke swings back to playing position, the first side is repeated, and so on until the setting of the record player is changed or until it is stopped. When the record player is set to repeat the first side of a record (index 59 on marking 65), at the conclusion of a play of the first side, the yoke 25 swings to transition position, then comes back to playing position without swinging of the turntable to upright position, thereby to repeat the first side. When the record player is set to repeat the second side of a record (index 59 on marking 69), on the conclusion of a play of the second side (turntable upright), the yoke swings to transition position, then comes back to playing position without inversion of the turntable.

The crossbar 49 of yoke 25 has a depressed central portion 85 and raised front and rear end portions 87 and 89 which join yoke arms 45 and 47 above the lower ends of these arms (see FIG. 10). The front yoke arm 45 has an opening 91 at its lower end in which is fixed a bearing 93. This bearing and the yoke are rotable on a tubular pivot 95 secured to a bracket 97 mounted on the front rail 35 of main frame 27. Bracket 97 is fastened to rail by long-headed bolts 99 and 101 (see FIG. 11), which also serve as stops as will be later described. Crossbar 49 has downwardly extending short arms 103 and 105 spaced inward from the lower ends of the front and rear yoke arms 45 and 47. A short shaft 107 has one end secured in a hole in arm 105, and its other end secured in a hole in the lower end of rear yoke arm 47. This shaft is coaxial with bearing 93, and is journalled in a bearing 109 mounted in a bent-up ear 111 on a plate 113 on top of frame 27. The pivot axis X—X of the yoke 25 is determined by the location of pivot 95 and bearing 109.

The swinging of yoke 25 is accomplished by means of a pair of vacuum cylinders CA1 and CB1 (see FIGS. 6 and 14). Each of these comprises an open-ended sheet metal cylinder having its lower end fitted in a rubber cup 121 with a substantially air-tight seal. The cup of cylinder CB1, which is the left-hand cylinder as viewed from the front of the record player, is mounted in an inclined bottom flange 123 on an angle bracket 125 secured at its upper end to a plate 127 on main frame 27. The cup of cylinder CA1, which is the right-hand cylinder is mounted in an inclined bottom flange 129 on a similar angle bracket 131 secured at its upper end to plate 127. The rear rail 36 of the main frame 27 comprises two short angle bars **36*a* and 36*b* extending inward from the rear corner plates 42 and 43 of the frame 27. The inner ends of bars 36*a* and 36*b* are spaced from one another, and a vertical side flange 133 on the plate 127 spans the gap therebetween. Each vacuum cylinder CA1 and CB1 has a piston 135 slidable therein. A cable 136 coiled around a drum 137 fixed on shaft 107 has its end connected to the two pistons 135 and is secured to the drum. The portions of the cable extending up from the pistons to the drum pass through holes 138 in plate 127. Each rubber cup 121 has a port 139 at its lower end, which is connected into a vacuum system to be described. The arrangement is such that when a vacuum is drawn in cylinder CB1 (cylinder CA1 being vented), shaft 107 is rotated counterclockwise as viewed from the front of the record player to swing yoke 25 to the left, and when a vacuum is drawn in cylinder CA1 (cylinder CB1 being vented), shaft 107 is rotated clockwise to swing the yoke 25 to the right. Counterbalancing springs 140 and 141 (see FIG. 6) are provided for counterbalancing the yoke. These springs are tension springs, each having one end connected to frame 27. The other end of spring 140 is attached to a lever 142 pivoted at 142*a* on flange 133 and connected by a link 143 to the yoke arm 47. The other end of spring 141 is attached to a lever 144 pivoted at 144*a* on flange 133 and connected by a link 145 to the yoke arm 47**.

The turntable cradle 51 (see FIG. 10) extends between the upper ends of arms 45 and 47 of the U-shaped yoke 25. It comprises a generally U-shaped casting having a central hollow cylindrical part 146 and bars 147 and 149 extending out from opposite sides of this cylindrical part. Bar 147 extends forward and bar 149 extends rearward from central part 146. Bar 147 has a vertical disk portion 151 at its forward end on the inside of the upper end of the front yoke arm 45, and bar 149 has a vertical disk portion 153 at its rearward end on the inside of the upper end of the rear yoke arm 47. Disk 151 has a pulley 157 fixed on the outside thereof, this pulley being journalled in a bearing 159 at the upper end of the front yoke arm 45. Disk 153 has a hub 161 extending rearward into a bearing 163 at the upper end of the rear yoke arm 47. The pulley 157 and hub 161 are coaxial, and the pivot axis Y—Y of the cradle 51 is determined by the location of bearings 159 and 163 in the yoke arms 45 and 47.

Pulley 157 is part of a mechanism for ratating the turntable cradle 51 on its axis Y—Y relative to the yoke 25. This mechanism includes a shaft 165 on yoke axis X—X journalled adjacent one end in tubular pivot 95 and journalled adjacent its other end in a bearing 167 mounted in a bent-up ear 169 on plate 113 (see FIG. 10). This shaft 165 extends through a hole in arm 103 of the yoke crossbar 49, and is accommodated in a groove 171 in the depressed central portion 85 of the crossbar 49. A pulley 173 is secured on the forward end of the shaft 165 within a recess 174 in the lower end of the front yoke arm 45. An endless band 175 is trained around pulleys 157 and 173 on the inside of arm 45, this arm having hollowed-out portions such as indicated at 177 for passage of the band. A drum 179 is secured on the rearward end shaft 165 rearward of ear 169.

Rotation of shaft 165 is accomplished by means of a pair of vacuum cylinders CC1 and CD1 (see FIG. 15). Each of these comprises and open-ended sheet metal cylinder having its lower end fitted in a rubber cup 187 with a substantially air-tight seal. The cup of cylinder CD1, which is the left-hand cylinder as viewed from the front of the record player, is mounted in an inclined flange 189 on bracket 125. The cup of cylinder CC1, which is the right-hand cylinder, is mounted in an inclined flange 191 on bracket 131. Each cylinder CC1 and CD1 has a piston 193 slidable therein. A cable 195 coiled around drum 179 has its ends connected to the two pistons 193 and is secured to the drum at 197. The portions of the cable extending up from the pistons to the drum pass through the holes 138 in plate 127. Each rubber cup 187 has a port 199 at its lower end, which is connected into the vacuum system. The arrangement is such that when a vacuum is drawn in cylinder CD1 (cylinder CC1 being vented), shaft 165 is rotated counterclockwise to swing turntable cradle 151 counterclockwise, and when a vacuum is drawn in cylinder CC1 (cylinder CD1 being vented), shaft 165 is rotated clockwise to swing cradle 51 clockwise. Shaft 165 acts through pulley 173, band 175 and pulley 157 for this purpose. Pulley 173, band 175 and pulley 157 additionally act as a parallel motion mechanism, when shaft 165 is stationary, to maintain the turntable axis Z—Z vertical as the yoke 25 swings, whether the turntable 53 is inverted or upright. A disk 200 (see FIGS. 10 and 13) fixed on shaft 165 carries a pin 201 engageable with the heads of the aforesaid bolts 99 and 101 to limit the swing of the turntable cradle 51 to approximately 180° and to determine the inverted and upright positions of the turntable 53. A spring 202 has its lower end attached to bracket 97 and its upper end connected by a link 203 to disk 200 and acts to counterbalance the cradle and turntable during turnover.

The turntable 53 comprises a cup-shaped hub 205 (see FIG. 16) which fits over a cylindrical extension 207 of turntable cradle 51. The flywheel 55, as shown is formed as an integral flange at the open end of the cup-shaped hub 205. The latter is secured to a tubular turntable spindle 209 of relatively large diameter. This spindle 209 is journalled for rotation in extension 207 by means of thrust bearings 210, with a spacer **210*a* between bearings 210. The turntable includes a suction pad 211 for gripping a record thereto by suction, and a center grip 213 which is adapted to extend through and grip a record at the center hole in the record. The suction pad 211 consists of a soft rubber ring having inner and outer annular flexible lips 215 and 217 defining an annular channel 219. Pad 211 is retained in a circular recess 221 in a disk 223 by means of a retaining ring 225. The retaining ring 225, the pad 211 and the disk 223 are secured on the end of turntable hub 205 by screws as indicated at 227. A gasket 229 is interposed between the disk 223 and the end of the hub 205. Disk 223 has a flaring rim 231 which is engageable by a record to determine the plane of the record. This rim also constitutes a shield for the suction pad. A vacuum port 233 leads from suction pad channel 219 through the suction pad, the disk 223 and the gasket 229 to a groove 235 in the end of turntable hub 205. This groove communicates with the interior of spindle 209 through a hole 237 in the end of the hub 205. Groove 235 is sealed by the gasket 229**.

The center grip 213 comprises a sleeve 239 fixed in a central hole 241 in the end of the turntable hub 205. This sleeve has an outer end portion 243 extending outward from the end of the hub 205 through large central holes in the disk 223 and the retaining ring 225, and an inner portion 245 extending inward from the end of the hub 205. A rod 247 is axially slidable in sleeve 239. This rod has an integral outer end head 249 receivable in a recess 251 constituted by a counterbore in the outer end of sleeve 239. A record-gripping rubber boot 253 is secured on the head 249 by means of a cap 255 held on the head by a screw 257. The outside diameter of the cap 255 is slightly smaller than the diameter of the center hole in a record. The head of screw 257 is formed to provide a tapered nose for entering the central hole in a record. The boot 253 consists of a cylindrical rubber sleeve having internal beads 259 and 261 at its inner and outer ends. The outer bead 261 is clamped between the cap 255 and the end of head 249. The inner bead 259 is snapped into an annular groove 163 in sleeve 239 at the inner end of outer end portion 243 of the latter. The length of the boot 253, in its initial cylindrical form, is somewhat greater than the length of the outer end portion 243 of sleeve 239. The outer end of sleeve 239 is spaced outward from the plane of rim 231 of disk 223 a distance corresponding to the thickness of a record. Rod 247 is slidable in sleeve 239 between the extended position in which it is illustrated in FIG 17, wherein the boot 253 is axially extended and capable of passing through the center hole in a record, and the retracted position of FIG. 16, wherein the boot 253 is axially contracted in such manner as to bulge out a portion **253*a* of the boot between the outer end of sleeve 239 and the rim of cap 255. This bulged-out portion is adapted to grip a record against the rim 231 or the suction pad 211**, as apparent from FIG. 16.

Spindle 209 has a transverse partition 265 dividing the space therein into an inner chamber 267 and an outer chamber 269. Hole 237 communicates with the outer chamber 269. Sleeve 239 extends axially through the outer chamber 269 and through a center hole 271 in partition 265. A piston 273 is axially slidable in the inner chamber 267. Rod 247 projects from the inner end of sleeve 239 and extends axially within the inner chamber 267 into a recess 275 in piston 273. Rod 247 has a head 277 at its inner end engageable by the piston. This head is grooved as indicated at 279. A spring 281 reacts from partition 265 against head 277 to bias the rod 247 inward toward its retracted record-gripping position of FIG. 16. This also biases the piston 273 in the direction away from partition 265. Spring 281 also acts to compress packing 283 for sealing the center hole 271 in the partition 265. The turntable cradle 51 has an annular boss 285 on the side opposite extension 207. The inner end of turntable spindle 209 extends into the space in this boss. A swivel housing 287 overlies the boss 285 and a cover 289 overlies the swivel housing. This housing and cover are secured to the boss 285 by screws 291. One of these screws, specially designated **291*a*, is a specially formed screw, having an axial passage 293 extending inward from the end of its shank, and radial ports 295 communicating with the inner end of this axial passage. The swivel housing 287 has a center hole 297 and a radial groove 299 in its outer face extending outward from the center hole 297 to hole 300 for screw 291*a*. The outer end of the center hole 297 and the groove 299 in swivel housing 287 are closed by cover 289, a gasket 301 being provided for air-tight sealing thereof. The outer end of hole 300 is sealed by a gasket 302 under the head of screw 291*a*. The passage 293 in screw 291*a* communicates with a recess 303 in turntable cradle 51 located radially outward from extension 207. A nipple 305 fitted in recess 303 provides for attachment thereto of a vacuum line LE1 which extends rearward along bar 149 of the cradle 51**.

The cover 289 and housing 287 have an air vent 309 for venting the space between piston 273 and the housing 287 to atmosphere. The housing 287 has an annular boss 311 extending into the inner end of spindle 209 coaxial with the spindle. Piston 273 carries a tubular swivel stud 313 adapted to extend into center hole 297 in housing 287. Packing 315 is provided within boss 311 for sealing on the tubular stud 313. Cover 289 has a recess 317 registering with center hole 297 of housing 287, the arrangement being such as to provide for communication between groove 299 and the passage through the tubular swivel stud 313 at all times. Partition 265 has a hole 319 located outward from its center in which is secured a check valve 321. This valve comprises a valve body 323 carrying a ported rubber disk 325. Disk 325 is secured to a member 327 slidable in the body and having a button 329 projecting from the body toward the piston 273. A spring 331 biases the member 327 and the disk 325 toward closed position.

The above-described turntable construction is such when a vacuum is drawn in vacuum line LE1, the space in chamber 267 between piston 273 and partition 265 is evacuated via the groove 279 in head 277 on rod 247, the passage in the tubular swivel stud 313, groove 299, the passage 293 in screw 291*a*, recess 303 and nipple 305. Atmospheric pressure on the piston 273 (via vent 309) is then effective to drive the piston 273 toward partition 265 against the return bias of spring 281 and move the rod 247 outward (downward as viewed in FIG. 16) thereby to extend the boot 253 and take the bulge 253*a* out of the boot (compare FIGS. 16 and 17). As the piston 273 approaches the partition 265, it engages the button 329 of valve 321 and opens this valve to transmit vacuum from the space in chamber 267 between piston 273 and partition 265 to chamber 269, with the result that a vacuum is drawn in the annular suction pad 211. When line LE1 is vented, spring 281 returns the rod 247 and piston 273 to retracted position and boot 253 is again bulged (FIG. 16) for gripping a record. As piston 273 moves off valve button 329 and valve 321 closes, chamber 269 is cut off from vacuum in chamber 267. However, vacuum is held in chamber 269 until it leaks off. This is sufficient for holding the record until the boot has had time to grip the record.

As previous stated, the playing position of the swinging turntable-carrying yoke 25 is determined by the engagement of arms 73 and 75 on turntable cradle 51 with the retractable stops 77 and 79. These arms 73 and 75 are formed integrally with disk 151, arm 73 extending to the left and arm 75 extending to the right from disk 151 as viewed from the front of the record player. Arm 73 has a finger 73*a* at its outer (left) end; arm 75 has a finger 75*a* at its outer (right) end. Stop 77 is secured on the upper end of a shaft 333 rotatable in a vertical tubular post 335 extending up from main frame 27. Stop 79 is secured on the upper end of a shaft 337 rotatable in another vertical tubular post 339 extending up from frame 27. Each stop 77 and 79 has a flat upper surface 341 engageable by the respective finger 73*a*, 75*a*, and a hook formation 343 adapted to hook over the respective finger. Shaft 333 has a triangular plate crank 345 at its lower end, and shaft 337 has a crank 347 at its lower end (see FIG. 4). These cranks are interconnected by a link 349. Mechanism is provided for rotating stops 77 and 79 in unison between a fully retracted position wherein they are completely clear of fingers 73*a* and 75*a* (see FIG. 29), an intermediate position wherein the fingers are engageable with the flat upper surfaces 341 of the stops (see FIG. 28) and a completely closed position wherein hooks 343 are hooked over the fingers to lock them down (see FIGS. 2 and 3). This mechanism includes a lever 351 (see FIG. 4) pivoted at 353 underneath a strap 355 extending between the center rail 39 and the bar 36*b* of rear rail 36 of the frame 27. Lever 351 is connected by a link 357 to the crank 345 at the lower end of shaft 333. A spring 359 connected to lever 351 biases the lever to swing clockwise as viewed from above, and acts through the lever 351, the link 357, the crank 345, the link 349 and the crank 347 to tend to swing both stops 77 and 79 to their stated completely closed position. This is determined by engagement of link 349 with the lower portion 335*a* (see FIG. 5) of left-hand post 335.

A first vacuum cylinder CM1 (see FIG. 4) is provided for swinging lever 351 counterclockwise (against the bias of spring 359) through an angle such as to swing the stops 77 and 79 from their completely closed hooking position to their intermediate position. A second vacuum cylinder CF1 is provided for swinging lever 351 counterclockwise through a further angle for swinging the stops 77 and 79 from their intermediate position to their open retracted position. Cylinder CM1 comprises an open-ended sheet metal cylinder having one end fitted in air-tight manner in a rubber cup 367 having a port 369. Cup 367 is mounted in a bracket 371 extending down from the rear rail of frame 27 (see FIGS. 6 and 9). A piston 373 is slidable in cylinder CM1. A rod 375 extending from piston 373 has a lost-motion connection as indicated at 377 with lever 351. Cylinder CF1 comprises an open-ended sheet-metal cylinder longer than cylinder CM1 having one end fitted in air-tight manner in a rubber cup 381 having a port 383. Cup 381 is mounted in a bracket 385 attached to the center rail of frame 27 (see FIG. 9). A piston 387 is slidable in cylinder CF1. A rod 389 extending from piston 387 has a lost-motion connection as indicated at 391 with lever 351. The arrangement is such that when a vacuum is drawn in cylinder CM1, lever 351 is swung counterclockwise through such an angle as to swing the stops 77 and 79 from their completely closed hooking position to their intermediate position. When a vacuum is drawn in cylinder CF1, lever 351 is swung further counterclockwise to swing the stops 77 and 79 from their intermediate to their open position.

The turntable flywheel 55 serves as a friction gear in a turntable drive 393 which is adapted to drive the turntable 53 clockwise as viewed from above whether the turntable is inverted or upright. The turntable drive 393 includes the aforesaid driving wheel 81 (which may be a rubber wheel) which engages the flywheel when the turntable is in inverted playing position (see FIG. 2) and the driving wheel 83 (which may also be a rubber wheel) which engages the flywheel when the turntable is in upright position (see FIG. 3). The turntable drive 393 includes an electric motor TM having a top plate 394 suspended as indicated at 395 underneath a frame plate 397 adjacent the right front corner of frame 27. The shaft 399 of the motor extends up through an opening in the plate 394 and has a friction pinion 401 (see FIGS. 4 and 18–20) secured on its upper end. The lower portion of pinion 401 is accommodated in a hole in plate 397, and the pinion extends up above the plate 397. A stud 403 extends upward from plate 397. A lever 405 is pivoted on stud 403 immediately above the plate 397 and a lever 407 is pivoted on the stud at its upper end above lever 405. These levers are held apart by a spring 408 on stud 403. The lower lever 405 carries a rubber friction wheel 409 at one end engageable with pinion 401. The upper lever 407 carries a larger rubber friction wheel 411 at one end engageable with pinion 401. A sheet metal casing 412 is mounted on the right front corner plate 41 of frame 27. A countershaft 413 extends vertically within this casing, being journalled in rubber-mounted bearings such as indicated at 415 at top and bottom of the casing. Countershaft 413 extends down through a hole in corner plate 41 and has a friction gear cluster 419 secured on its lower end. This cluster comprises a large gear 421 engageable by the small rubber wheel 409 and a small gear 423 engageable by the large rubber wheel 411. Lever 405 is biased by a spring 425 to swing rubber wheel 409 into engagement with pinion 401 and gear 421, and lever 407 is biased by a spring 427 to swing wheel 411 into engagement with pinion 401 and gear 423.

The lower lever 405 has an upwardly extending pin 429 at its other end from rubber wheel 409, and the upper lever 407 has a downwardly extending pin 431 at its other end from rubber wheel 411. A stud 433 extends up from plate 397 adjacent stud 403 and has a speed selector cam lever 435 pivoted thereon. Speed selector lever 435 (which may be made of two sheet metal stampings spot-welded together) has an upper cam 437 having a narrow notch 439 and a lower cam 441 having a wide notch 443. Pin 429 engages the lower cam 441 and pin 431 engages the upper cam 437. Speed selector lever 435 normally occupies the neutral position in which it appears in FIG. 4. For playing a 12 inch 33 r.p.m. record, it is moved to the position shown in FIGS. 18 and 20. When a 10 inch 33 r.p.m. record is to be played, lever 435 is rotated to its FIG. 30 position. When a 7 inch 45 r.p.m. record is to be played, lever 435 is rotated to its FIG. 23 position. In either the 12 inch record position or the 10 inch record position, pin 429 is adapted to drop into the notch 443. In the 7 inch record position, pin 429 is adapted to drop into the notch 439. When pin 431 drops into notch 439, lever 407 swings clockwise as viewed from above for engagement of wheel 411 with gear 423. This establishes a drive for countershaft 413 from pinion 401 such as to obtain a turntable speed of 45 r.p.m. When pin 429 drops into notch 443, lever 405 swings clockwise as viewed from above for engagement of wheel 409 with gear 421 (see FIG. 20). This establishes a drive for countershaft 413 from pinion 401 such as to obtain a turntable speed of 33 r.p.m.

The vertical countershaft 413 has a friction pinion 445 thereon at its upper end above casing 412 engageable by the upper wheel 81 and a lower friction pinion 447 within casing 412 engageable by the lower wheel 83 (see FIGS. 4, 9, 21 and 22). Wheels 81 and 83 are mounted in vertically spaced relation on a lever 449 (see FIGS. 7, 9, 21 and 22) which is fixed on a vertical shaft 451 mounted within casing 412 for rotation on a vertical axis adjacent countershaft 413. Lever 449 has upper and lower horizontal plate parts **449*a* and 449*b*. A spring 453 (see FIG. 21) biases lever 449 to swing clockwise as viewed from above, which is in the direction for engagement of wheel 81 or wheel 83 with the flywheel 55. Wheel 81 is mounted on an arm 455 pivoted for swinging on a vertical axis at 457 above the upper plate part 449*a* of lever 449, and wheel 83 is mounted on an arm 459 pivoted for swinging on a vertical axis at 461 below the lower plate part 449*b* of lever 449. A vacuum cylinder CM2 is provided within casing 412 for retracting lever 449 and wheels 81 and 83 against the bias of spring 453. This cylinder comprises an open-ended sheet metal cylinder having one end fitted in air-tight manner in a rubber cup 467 having a port 469. A piston 471 is slidable in cylinder 465 and is connected by a bead chain 473 to a crank 475 secured to shaft 451. A spring 476 in cylinder CM2 biases piston 471 outward. Swinging of arm 455 is limited by engagement of a pin 477 thereon with the edge of a hole 479 in part 449*a* of lever 449. Swinging of arm 459 is limited by engagement of a pin 481 thereon with the edge of a hole 483 in part 449*b* of lever 449**.

A tone arm supporting plate 485 (see FIG. 6) is mounted at the right rear corner of frame 27. This plate is part of a sheet metal stamping which includes a vertical mounting flange 487 extending up from the main frame 27. Plate 485 is braced by a post 491. A two-part sleeve 493 is fixed in vertical position in a hole in plate 485 as shown in FIG. 24. The upper part of the sleeve is designated **493*a*, and the lower part is designated 493*b*. A pivot block 495 is mounted for rotation on the upper part 493*a* of the sleeve above plate 485, being rotatable on the vertical axis of the sleeve. The tone arm 57 is pivotally mounted as indicated at 497 on block 495 for swinging movement on a horizontal axis offset from the vertical axis of the sleeve. A tone arm lifter and return rod 499 is vertically slidable and rotatable in the sleeve and has a head 501 at its upper end. This head 501 is adapted for engagement with a lug 505 (see FIGS. 24 and 25) on the pivot block 495. A plate 507 (see FIGS. 6, 26 and 27) is mounted on top of the right rear corner plate 43 of main frame 27. A stud 509 extending upward from plate 507 has a lever 511 pivoted for swinging movement thereon at its upper end. This lever 511 is biased clockwise (as viewed from above) by a spring 513 toward a retracted position determined by its engagement with a stop 515. Lever 511 is formed with a cam surface 517 adapted on counterclockwise movement thereof from its retracted position quickly to lift the rod 499. A ball thrust bearing 519 is interposed between the lower end of the rod 499 and the cam surface 517. On lifting of the rod 499, the tone arm swings upward. An arm 521 pivoted at 523 on a bracket 525 rotary on the upper end of the sleeve 493** is interposed between the upper end of the rod and the tone arm.

Lever 511 is adapted to be swung counterclockwise away from its retracted position by a vacuum cylinder CM3 mounted in horizontal position on a vertical ear 531 formed on plate 507. Stop 515 is part of this ear. A piston 533 is slidable in the cylinder and connected as indicated at 535 to lever 511. Cylinder CM3 has a port 537 connected into the vacuum system of the record player. The arrangement is such that when a vacuum is drawn in cylinder CM3 via port 537, piston 533 moves inward in cylinder 529 to rotate lever 511 counterclockwise away from its retracted position against the bias of return spring 513. When cylinder CM3 is vented via port 537, spring 513 returns lever 511 to its retracted position. Rod 499 has a radial arm 539 adjacent its lower end below the lower end of sleeve 493. This arm extends between a pair of upwardly extending tangs 541 and 543 on lever 511.

A position arm 545 (see FIGS. 4, 6, 7, 9, 23, 26 and 30) is provided for swinging the tone arm 57 inward to start the playing of a record. This position arm has a hub 547 rotatable on the lower part **493*b* of sleeve 493 below plate 489. It is biased by a spring 549 (see FIGS. 6 and 26) to swing counterclockwise as viewed from above to the retracted position in which it appears in FIGS. 4 and 26. It has an upwardly extending post 551 adjacent its outer end carrying an adjustablly mounted tone arm pusher 553. This pusher is engageable with the tone arm to swing the tone arm inward toward a record (clockwise) when the position arm swings clockwise away from its FIG. 4 retracted position. The position arm is adapted to be swung clockwise away from its retracted position against the bias of the position arm return spring 549 by a vacuum cylinder CG mounted in horizontal position an an angled ear 557 on flange 487. A piston 559 is slidable in the cylinder and is connected as by means of a bead chain 561 to a member 563 extending down from the position arm. Spring 549 is connected between member 563 and a stud 565 extending down from plate 485. Cylinder CG has a port 567 connected into the vaccum system of the record player. The arrangement is such that when a vacuum is drawn in cylinder CG via port 567, piston 559 moves inward to rotate the position arm 545 clockwise about the axis of sleeve 493 away from its retracted position of FIGS. 4 and 26 against the bias of spring 549. When cylinder CG is vented via port 567, spring 549** returns the position arm to its retracted position.

Member 563 has a pin 569 (see FIGS. 6 and 27) extending down from its lower end through a slot 570 in the right rear corner member of frame 27. A lever 571 (see FIGS. 4, 18 and 19) is pivoted on stud 433 above speed selector cam lever 435. A link 573 extends from pin 569 to a pin connection at 575 with lever 571. Link 573 has a finger **573*a* for actuating a switch 576 carried by the rear rail 36*b* adjacent the right rear corner of frame 27 (see FIGS. 4, 23, 30 and 48). Switch 576 is held closed by finger 573*a* when the position arm 545 is retracted, and opens when the position arm swings inward. Speed selector lever 435 has a pin 577 extending upward into an arcuate slot 579 in lever 571, providing a lost-motion connection between lever 571 and lever 435. A lever 581 consisting of an upper plate 583 and a lower plate 585 connected by a web 587 is also pivoted on stud 433 with the lower plate 585 below the speed selector lever 435 and the upper plate 587 between the lever 435 and the lever 571. A link 589 has one end pin-connected at 591 to crank 345 and has a pin and slot connection 593 at its other end with lever 581. Lever 581 normally occupies the retracted position shown in FIGS. 4 and 20, and is swung counterclockwise away from this position upon full operation of crank 345 by cylinder CF1. Its upper plate 583 and lower plate 585 have cam edges 583***a* and 585*a* adapted upon such swinging thereof to engage pins 429 and 431 on levers 405 and 407 to swing the latter counterclockwise as viewed in FIGS. 18 and 20 to a retracted position wherein wheels 409 and 411 are out of engagement with gears 421 and 423.

Position arm 545 carries a normally closed switch 595 at its outer end, and has an arm 597 pivoted at 599 thereon for actuating the switch. This switch-actuating arm 599 is normally held out away from the position arm 545 by inherent spring bias in switch 595. Switch-actuating arm 599 has an upwardly extending finger 601 (see FIG. 7) at its free end engageable with the edge of a record on the turntable 53. Position arm 545, when actuated by vacuum motor CG, swings in to the point where finger 601 engages the edge of the record on the turntable, and switch 595 is thereby opened. This initiates certain operations to be described including retraction of the position arm. The position arm swings inward through a first and small angle before finger 601 engages the edge of a twelve-inch 33 r.p.m. record, and through a second and greater angle before finger 601 engages the edge of a ten-inch 33 r.p.m. record, and through a third and still greater angle before finger 601 engages the edge of a seven-inch 45 r.p.m. record.

When the position arm 545 swings inward, link 573 moves forward and rotates lever 571 clockwise. In the case of a 12-inch record carried by the turntable, the angle of swing is such as to swing speed selector lever 435 clockwise from its FIG. 4 neutral position to its 12-inch 33 r.p.m. position of FIGS. 18 and 20. In the case of a 10-inch record, the angle of swing is such as to swing speed selector lever clockwise to its 10-inch 33 r.p.m. position (FIG. 30). In the case of a 7-inch 45 r.p.m. record, the angle of swing is such as to swing speed selector lever 435 clockwise to its 7-inch 45 r.p.m. position (FIG. 23).

At the conclusion of playing a record, vacuum is transmitted to cylinder CM3 thereby to swing lever 511 counterclockwise away from its FIG. 27 retracted position. Cam surface 517 on lever 511 quickly lifts the rod 499 thereby swinging the tone arm upward to lift the needle N carried by the tone arm out of the groove in the record. FIG. 24 shows rod 499 lifted and the tone arm swung up. As the lever 511 continues its counterclockwise swing, tank 541 on lever 511 engages arm 539 on rod 499 and rod 499 is thereby rotated counterclockwise as viewed from above. Head 501 at the upper end of rod 499, rotating counterclockwise with the rod, engages lug 505 on the pivot block 495, and swings the tone arm counterclockwise as viewed from above back to the retracted position in which it appears in FIG. 4. At the start of the next play, vacuum is transmitted to the position arm cylinder CG to swing the position arm 545 inward (i.e., clockwise as viewed from above). Cylinder CG is of larger diameter than cylinder CM3 for actuating lever 511. Accordingly, the position arm 545 acts to swing the tone arm clockwise into position for starting the next play. Rod 499 still being on the high point of cam surface 517, the tone arm is raised. As the tone arm swings clockwise, rod 499 is rotated clockwise by reason of engagement of lug 505 with the head 501. Arm 539 on rod 499, in engagement with tank 541, swings lever 511 back clockwise, so that the high point of the cam surface 517 remains under rod 499. Both cylinders are vented, as will be made clear, when the needle is properly positioned for descending into the groove of the record. When this venting occurs, the position arm 545 swings back, lever 511 swings back, and rod 499 is permitted to lower to permit the tone arm gently to lower and drop the needle on the record.

Braking means is provided for preventing drifting of the tone arm 57. This comprises a brake lever 603 (see FIGS. 4, 23–25 and 30) pivoted at 605 on plate 485 carrying a brake shoe 607 engageable with block 495. The brake lever has an arcuate slot 609. A brake control lever 611 is pivoted at 605 above brake lever 603. It carries a stud 613 extending down into slot 609. A spring 614 is connected between the upper end of stud 613 and brake lever 603. Control lever 611 has a forked end receiving a pin 617 extending upward from position arm 545 through an arcuate slot 619 in plate 485. The arrangement is such that when the position arm is in retracted position, brake shoe 607 is released (see FIG. 4), and when the position arm swings inward away from retracted position, brake shoe 607 is applied (see FIGS. 23 and 30).

A switch plate 621 (see FIGS. 4, 7, 9, 23 and 30) is pivoted at 623 on plate 485. This carries a normally open tone-arm controlled end of play switch 625 and a pivoted actuator 627 for the switch. Actuator 627 is adapted for engagement by one or the other of two screws 629 and 631 on a trip arm 633 extending from block 495 at the end of play of a 33 r.p.m. record or a 45 r.p.m. record. Plate 621 normally occupies the retracted position in which it appears in FIGS. 4 and 30, wherein actuator 627 is in the arcuate path of screw 629 on trip arm 633, and remains in this position on playing a 33 r.p.m. record (either a ten-inch or twelve-inch record). However, when a 45 r.p.m. (seven-inch) record is played, plate 621 is swung to the FIG. 23 position wherein actuator 627 is the arcuate path of screw 631 on trip arm 633. This is accomplished by the provision of a cam edge 634 on plate 621 engageable by pin 617 as position arm 545 swings in to initiate play of a 45 r.p.m. record. At the start of play of a 33 r.p.m. record, tone arm 57 and trip arm 633 occupy a position such as shown in FIG. 30. As the record is played, the tone arm is swung clockwise as viewed from above by the tracking of the tone arm needle in the record groove. When the needle enters the terminating spiral portion of the groove, the tone arm is quickly swung inward, and screw 629 on trip arm 633 (which swings clockwise with the tone arm) engages actuator 627 and closes switch 625. When position arm 545 swings inward to position the tone arm for playing a 45 r.p.m. record, pin 617 engages cam edge 634 on plate 621 and swings this plate to the 45 r.p.m. position shown in FIG. 23. At the end of play of the 45 r.p.m. record, screw 631 on trip arm 633 engages actuator 627 and closes switch 625. Each of screws 629 and 631 is adjustable in the trip arm for accurately controlling the tripping of switch 625 to occur at the end of play of any record.

Arm 105 on crossbar 49 of yoke 25 has a shoulder 641 engageable with a retractable stop 643 (see FIGS. 10 and 14) on counterclockwise swinging of the yoke as viewed from the front of the record player to determine the transition (upright) position of the yoke. This stop 643 is constituted by a plunger vertically slidable in a vacuum cylinder CF2 mounted on a bracket 645 carried by plate 127. Stop 643 is spring-biased upward and is retracted downward clear of shoulder 641 when a vacuum is drawn in the lower end of cylinder CF2 through a port 647 connected into the vacuum system of the record player.

A rod 649 (see FIGS. 10, 11 and 13) extends between the front and central rails 35 and 39 below and offset to some extent from shaft 165. A lever 651 for latching the turntable cradle 51 in inverted position is pivoted on this rod (see FIGS. 10, 11 and 13). Lever 651 has a shoulder 653 engageable with pin 201 for this purpose. A plunger 655 vertically slidable in a vacuum cylinder CB2 is connected to latching lever 651 as indicated at 659. Plunger 655 is spring-biased upward to bias latching lever 651 to latching position. Plunger 655 moves downward to retract latching lever 651 when a vacuum is drawn in the lower end of cylinder CB2 via a port 661 connected into the vacuum system of the record player. Cylinder CB2 is mounted on a bracket 663 carried by the front rail 35.

A switch 665 (see FIGS. 11, 13, 31 and 32) is mounted on a support 667 carried by bracket 97. This switch is a normally open switch, and has a long flexible blade 669 engageable by an insulation stud 671 (see FIG. 10) on hub 673 of arm 103 of the yoke 25. The length of blade 669 and the path of stud 671 are such that when the yoke swings to the right to record-dropping position, stud 671 first engages the upper end of the blade, bends the blade back, then rides off the upper end of the blade and becomes positioned at the back of the blade. Then, when the yoke swings toward the left, the stud engages the back of the blade and bends the blade to effect closure of switch 665 to stop the record player as will appear. Three cam-actuated levers 675, 677 and 679 are pivoted on rod 649. Lever 675 is actuable by cam lobes 681 and 683 on hub 673 of arm 103. These lobes are located on opposite sides of hub 673. Lever 677 is actuable by a lobe 685 on the bottom of hub 673. Lever 679 is actuable by a cam 687 fixed on shaft 165 inside of hub 673. Cam 687 consists of a collar fixed on shaft 165 by a screw 689, the head of the screw constituting a cam lobe. The function of these levers will be subsequently described in the description of the vacuum system of the record player.

As previously pointed out, both record centering pins 15 and 21 were vertically movable and spring-biased upward. As shown in FIGS. 33 and 34, pin 15 is slidable in holes in the top and bottom flanges of a C-section bracket 691. The top flange of this bracket is secured to the bottom of the web of the channel-section central rail 39. Pin 15 extends up through a hole in this web. A spring 693 reacting from the bottom flange of the bracket 691 against a collar 695 on the pin biases the pin upward to the raised position of FIG. 33. A lateral stud 697 on the pin slides in a vertical slot 699 in the bracket for guiding purposes. Mounted on a support 701 alongside bracket 691 is a vacuum valve generally designated 703 having upper and lower ports 705 and 707, and including a vertically slidable D-valve member 709. A lever 711 for operating member 709 is pivoted at 713 in bracket 691. This lever is engageable by stud 697. When pin 15 and stud 697 are raised, lever 711 and member 709 are raised. The upper port 705 is then blocked, and the lower port 707 is then open to atmosphere. Pin 15 is moved downward by engagement therewith of center screw 257 on the turntable 53 when, with the latter inverted, the yoke 25 swings over to pick up a record from the supply stack. Lever 711 has a cam formation 714 engageable by stud 697 when pin 15 moves downward to swing lever 711 downward and drive D-valve member 709 to a position interconnecting ports 705 and 707. As shown in FIG. 33A, record centering pin 21 is mounted in the same manner as pin 15, and controls a valve 715 identical to valve 703. Pin 21 is shown down in FIG. 33A.

An empty stack switch 717 is mounted under central rail 39 adjacent pin 15 (see FIG. 33). This has an operating button 719 which extends up through a hole in rail 39 for engagement by the lowermost record of the supply stack. Button 719 is held down to hold switch 717 open until the last record is picked up, and then switch 717 closes.

Figure 7:
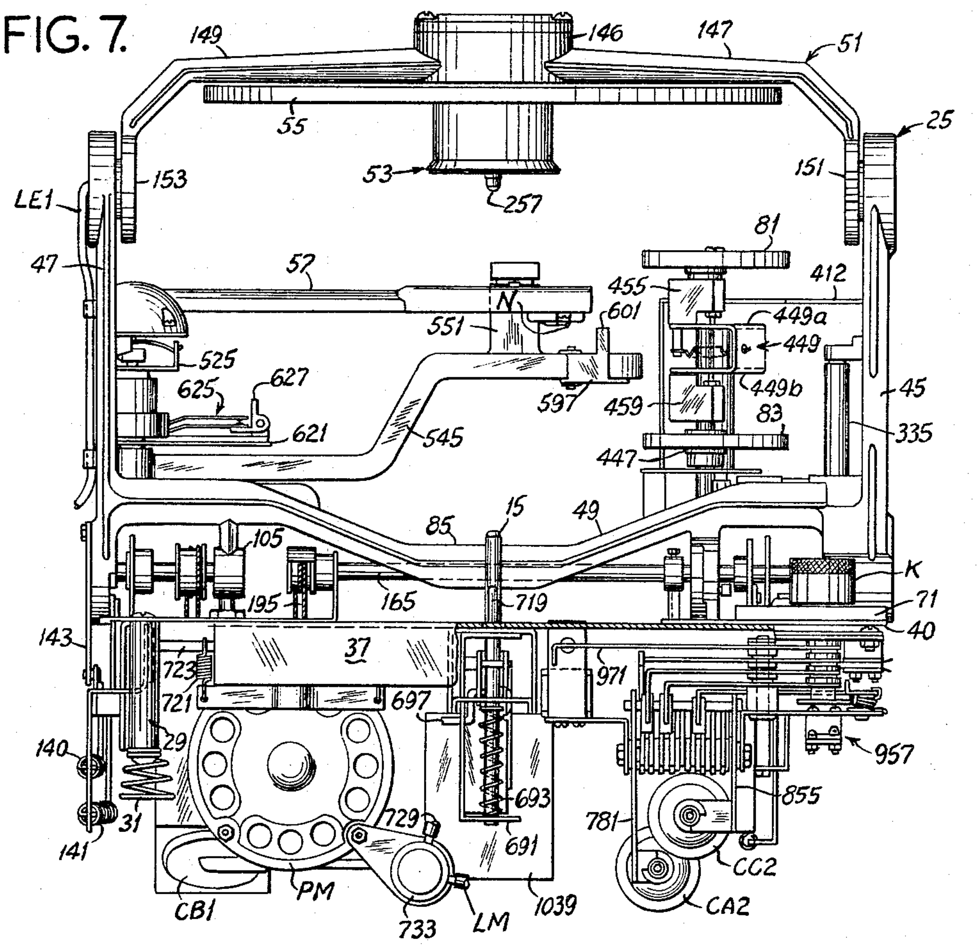
FIG. 7 (Sheet 7) is a left end elevation of FIG. 4.

The vacuum system of the record player comprises a rotary vacuum pump P driven by an electric motor PM (see FIGS. 6, 7 and 49). The pump-motor assembly is suspended by means of springs 721 from rods 723 extending between the center rail 39 and the rear rail 36*a* adjacent the left rear corner of frame 27 (see FIGS. 6 and 7). The pump is of a type having a cylinder and an eccentric rotor in the cylinder with an inlet or vacuum port 725 and an outlet or exhaust port 727. Lines 729 and 731 interconnect these ports and a combination quick vent and muffler valve 733 (see FIGS. 4, 7, 49 and 50). As shown in FIG. 50, this valve comprises a cup 735 closed by a body 737. The latter has an axial passage 739 extending from the interior of the cup to two radial ports 741 and 743. At the inner end of the passage 739 is a valve seat 745. A piston 747 slidable in the cup carries a check pin guide 749. A check pin 751 is slidable in this guide and is biased toward an extended position by a spring 753. Cup 735 has an inlet 755 at its end opposite body 737. It also has radial exhaust ports 757 covered by a rubber exhaust band 759, and a main line vent 761.

Line 729 interconnects pump vacuum port 725 and valve port 741. A main vacuum line LM is connected to valve port 743. Line 731 interconnects the pump exhaust port 727 and valve inlet 755. The arrangement is such that, when pump P is put into operation, the exhaust from pump P is delivered via line 731 to cup 735 on the right of piston 747. This forces piston 747 forward, compressing spring 753 and seating pin 751 against seat 745 to block axial passage 739. A vacuum is then drawn in line 729 and main vacuum line LM (which are directly interconnected via passage 739). With piston 747 forward, exhaust ports 757 are exposed on the inlet (right) side of the piston. Air pressure in cup 735 on the inlet side of the piston lifts the rubber band 759 for muffled exhaust of air from the pump. When the pump stops, band 759 seals the exhaust ports. Vacuum from main line LM passes through line 729, the pump and line 731 to inlet 755. Piston 747 is then quickly retracted, opening passage 739 and allowing the main line LM to vent to atmosphere via main line vent 761.

Secured to the front side of center rail 39 toward the left end of the frame 27 is a relatively wide U-shaped bracket 765 (see FIG. 4). A valve mounting plate 767 (see FIGS. 4 and 35–38) extends down from bracket 765. Plate 767 has a forwardly extending step 769 and an apron 771 extending down from the step. Apron 771 has forwardly extending portions 773 at its ends and flanges 775 on portions 773. It also has seven slots 777 extending up from its lower edge. Vertically slidable in these slots are valve bodies 779 of seven valves A, B, C, D, E, F and G (see FIGS. 36 and 49). Each valve is of circular shape, having slotted sides receiving the margins of apron 771 at opposite sides of the slots. A plate 781 spans apron flanges 775, closing the front of the apron. A D-valve guide plate 783 is mounted in the space between apron 771 and plate 781. This has vertical slots 785 in which D-valve members 787 (see FIG. 38) of valves A–G are vertically slidable. Each valve body 779 has upper and lower ports 789 and 791. The D-valve member of each valve is vertically slidable on the forward face of the respective valve body between a lowered position wherein ports 789 and 791 are interconnected and a raised position wherein the upper port 789 is blocked and the lower port 791 is open to atmosphere. Each valve body 779 is held between a screw 793 threaded in step 769 and a spring 795 reacting upward from a bottom flange 797 on plate 781, and is adjustable vertically in its slot 777 by turning the screw 793. This enables precise positioning of the valve bodies 779.

The D-valve members 787 are pressed against the faces of valve bodies 779 by spring arms 803 on a spring strip 805 (see FIG. 38). Each D-valve member has an upward extension 807 having a slot 809 receiving a pivoted actuating wire, the wires being designated WA, WB, WC, WD, WE, WF and WG to relate them to valves A–G. Each of these wires has end pivot portions 811 and 813 and an offset intermediate crank portion 815. The pivot portions 811 are received in holes in the apron 771 and the end pivot portions 813 are received in holes in a front plate 817 which extends down from the front rail 35. The crank portions 815 of the wires extend through the slots 809 in the D-valve members 787, and are actuable by a series of slidable cams C1–C9 for actuating the D-valve members.

Each of the cams C1–C9 consists of a flat bar (see FIG. 41). The cams C1–C9 are mounted for horizontal sliding movement in vertical planes extending endwise of the record player by means of rods 819 and 821 extending through elongate horizontal slots 823 and 824 at the ends of the cams. Rods 819 and 821 extend between plates 783 and 817. The cams are located side-by-side closely adjacent one another, suitable spacers such as indicated at 825 being provided on rods 819 and 821 for spacing the cams. Each cam has a series of seven slots therein for receiving wires WA–WG, the seven slots in cam C1 being designated C1A–C1G, the seven slots in cam C2 being designated C2A–C2G, etc. The crank portion 815 of wire WA extends through the "A" slots in the cams, the crank portion 815 of wire WB extends through the "B" slots in the cams, etc. Wires WB, WD, WE and WG are biased to swing downward by springs such as indicated at 826.

As shown in FIG. 41, all the cams C1–C9 are in their right-hand position, which is their position while the first side of a record is being played. Each cam is slidable toward the left from its right-hand position and back toward the right. In cam C1, slots C1C and C1D are what may be termed "prevent" slots, being formed to allow wires WC and WD to swing down when the cam C1 is toward the right and to block these wires in raised position and prevent them from swinging down when cam C1 is toward the left. Slots C1A, C1B and C1E–C1G are simply large passage slots for wires WA, WB and WE–WG. In cam C2, slot C2E is a single-acting cam slot formed to raise wire WE when cam C2 is moved toward the right and to unblock wire WE when cam C2 is toward the left. Slot C2G is a prevent slot formed to unblock wire WG when cam C2 is toward the right and to block wire WG up when cam C2 is toward the left. Slots C2A–C2D and C2F are simply large passage slots for wires WA–WD and WF. In cam C3, slot C3D is what may be termed a "single-acting cam slot" formed to raise wire WD when cam C3 is moved toward the right and to unblock wire WD when cam C3 is toward the left to allow it to be pulled down by the respective spring 826. Slot C3G is a prevent slot formed to unblock wire WG when cam C3 is toward the right and to block wire WG in raised position and prevent it from swinging down when cam C3 is toward the left. Slots C3A–C3C, C3E and C3F are simply large passage slots for wires WA–WC, WE and WF. In cam C4, slot C4A is a double-acting cam slot formed to push wire WA down on movement of cam C4 to the left, and to raise wire WA on movement of cam C4 to the right. Slot C4B is a single-acting cam slot formed to raise wire WB when cam C4 is moved toward the left, and to unblock wire WB when cam C4 is toward the right. Slots C4C–C4G are simply large passage slots for wires WC–WG. In cam C5, slot C5B is a single-acting cam slot formed to raise wire WB when cam C5 is moved toward the right and to unblock wire WB when cam C5 is toward the left. Slots C5A and C5C–C5G are simply large passage slots for wires WA and WC–WG. In cam C6, all seven slots C6A–C6G are simply large passage slots for wires WA–WG. In cam C7, slot C7C is a double-acting cam slot formed to push wire WC down on movement of cam C7 to the left, and to raise wire WC on movement of cam C7 toward the right. Slot C7D is a present slot formed to unblock wire WD when cam C7 is toward the right and to block wire WD up when cam C7 is toward the left. Slots C7A, C7B and C7E–C7G are simply large passage slots for wires WA, WB and WE–WG. In cam C8, slot C8F is a double-acting cam slot formed to push wire WF down on movement of cam C8 toward the left, and to raise wire WF on movement of cam C8 toward the right. Slot C8G is a prevent slot formed to unblock wire WG when cam C8 is toward the right and to block wire WG up when cam C8 is toward the lift. Slots C8A–C8E are simply large passage slots for wires WA–WE. In cam C9, slot C9G is a single-acting cam slot formed to raise wire WG when cam C9 is moved toward the right and to unblock wire WG when cam C9 is toward the left. Slots C9A–C9F are simply large passage slots for wires WA–WF.

From the above (and as will appear from FIG. 41), it will be observed that wire WA is controlled solely by cam C4, being cammed downward by slot C4A to actuate valve A on movement of cam C4 to the left, and being cammed upward by slot C4A to deactuate valve A on movement of cam C4 to the right. Wire WB is controlled by cams C4 and C5, which have the oppositely arranged single-acting cam slots C4B and C5B. Wire WB will be pulled down by the respective pull-down spring 826 to actuate valve B on movement of cam C5 to the left with cam C4 in right-hand position, or on movement of cam C4 to the right with cam C5 in left-hand position, and cammed back up on movement of cam C5 to the right or C4 to the left. Wire WC is controlled by cams C1 and C7. It is cammed downward to actuate valve C by slot C7C on movement of cam C7 to the left, cam C1 being in its right-hand position for unblocking of wire WC at slot C1C, and cammed upward to deactuate valve C on movement of cam C7 to the right. Wire WD is controlled by cams C1, C3 and C7, cam C1 having prevent slot C1D, cam C3 having single-acting cam slot C3D, and cam C7 having prevent slot C7D arranged the same as slot C1D, but opposite to slot C3D. Thus, wire WD is pulled down by the respective pull-down spring 826 to actuate valve D on movement of cam C3 to the left when cams C1 and C7 are in their right-hand position, but is blocked up if either C1 or C7 should be in its left-hand position, and is cammed up to deactuate valve D on movement of cam C3 to the right. Wire WE is controlled solely by cam C2, having single-acting cam slot C2E, being pulled down to actuate valve E on movement of cam C2 to the left and being cammed up to deactuate valve E on movement of cam C2 to the right. Wire WF is controlled solely by cam C8, being cammed downward by slot C8F to actuate valve F on movement of cam C8 to the left, and being cammed upward to deactuate valve F on movement of cam C8 to the right. Wire WG is controlled by cams C2, C3, C8 and C9, cam C2 having prevent slot C2G, cam C3 having prevent slot C3G, cam C8 having prevent slot C8G and cam C9 having single-acting cam slot C9G. Thus, wire WG is pulled down by the respective pull-down spring 826 to actuate valve G on movement of cam C9 to the left provided all three of cams C2, C3 and C8 are in their right-hand position. Otherwise, wire WG is blocked up. Wire WG (if down) is cammed up by slot C9G on movement of cam C9 to the right to deactuate valve G.

Cams C1–C9 additionally have slots C1H–C9H adjacent their right ends (inward of slots 824) receiving crank portion 815 of a blocking wire WH. This wire is similar to valve-actuating wires WA–WG, but has no valve associated therewith. It is provided for locking cam C7 in its right-hand position at a certain point in the cycle of operation as will be made clear. For this purpose, slot C7H is formed with a shoulder 828 behind which crank portion 815 of wire WH is adapted to drop to hold cam C7 against movement toward the left. Blocking wire WH is controlled by cam C6, slot C6H in the latter being formed to hold wire WH up when cam C6 is toward the right and to allow wire WH to drop into blocking position on movement of cam C6 toward the left. Slot C6H also functions as a single-acting cam slot, being formed so that wire WH is raised to retracted position on movement of cam C6 to the right.

Cams C2, C3, C6 and C9 are biased to slide toward the right by springs 827, 829, 931 and 833. Cam C2 has a pin and slot connection 835 at its right end with the lower end of cam-actuated lever 675. Cam C3 has a pin and slot connection 837 at its right end with the lower end of cam-actuated lever 677. Cam C6 has a pin and slot connection 839 at its right end with the lower end of cam-actuated lever 679. Lobes 681 and 683 on hub 673 of yoke arm 103 are developed and phased to engage lever 675 when the yoke swings to left or right to within about 35° from the deck 11 or 19, as the case may be, thereby to slide cam C2 to the left. When the yoke is between these left and right 35° positions, cam C2 is released to be slidable toward the right by its return spring 827. Lobe 685 on hub 673 is developed and phased to engage lever 677 when the yoke is from about 15° on one side of vertical to about 15° on the other side of vertical thereby to hold cam C3 in its left-hand position (against the bias of return spring 829 for cam C3). When the yoke swings down more than about 15° either to the left or to the right, lever 677 is released for return of cam C3 to its right-hand position. The screw or lobe 689 is phased to engage lever 679 when shaft 165 rotates clockwise as viewed from the front of the record player to turn the turntable from inverted to upright position thereby to slide cam C6 to the left (against the bias of return spring 831 for cam C6).

A vacuum cylinder CM4 is mounted on a bracket 841 above the series of cam C1–C9 (see FIG. 39). A piston rod 843 extends to the right from piston 845 in this cylinder. Secured to the right end of the piston rod is a U-shaped crosshead 847. Spring 831 for cam C6 is attached to this crosshead. At 849 is indicated a drag link, formed by bending a rod to U-shape. This has inwardly bent end portions 851 which extend through horizontal slots such as indicated at 853 in an upwardly extending portion of plate 781 and an upwardly extending portion of a plate 855 located at the front of the series of cams (see FIGS. 36–40). These inwardly bent end portions 851 are received in holes in the sides of the U-shaped crosshead 847. The left end portion 857 of the drag link 849 is received in a hole 859 in cam C5, and is also engageable with left-facing shoulders 861 and 863 on cams C1 and C4. A coil compression spring 865 surrounds piston rod 843 and reacts from head 867 at the right end of cylinder CM4 against a collar on the piston rod to bias the piston, the piston rod, the crosshead 847 and the drag link 849 to the right, thereby to bias cams C5 and also cams C1 and C4 to the right.

A spring 871 biases cam C7 to the lift. A pin 873 extends forward from cam C2 behind a right-facing shoulder 874 on cam C1, and provides for control of cam C1 by cam C2, being adapted to move cam C1 to the left when cam C2 moves to the left. A pin 875 extends rearward from cam C3 behind a left-facing shoulder 876 on cam C7, and provides for control of cam C7 by cam C3, being adapted to move cam C7 to its right-hand position and hold it there against the bias of spring 871 when cam C3 moves to its right-hand position, and adapted to release cam C7 for movement to the left by spring 871 when cam C3 moves to the left (provided cam C7 is otherwise free to move to the left).

Seven vacuum-actuated diaphragm type motors designated CC2, CD2, CE1, CF3, CD3, CE2 and CA2 are mounted below the series of cams on portions of plates 781 and 855. Diaphragm CC2 has a lost-motion connection 877 with a finger 879 extending down from cam C4 and is thereby adapted when vacuum actuated to pull cam C4 to the left. Diaphragm CC2 operates against the bias of a spring 881. Diaphragm CD2 has a lost-motion connection 883 with a finger 885 extending down from cam C4 and is thereby adapted when vacuum actuated to pull cam C4 to the left. Diaphragm CD2 operates against the bias of a spring 887. Diaphragm CE1 has a lost-motion connection 889 with a finger 891 extending down from cam C4 and is thereby adapted when vacuum actuated to pull cam C4 to the left. Diaphragm CF3 has a lost-motion connection 893 with finger 891 and is adapted when vacuum actuated to pull cam C4 to the right. Diaphragm CD3 has a lost-motion connection 895 with a finger 897 extending down from cam C8 and is thereby adapted when vacuum actuated to pull cam C8 to the left. Diaphragm CE2 has a lost-motion connection 899 with a finger 901 extending down from cam C8 and is thereby adapted when vacuum actuated to pull cam C8 to the right. Diaphragm CA2 has a connection 903 with a finger 905 extending down from cam C9 and is thereby adapted when vacuum actuated to pull cam C9 to the left against the bias of a return spring 907.

The knob K (see FIG. 35) is of cup shape and is mounted on the upper end of a tubular vertical shaft 931 journalled in the top and bottom flanges 933 and 935 of a C-shaped bracket 937 mounted underneath the left front corner plate 40. The shaft carries a spring detent 939 (see FIGS. 35 and 42) adapted to snap into one of five detent openings 941, 943, 945, 947 and 949 in a detent plate 951 mounted on the top flange 933 to determine the five angular positions of the knob wherein index mark 59 on the knob registers with markings 61, 63, 65, 67 and 69. Button KB is slidable up and down in the cup-shaped knob K, and is mounted on the upper end of a rod 953 which is vertically slidable in shaft 931. The lower end of the rod 953 engages blade 955 of a normally open switch 957, the rod and button normally being held up by the spring bias of blade 955. Switch 957 is closed when the button KB is pushed down. It may be referred to as the reject switch.

Shaft 931 carries five cams 961, 962, 963, 964 and 965. A stud 967 extending up from bottom flange 935 of bracket 937 has four cam levers 971, 972, 973 and 974 pivoted thereon for actuation by cams 961, 962, 963 and 964, respectively. A fifth lever 975 is pivoted on a stud 977 extending up from flange 935 for actuation by cam 965. Levers 971, 972, 973 and 974 are biased by return springs 979 to swing counterclockwise as viewed from above to their retracted positions in which they appear in FIGS. 43–46. Lever 975 is biased by a spring 981 to swing clockwise toward cam 965 as viewed from above.

Cam 961 (see FIG. 43) has a single pivoted lobe developed and phased to swing lever 971 clockwise away from a retracted position (against the return spring bias on lever 971) when, in rotating knob K clockwise, index mark 59 on the knob passes marking 69 and approaches marking 61. By the time mark 59 reaches marking 61, lever 971 is returned to retracted position. The rearward end of lever 971 is engageable with a rod 983 which is horizontally slidable in a U-shaped bracket 985 (see FIGS. 35, 43 and 47). When lever 971 is swung clockwise away from its retracted position by cam 961, it drives rod 983 to the right. Rod 983 then closes a normally open switch 987 mounted on the right side of bracket 985. Rod 983 is biased toward the left by the spring bias of switch 987. An electromagnetic coil 989 is mounted within bracket 985. This controls an armature 991 pivoted at 993 on the bracket. Armature 991 is biased to swing up by a spring 995. It has a lug 997 engageable behind a collar 999 on rod 983 to latch the rod forward and hold switch 987 closed. Coil 989, when energized, draws the armature 991 down to retract lug 997 from behind the collar to allow rod 983 to return to the left thereby to allow switch 987 to open.

Cam 962 (see FIG. 44) has a single pointed lobe developed and phased to swing lever 972 clockwise away from its retracted position (against the return spring bias on lever 972) when, in rotating knob K clockwise, index mark 59 moves from marking 67 to 69 and to allow lever 972 to return to retracted position when index mark 59 moves past marking 69. Lever 972 actuates a slide 1001 which controls the blocking wire WH. When lever 972 swings clockwise away from retracted position, slide 1001 is driven to the right. Slide 1001 has a step 1003 which then comes under wire WH to block it against swinging down. When lever 972 is retracted, slide 1001 is drawn back to the left to unblock wire WH.

Cam 963 (see FIG. 45) has a broad lobe developed and phased to swing lever 973 clockwise away from its retracted position (against the return bias on lever 973) to an operative position when, in rotating knob K clockwise, index mark 59 moves from marking 61 to marking 63. It holds lever 973 in operative position when index mark 59 moves from marking 63 to marking 65, then releases lever 973 to allow it to return to retracted position when index mark 59 passes on by marking 65. Lever 973 has a finger 1005 at its rearward end engageable by an ear 1007 at the left end of cam C8 to block cam C8 from moving to the left when lever 973 is in its operative position (as it is when index mark 59 is on either marking 63 or marking 65).

Cam 964 (see FIG. 46) has a broad lobe 1009 and a pointed lobe 1011. These are developed and phased so that lever 974 swings clockwise away from its retracted position (against the return bias on lever 974) to an operative position when, in rotating knob K clockwise, index mark 59 moves from marking 69 to marking 61, moves back to retracted position as index mark 59 moves past marking 61, comes back into operative position as index mark 59 comes into register with marking 65, stays in operative position as index mark 59 moves from marking 65 to marking 67, and moves back to retracted position as index mark 59 moves past marking 67. Lever 974 has a finger 1013 at its rearward end engageable by an ear 1015 at the left end of cam C7 to block cam C7 from moving to the left when lever 974 is in operative position (as it is when index mark 59 is on marking 61, 65 or 67).

Cam 965 (see FIG. 46) has two diametrically opposite pointed lobes 1017 and 1019. These are phased so that lever 975 is allowed to swing clockwise under the bias of spring 981 when, in rotating knob K clockwise, index mark 59 moves from marking 69 to marking 61, is swung counterclockwise as mark 59 moves past marking 61, returns clockwise as mark 59 comes into register with marking 65, and is again swung counterclockwise as mark 59 moves from marking 67 to marking 69. Lever 975 is a bell crank lever having an arm 1021 extending toward the left and an arm 1023 extending rearward. Arm 1021 has an upwardly extending finger 1025 at its free end adapted for engagement in a notch 1027 in lever 974. When knob K is turned clockwise to bring mark 59 from marking 69 to marking 61, lever 974 swings clockwise to its operative position, and lever 975 swings clockwise to enter finger 1025 in notch 1027. This latches lever 974 in operative position when index mark 59 is on marking 61. As mark 59 moves past marking 61, lever 975 is cammed counterclockwise, withdrawing finger 1025 from the notch to allow lever 974 to move to its retracted position. As mark 59 moves from marking 63 to marking 65, lever 974 again swings clockwise to its operative position, and lever 975 swings clockwise to enter finger 1025 in notch 1027. This again latches lever 974 in operative position when index mark 59 is on marking 65. As mark 59 moves from marking 65 to marking 67, lever 974 stays in operative position. As mark 59 moves from marking 67 to marking 69, lever 975 is cammed counterclockwise, withdrawing finger 1025 from notch 1027 to allow lever 974 to move to its retracted position. Arm 1023 of lever 975 has a finger 1029 at its rearward end engageable by an ear 1031 on the left end of cam C2 to allow cam C2 to rotate lever 975 counterclockwise to swing finger 1025 out of notch 1027 in lever 974 thereby to allow lever 974 to move counterclockwise back away from its operative position of FIG. 46.

Referring to FIG. 49, showing the vacuum system of the record player, main vacuum line LM is shown to have branches LM1 and LM2. Branch LM1 has connections such as indicated at LM3 (see also FIGS. 35 and 38) with the upper ports 789 of valves A–G. A check valve 1033 may be incorporated in branch LM1. Branch LM2 is connected to cylinders CM1, CM2 and CM3, having connections such as indicated at LM4 and LM5 with CM2 and CM3. Branch LM1 has a further branch LM6 which is connected to cylinder CM4 (see FIGS. 4 and 39). Thus, whenever the vacuum pump P is in operation, vacuum is applied to cylinders CM1, CM2, CM3 and CM4, also to the upper ports of valves A–G.

Vacuum lines LA1, LB1, LC1 and LD1 interconnect the lower ports 791 of valves A, B, C and D and cylinders CA1, CB1, CC1 and CD1, respectively. Thus, when the D-valve member 787 of any one of valves A, B, C or D is down (as in FIG. 38), vacuum is drawn in the respective cylinder CA1, CB1, CC1 or CD1, respectively. When the D-valve member is up, the cylinder is vented to atmosphere. Line LA1 has a branch connection LA2 to diaphragm CA2. Line LB1 has a branch connection to cylinder CB2. Line LC1 has a branch connection LC2 to diaphragm CC2. Line LD1 has a branch connection LD2 to diaphragms CD2 and CD3. Vacuum line LE1 is connected to the lower port 791 of valve E. It has a branch LE2 connected to the upper port of supply stack valve 703. A line LE3 interconnects the lower port of valve 703 and diaphragms CE2 and CE1. Line LE3 includes an adjustable flow restrictor 1035 for diaphragm CE1. A vacuum line LF1 interconnects the lower port of valve F and cylinder CF1. Line LF1 has a branch LF2 connected to cylinder CF2, and a branch LF3 connected to the upper port of valve 715. A line LF4 interconnects the lower port of valve 715 and diaphragm CF3. A vacuum line LG interconnects the lower port of valve G and cylinder CG.

From the above, it will be seen that when valve A is actuated (i.e., when its D-valve member 787 is moved down to interconnect its upper and lower ports 789 and 791) vacuum is applied to cylinder CA1 and diaphragm CA2. When valve B is actuated, vacuum is applied to cylinders CB1 and CB2. When valve C is actuated, vacuum is applied to cylinder CC1 and diaphragm CC2. When valve D is actuated, vacuum is applied to cylinder CD1 and diaphragms CD2 and CD3. When valve E is actuated, vacuum is applied to turntable 57 (via line LE1), and to diaphragms CE1 and CE2 when valve 703 is actuated. When valve F is actuated, vacuum is applied to cylinders CF1 and CF2, and to diaphragm CF3 when valve 715 is actuated. When valve G is actuated, vacuum is applied to cylinder CG.

Referring to FIG. 51, showing the electrical system of the record player, the primary of a transformer 1037 is shown to be connected across a 110-volt power supply circuit L1, L2. This transformer is carried by a bracket 1039 under the center rail 39 (see FIGS. 5 and 7). Line L1 of this power circuit is shown as including switch 987. A by-pass capacitor 1041 is provided for switch 987 to suppress arcing and noise. The secondary of transformer 1037 feeds a control circuit (which may be a 6-volt circuit) L3, L4. Line L3 of this control circuit includes supply stack switch 717 and yoke-controlled switch 665. Coil 989 (which controls switch 987) is connected across lines L3 and L4 in series with switches 717 and 665. A relay R (see FIG. 5) is carried by bracket 1039. This includes a coil RC and two switches RA and RB controlled thereby. Switch RA is a normally open single-throw switch. Switch RB is a double-throw switch having contacts RB1 and RB2, its blade being normally closed on contact RB1. Coil RC is connected between lines L3 and L4 in series with normally closed position arm switch 595 and normally open relay switch RA as indicated at 1043. Normally open reject switch 957 and normally open tone arm switch 625 are connected in parallel with switches 595 and RA, as indicated at 1045 and 1047. Turntable motor TM is connected in a line 1049 between contact RB1 of switch RB and line L2 in series with normally open switch 576. Pump motor PM is connected in a line 1051 between contact RB2 of switch RB and line L2. A line 1053 connects the blade of switch RB to line L1 between switch 987 and transformer 1037. By-pass capacitors are provided for switches 576 and RB as indicated at 1055, 1057 and 1059. A thermal relay has its operating element TRE connected in parallel with pump motor PM and its normally open contacts TRA connected in parallel with switches 717 and 665 as indicated at 1061. A normally open push-button OFF switch 1063 (see FIGS. 1–4 and 8 as well as FIG. 51) is also connected in parallel with switches 717 and 665 and also in parallel with contacts TRA as indicated at 1065.

Operation is as follows:

When the record player shuts itself off after having played a stack of records (as will appear), the turntable carrier or yoke 25 assumes a position somewhat to the right (about 10° to the right) from vertical. Turntable 53 is in inverted position. Cams C1, C2, C4, C5, C6 and C9 occupy their right-hand position. Cams C3, C7 and C8 occupy their left-hand position. Stops 77 and 79 occupy their FIG. 1 closed position. Position arm 545 is retracted, and tone arm 57 is loose. Turntable drive wheels 81 and 83 occupy their driving position.

A stack of records is placed on pad 13 on deck 11, centered on pin 15. The records may be intermixed 33 r.p.m. (both ten inch and twelve inch records) and 45 r.p.m. (seven inch) records. The latter will have suitable adaptors secured in their large center holes, each adaptor having a small center hole for receiving pin 15. The stack depresses button 719 of empty stack switch 717 to hold the latter open. Assuming that both sides of each record are to be played, control knob K is rotated clockwise as viewed from above to bring index 59 on the knob into register with marking 61 ("ON-SIDES 1 and 2"). Even if index 59 initially registered with marking 61, knob K is nevertheless rotated clockwise a full revolution in order to turn the record player on, as will appear. Upon rotating knob K to bring index 59 into register with marking 61, cam 961 on shaft 931 actuates lever 971 (see FIG. 43) to slide rod 983 to the right as viewed from the front of the record player and close switch 987. The latter is held closed by engagement of lug 997 on armature 991 behind collar 999 on rod 983. With switch 987 closed, power is supplied to transformer 1037 (see FIG. 51). Switch 576 is held closed by finger **573*a* on link 573 when the position arm 545 is retracted. Consequently, the turntable motor TM is energized via lines 1049 and 1053 (the blade of switch RB being closed on contact RB1). Also, upon rotation of control knob K to bring index 59 into register with marking 61, cam 963 on shaft 931 (see FIG. 45) actuates lever 973 to slide cam C8 to the right. Lever 973 then moves back to operative position. Cam 964 on shaft 931 (see FIG. 46) actuates lever 974 to slide cam C7 to the right. Lever 974 is latched in position to hold cam C7 in its right-hand position by engagement of finger 1025 on lever 975 in notch 1027 of lever 974. Cams C1, C2 and C4–C9 then occupy their right-hand position. Cam C3** remains in its left-hand position. Reject button KB is then pushed down, resulting in operation of the record player through a cycle comprising the following steps:

*Step 1*

A. Pushing down reject button KB closes reject switch 957. With this switch closed, a circuit is completed for relay coil RC via line 1045 to actuate relay switches RA and RB (see FIG. 51). With switch RA closed, a holding circuit for coil RC is completed via 1043 (normally closed switch 595 on the position arm being closed). The blade of relay switch RB opens off contact RB1 and closes on contact RB2, deenergizing the turntable motor TM and energizing the pump motor PM via lines 1051 and 1053 to drive the vacuum pump P.

B. The air exhausted by pump P is delivered via line 731 to the combination quick vent and muffler valve 733. Pin 751 of valve 733 thereupon blocks the valve passage 739 as previously explained, and pump P thereupon draws a vacuum in the main vacuum line LM and its branches LM1–LM5.

*Step 2*

Upon increase of vacuum in the vacuum system, cylinders CM1–CM4 and CF1 are actuated (i.e., the piston of each cylinder is retracted) and the following operations occur substantially simultaneously:

A. Cylinder CM1 acts via lever 351, link 357, crank 345, link 349 and crank 347 to rotate stops 77 and 79 clockwise as viewed from above from their completely closed FIG. 1 position to their intermediate FIG. 28 position.

B. Cylinder CM2 acts via crank 475 to rotate lever 449 (see FIG. 21) counterclockwise as viewed from above to swing turntable drive wheels 81 and 83 to the retracted position in which they are illustrated in FIGS. 23 and 30.

C. Cylinder CM3 acts via lever 511 (see FIGS. 24, 26 and 27) to lift the tone arm 57 and move it to its FIG. 4 retracted position.

D. Cylinder CM4 acts via piston 845, piston rod 843, crosshead 847 and drag link 849 to slide cam C5 to the left as viewed in FIGS. 39 and 41. As a result of cam C5 moving to the left, actuating wire WB for valve B is unblocked (cam 4 being in its right-hand position) and is pulled down by its pull-down spring 826 to actuate valve B.

E. Vacuum is thereupon drawn in line LB1 and hence in the swing-to-the-left cylinder CB1 to retract piston 135 in this cylinder. Piston 135 pulls cable 136 to rotate shaft 107 counterclockwise as viewed in FIG. 14, thereby swinging the turntable carrier or yoke 25 to the left. Yoke 25 swings to the left until stopped in approximately vertical position by engagement of shoulder 641 on yoke arm 105 with stop plunger 643.

F. With cam C3 to the left (and cam C1 to the right), actuating wire WD for valve D is pulled down by the respective pull-down spring 826 so that valve D is on (i.e., its D-valve member 787 is down in lowered position interconnecting the upper and lower ports 789 and 791 of valve body 779 of valve D). Accordingly, a vacuum is drawn in lines LD1 and LD2. With vacuum in line LD1, vacuum is drawn in cylinder CD1 tending to rotate the turntable to inverted position, but the turntable is already in inverted position. Accordingly, vacuum builds up in lines LD1 and LD2 and vacuum is drawn in diaphragms CD2 and CD3. Diaphragm CD2 then pulls cam C4 to the left, and diaphragm CD3 pulls cam C8 to the left.

G. On movement of cam C4 to the left, wire WB is raised by slot C4B to deactuate valve B, and wire WA is cammed down by slot C4A to actuate valve A. Vacuum is thereupon drawn in lines LA1 and LA2. With vacuum in line LA1, vacuum is drawn in the swing-to-the-right cylinder CA1. Piston 135 in this cylinder is retracted and pulls cable 136 to rotate shaft 107 clockwise as viewed in FIG. 14, thereby swinging the turntable carrier or yoke 25 to the right.

H. When cam C8 moves to the left, actuating wire WF for valve F is cammed down by slot C8F to actuate valve F. Accordingly, vacuum is drawn in lines LF1 and LF2. With vacuum in line LF1, piston 387 of cylinder CF1 is retracted to rotate lever 351 further counterclockwise, and lever 351 then acts via link 357, crank 345, link 349 and crank 347 to rotate stops 77 and 79 clockwise to complete their movement to their fully open FIG. 29 position. In their open position, stops 77 and 79 are clear of fingers **73*a* and 75*a* on arms 73 and 75 to allow the turntable carrier or yoke 25 to make a full swing to the right. Additionally, lever 351 acts via link 357, crank 345 and link 589 to swing lever 581 counterclockwise from its FIG. 4 position to retract wheels 409 and 411 from gears 421 and 423. With vacuum in lines LF2, stop plunger 643 in cylinder CF2 is retracted downward clear of shoulder 641 on arm 105 of the turntable carrier or yoke 25** (see FIG. 14).

I. The turntable carrier or yoke 25 makes a full swing to the right, to the point where the head of the screw 257 on the inverted turntable 53 engages the upper end of pin 21 and pushes the latter down. This actuates valve 715 and vacuum is drawn in diaphragm CF3 via lines LF3 and LF4. Diaphragm CF3 thereupon pulls cam C4 back to the right. On movement of cam C4 to the right, wire WA is raised to deactuate valve A, thereby deactuating the swing-to-the-right cylinder CA1. Wire WB is unblocked (cam C5 being to the left) and pulled down by its pull-down spring 826 to actuate valve B.

*Step 3*

Upon actuation of valve B, vacuum is drawn in line LB1 and hence in swing-to-the-left cylinder CB1 to retract piston 135 in this cylinder. Piston 135 pulls cable 136 to rotate shaft 107 counterclockwise as viewed in FIG. 14, thereby swinging the turntable carrier or yoke 25 to the left. Additionally, vacuum is drawn in line LB2 to draw a vacuum in cylinder CB2 (see FIG. 11). Plunger 655 is thereupon retracted to retract latching lever 651. Stop plunger 643 being retracted, the turntable carrier or yoke 25 swings to the left past vertical, and down to the left.

*Step 4*

As the turntable carrier or yoke 25 swings to the left, and when it reaches a position at an angle of about 35° to the deck 11, lobe 681 on hub 673 of arm 103 of the yoke swings lever 675 counterclockwise as viewed from the front of the record player (clockwise as viewed in FIG. 31) and slides cam C2 to the left as viewed in FIG. 41. Pin 873 on cam C2 slides cam C1 to the left. Ear 1031 on the left end of cam C2 engages lever 975 and swings it counterclockwise as viewed in FIG. 46 to unlatch lever 974, whereupon the latter swings counterclockwise back to retracted position so as to release cam C7 for movement to the left by spring 871. Also, when cam C2 moves to the left, actuating wire WE for valve E is unblocked and allowed to be pulled down by the respective spring 826. Wire WE thereupon actuates valve E, and vacuum is drawn in lines LE1 and LE2.

*Step 5*

With vacuum drawn in line LE1, vacuum is drawn in turntable spindle 209 below piston 273. The piston is driven downward to extend the record-gripping boot 253 (see FIG. 17). The piston depresses button 329 of valve 321, allowing vacuum to be drawn in chamber 269 of the turntable spindle, and hence allowing vacuum to be drawn in the turntable suction pad 211.

*Step 6*

With the boot 253 extended (FIG. 17), the turntable carrier or yoke 25 completes its swing to the left. The tapered head of screw 257 engages the upper end of the record supply stack centering pin 15, pushes this pin down, and enters the center holes of records in the supply stack. With vacuum being drawn in suction pad 211, the top record of the stack is vacuum-gripped to the turntable. When the pin 15 is driven downward, valve 703 is actuated (i.e., its D-valve member 709 is driven downward to interconnect upper and lower ports 705 and 707 of the valve). Accordingly, vacuum is drawn in line LE3 to actuate diaphragms CE2 and CE1. Diaphragm CE2 thereupon pulls cam C8 to the right. Vacuum is drawn in diaphragm CE1 via restrictor 1035 and diaphragm CE1 pulls cam C4 to the left.

*Step 7*

Cam C8, moving to the right, raises actuating wire WF for valve F. Wire WF thereupon then deactuates valve F (i.e., raises its D-valve member 787) to block the upper part of valve F and open its lower part to atmosphere to vent the LF lines. This vents cylinders CF1 and CF2. With cylinder CF1 vented, spring 359 pulls lever 351 halfway back to its retracted position (cylinder CM1 still being subjected to vacuum), and stops 77 and 79 are thereby moved back to their intermediate FIG. 28 position. With cylinder CF2 vented, stop plunger 643 is free to move upward.

*Step 8*

Cam C4, moving to the left, raises wire WB for valve B and cams wire WA for valve A downward. Wire WB thereupon deactuates valve B to vent the LB lines. This vents cylinders CB1 and CB2. Wire WA thereupon actuates valve A, and vacuum is drawn in lines LA1 and LA2.

*Step 9*

A. With vacuum drawn in line LA1, piston 135 of swing-to-the-right cylinder CA1 is retracted (cylinder CB1 being vented), and pulls cable 136 to rotate shaft 107 clockwise as viewed in FIG. 14, thereby swinging the turntable carrier or yoke 25 to the right.

B. As the turntable carrier or yoke 25 swings to the right, the head of screw 257 is raised from supply stack centering pin 15, allowing the latter to be moved upward by its return spring 693, thereby deactuating valve 703. This vents line LE3 and consequently vents diaphragms CE2 and CE1.

*Step 10*

As the turntable carrier or yoke 25, in swinging to the right, reaches a position at an angle of about 35° to deck 11, lobe 681 on cam 673 rides off lever 675, and cam C2 is released for return to the right by return spring 827. As cam C2 moves to the right, wire WE is raised to deactuate valve E. This vents lines LE1 and LE2. With LE1 vented, turntable spindle 209 is vented. Spring 281 thereupon drives rod 247 and piston 273 upward and bulges boot 253 for gripping the record to the turntable (see FIG. 16).

*Step 11*

The turntable carrier or yoke 25, carrying the record gripped by boot 253 to the inverted turntable, swings to the right until stopped in record playing position by engagement of fingers 73a and 75a on arms 73 and 75 with the stops 77 and 79 which are in their intermediate FIG. 28 position (see Step 7). With the yoke 25 blocked against further swing to the right, vacuum in the vacuum circuit increases. Diaphragm CA2 (which is now subject to vacuum in the vacuum circuit since valve A has been actuated) operates upon the increase in vacuum and moves cam C9 to the left against the return bias of springs 833 and 907. With the yoke in record playing position, which is about 55° to the right of vertical, lobe 685 on hub 673 of the yoke is off lever 677, and cam C3 is released for return under the bias of spring 829 to its right-hand position. As cam C3 returns to the right, pin 875 carried by cam C3 moves cam C7 to the right.

*Step 12*

As cam C9 moves to the left, wire WG is unblocked for actuation of valve G by the respective spring 826 (cams C2, C3 and C8 all being to the right). Vacuum is drawn in line LG, and piston 559 of position arm cylinder CG is retracted to rotate the position arm 545 clockwise from its retracted position against the bias of return spring 549, thereby to swing the tone arm 57 inward to start the playing of the record. In this respect, it will be understood that pusher 553 on the position arm engages the tone arm to swing the latter inward toward the record. As the position arm swings inward, link 573 moves forward, so that switch 576 opens to deenergize turntable motor TM, and lever 571 rotates clockwise.

*Step 13*

The position arm 545 swings inward (and swings the tone arm 57 inward) until finger 601 of switch-actuating arm 597 on the position arm engages the edge of the record carried by the turntable. A slight further inward movement of the position arm then effects opening of switch 595, and the position arm and tone arm stop. On opening of switch 595, relay coil RC is deenergized, relay switch RA opens, relay switch RB closes back on contact RB1. This deenergizes pump motor PM and stops the pump P. If the record is a 12 inch 33 r.p.m. record, lever 571 swings speed selector lever 435 to its 33 r.p.m. position (FIGS. 18 and 20). If the record is a 10 inch 33 r.p.m. record, lever 571 swings lever 435 to its 10 inch 33 r.p.m. position (FIG. 30). If the record is a 7 inch 45 r.p.m. record, lever 571 swings lever 435 to its 7 inch 45 r.p.m. position (FIG. 23).

*Step 14*

When pump P stops, piston 747 in the combination quick vent and muffler valve 733 is quickly retracted (moved it its FIG. 50 position), thereby opening passage 739 in the valve and venting lines LM and LM1–LM6 to atmosphere via vent 761 in valve 733, thereby venting cylinders CM1–CM4.

On venting of cylinder CM1, spring 359 rotates lever 351 clockwise back to its retracted position of FIG. 4. Lever 351 retracts link 357 to swing stops 77 and 79 to their completely closed position wherein hooks 343 are hooked over fingers 73*a* and 75*a* to lock turntable 53 in its FIG. 2 playing position (the turntable being inverted). Retraction of link 357 also results in retraction of lever 581 (clockwise swing of lever 581) to release levers 405 and 407 for engagement of wheel 409 or 411, as the case may be, with the respective gear 421 or 423, as determined by the setting of speed selector lever 435.

On venting of cylinder CM2, spring 476 moves piston 471 outward, allowing spring 453 to rotate lever 453 for engagement of the upper turntable driving wheel 81 with turntable flywheel 55 and friction pinion 445 at the upper end of vertical countershaft 413.

On venting of cylinder CM3, spring 513 retracts lever 511, permitting rod 499 to lower and gently lower the tone arm 57 to enter the needle N on the tone arm into the starting end of the groove in the record carried by the turntable. This occurs with the turntable at rest.

On venting of cylinder CM4, spring 865 moves crosshead 847 and drag link 849 to the right. Link 849, moving to the right, drags cams C1, C4 and C5 to the right.

Cam C1, moving to its right-hand position, unblocks wires WC and WD (cam C3 being to the left and cam C7 being to the right) to allow operation of valves C and D when the turntable carrier or yoke 25 swings back to transition position as will be later described.

Cam C4, moving to its right-hand position, raises wire WA to deactuate valve A. This vents lines LA1 and LA2, cylinder CA1 and diaphragm CA2. With diaphragm CA2 vented, spring 907 pulls cam C9 to the right. Cam C9, moving to its right-hand position, raises wire WG to deactuate valve G. This vents line LG and cylinder CG. Spring 549 thereupon pulls position arm 545 back to its retracted position, leaving the tone arm 57 in playing position. As the position arm 545 is retracted, link 573 is retracted and finger 573*a* thereon closes switch 576 to energize the turntable motor TM.

Cam C5, moving to its right-hand position, temporarily blocks wire WB to prevent valve B from operating until cylinder CM4 is actuated (see Step 3).

Assuming that the record carried by the turntable 53 is a 12 inch 33 r.p.m., the speed selector lever 435 will now be in its 12 inch 33 r.p.m. position of FIGS. 18 and 20, wherein lever 407 is blocked in retracted position so that wheel 411 is out of engagement with gear 423 of friction gear cluster 419 at the lower end of countershaft 413, the lever 405 is in operative position (pin 429 being entered in notch 443) so that wheel 409 is in engagement with gear 421 of the cluster as well as in engagement with pinion 401 on the upper end of turntable drive motor shaft 399. Wheel 81 is now in engagement with friction pinion 445 at the upper end of countershaft 413 and also with the rim of turntable flywheel 55. Accordingly, turntable 53 is driven at 33 r.p.m. via motor shaft 399, pinion 401, wheel 409, gear 421, countershaft 413, pinion 445, wheel 81 and flywheel 55 (which serves as a friction gear). If the record is 10 inch 33 r.p.m. record, the drive is the same. If the record is a 7 inch 45 r.p.m. record, speed selector lever 435 will be in its 7 inch 45 r.p.m. position of FIG. 23, wherein lever 405 is blocked in retracted position so that wheel 409 is disengaged from gear 421, and lever 407 is in operative position (pin 431 being entered in notch 439) so that wheel 411 is in engagement with gear 423 as well as in engagement with pinion 401. Accordingly, turntable 53 is then driven at 45 r.p.m. via motor shaft 399, pinion 401, wheel 411, gear 423, countershaft 413, pinion 445, wheel 81 and flywheel 55.

The inverted turntable and the record gripped thereto rotate clockwise as viewed from above. Lowering of the tone arm 57 to enter the needle into the starting end of the groove in the record occurs before switch 576 closes and hence occurs before the turntable starts to rotate. When the turntable starts to rotate, playing of the first side of the record is initiated. As the record is played, the tone arm is swung inward (clockwise) by the tracking action of the needle N in the playing groove in the record. Each of cams C1–C9 is now in its right-hand position (see FIG. 41) and remains in this position during the playing of the first side of the record.

*Step 15*

At the conclusion of playing the first side of the record, the needle enters the terminating spiral portion of the groove on the record. The tone arm 57 is thereby given a final inward swing and trip arm 633, swinging with the tone arm, trips (closes) switch 625. Upon closure of this switch, relay coil RC is energized (see FIG. 51). Relay switch RA closes to establish a relay holding circuit via switch 595, and the blade of relay switch RB opens off contact RB1 and closes on contact RB2. This deenergizes the turntable motor TM and energizes the pump motor PM to drive the vacuum pump P. With the pump P in operation, Steps 1B, 2A, 2B, 2C and 2D are repeated, the latter resulting in movement of cam C5 to the left. Since cam C4 is to the right, movement of cam C5 to the left unblocks actuating wire WB for valve B, and wire WB is pulled down by its pull-down spring 826 to actuate valve B. Upon actuation of valve B, Step 3 is repeated, i.e., the turntable carrier or yoke 25 is swung to the left.

*Step 16*

As the turntable carrier or yoke 25 swings to the left from playing position, lobe 685 on hub 673 of yoke arm 103 actuates lever 677 to move cam C3 to the left. The yoke swings to the left to the point where shoulder 641 on yoke arm 105 engages stop plunger 643, and this stops the yoke in its approximately vertical transition position (FIG. 1).

*Step 17*

As a result of movement of cam C3 to the left, pin 875 carried by cam C3 is moved toward the left to unblock cam C7 for movement the left by spring 871. Upon movement of cam C7 to the left (cam C1 being to the right), wire WC is cammed down to actuate valve C. Vacuum is thereby drawn in lines LC1 and LC2. Accordingly, vacuum is drawn in cylinder CC1 and diaphragm CC2.

*Step 18*

A. With vacuum drawn in cylinder CC1, piston 193 in this cylinder is retracted and pulls cable 195 to rotate shaft 165 clockwise as viewed in FIG. 15. Pulley 173 rotates clockwise with shaft 165 and acts through band 175 and pulley 157 to rotate the turntable cradle 51 clockwise through 180°, as determined by engagement of pin 201 on disk 200 fixed on shaft 165 with the head of bolt 101. As above noted in Step 3, latching lever 651 is retracted to permit this. Thus, the turntable 53 (with the record thereon) is swung from inverted to upright position, and the second side of the record thereon is brought uppermost.

B. Cam 687 (having screw 689 as a cam lobe), rotating with shaft 165, actuates lever 679 to move cam C6 to the left. This allows blocking wire WH to drop and block cam C7 when the latter subsequently moves to the right in Step 20.

*Step 19*

Vacuum in the vacuum system increases until diaphragm CC2 overcomes spring 881 and pulls cam C4 to the left. Cam C4, moving to the left, deactuates valve B and actuates valve A as in Step 8, and Step 9A is repeated (i.e., the turntable carrier or yoke 25 is swung to the right).

*Step 20*

As the turntable carrier or yoke 25 (with the turntable 53 now upright) swings to the right, spring 829 moves cam C3 to the right. As cam V3 moves to the right, it acts through pin 875 to move cam C7 to the right. Blocking wire WH then drops and blocks cam C7 in its right-hand position. Cam C7, in moving to the right, raises wire WC and deactuates valve C. This vents cylinder CC1 and diaphragm CC2.

*Step 21*

Steps 11, 12 13 and 14 are repeated, except that cams C1 and C7 are already in its rights-hand position and the movement of these cams to the right as occurs in Steps 11 and 14 is not repeated. Cam C9 first moves to the left, as in Step 11, then to the right as in Step 14. The second side of the record is played. During the playing of the second side, cams C1–C5 and C7–C9 are in their right-hand position, but cam C6 is in its left-hand position.

*Step 22*

At the conclusion of playing the second side of the record, trip arm 633 trips switch 625 to deenergize the turntable motor TM and to energize the pump motor PM to drive pump P as described under Step 15, and Step 1B, 2A, 2B, 2C, 2D and 3 are repeated in the same manner as described under Step 15.

*Step 23*

Step 16 is repeated, i.e., the turntable carrier or yoke 25 swings to the left, stops in its approximately vertical transition position (FIG. 1) and cam C3 is moved to the left.

*Step 24*

Upon movement of cam C3 to the left, with cam C7 locked in place, as described in Steps 18B and 20, wire WD is unblocked and allowed to be pulled down by the respective spring 826 to actuate valve D. Vacuum is thereupon drawn in lines LD1 and LD2 to draw vacuum in cylinder CD1 and diaphragms CD2 and CD3.

*Step 25*

A. With vacuum drawn in cylinder CD1, piston in this cylinder is retracted and pulls cable 195 to rotate shaft 165 counterclockwise as viewed in FIG. 15. Pulley 173 rotates counterclockwise with shaft 165 and acts through band 175 and pulley 157 to rotate the turntable cradle counterclockwise through 180° back to inverted position, as determined by engagement of pin 201 on disk 200 fixed on shaft 165 with the head of bolt 99. Cam 687, rotating with shaft 165, releases lever 679 to permit cam C6 later to be returned to the right by spring 831.

B. Diaphragm CD3 moves cam C8 to the left. Upon movement of cam C8 to the left, slot C8F cams wire WF down to actuate valve F. Vacuum is thereupon drawn in lines LF1 and LF2. Stops 77 and 79 thereby are rotated to their open position, as in Step 2H.

C. Diaphragm CD2 moves cam C4 to the left to deactuate valve B and actuate valve A, as in Step 8.

*Step 26*

Valve A being actuated, Step 9A is repeated (i.e., the turntable carirer or yoke 25 swings to the right).

*Step 27*

As the turntable carrier or yoke 25 swings to the right, lobe 685 rides off lever 677 and cam C3 is returned to the right by spring 829. On movement of cam C3 to the right, wire WD is raised to deactuate valve D and vent cylinder CD1 and diaphragms CD2 and CD3.

*Step 28*

As the turntable carrier or yoke 25, swinging to the right, approaches centering pin 21, lobe 683 on hub 673 of arm 103 of the yoke actuates lever 675 to move cam C2 to the left. On movement of cam C2 to the left, pin 873 moves cam C1 to the left. Also, wire WE is unblocked to be pulled down to actuate valve E. Vacuum is thereupon drawn in line LE1, thereby drawing a vacuum in turntable spindle 209 below piston 273 to extend record-gripping boot 253 (see FIG. 17). The extended boot registers with centering pin 21 and the record is released to drop down onto deck 19, centered on pin 21. The record drops before piston 273 opens valve 321. Screw 257 drives pin 21 down to actuate valve 715, thereby to draw a vacuum in diaphragm CF3 via lines LF3 and LF4. Diaphragm CF3 thereupon moves cam C4 to the right.

*Step 29*

On movement of cam C4 to the right, slot C4A raises wire WA to deactuate valve A, thereby venting the swing-to-the-right cylinder CA1, and unblocks wire WB to allow it to swing down and actuate valve B (cam C5 being to the left as a result of Step 22). A vacuum is thereupon drawn in the swing-to-the-left cylinder CB1 and in the turntable latch cylinder CB2 to retract latching lever 651.

*Step 30*

With vacuum drawn in cylinder CB1, the turntable carrier or yoke 25 makes a full swing to the left (stop plunger 643 being retracted); turntable 53 picks up the next record from the supply stack, and the entire sequence of steps starting with Step 4 is repeated to play both sides of the next record, and drop it onto the previously played record on deck 19 centered on pin 21.

*Step 31*

When the last record is picked up from the supply stack on deck 11, button 719 of empty switch 717 rises and this switch closes.

*Step 32*

The turntable carrier or yoke 25, swinging to the left from centering pin 21 after the last record has been dropped, operates via stud 671 on hub 673 of the yoke arm 103 to close switch 665. This results in energization of coil 989 (switch 717 being closed at this time) to retract armature 991 and allow rod 983 to move to the left for opening of switch 987. This shuts off the record player. The turntable carrier or yoke 25 stops in its aforesaid initial position somewhat off to the right from vertical. As the turntable carrier or yoke 25 assumes this position, lever 675 is released so that cam C2 assumes its right-hand position. Lobe 685 engages lever 677 to actuate the latter to move cam C3 to its left-hand position. Upon movement of cam C3 to the left, pin 875 releases cam C7 for movement to the left by spring 871. When the pump P stops, vacuum is lost in the vacuum system, and hence lost in cylinder CM4. Accordingly, spring 865 drives crosshead 847 and drag link 849 to the right, thereby dragging cam C5 to the right. It also drags cams C1 and C4 to the right. Spring 831, being attached to crosshead 847, drags cam C6 to the right. Accordingly, upon shut-off, cams C1, C2, C4, C5, C6 and C9 occupy their right-hand position, and cams C3, C7 and C8 occupy their left-hand position. Stops 77 and 79 assume their FIG. 1 closed position, and turntable drive wheels 81 and 83 assume their driving position. The position arm 545 is already in its retracted position (having been retracted in Step 21).

A chart showing the positions of cams C1–C9 as a result of the various steps in the sequence of operation for playing Sides 1 and 2 follows. The came positions are designated R for right and L for left. The "OFF" cam positions are those assumed by the cams on shut-off of the record player, and it will be observed that they correspond to the cam positions given for Step 32 (the shut-off step). The "ON-SIDES 1 AND 2" cam positions are those resulting from turning knob K to the "ON-SIDES 1 AND 2" position. It will be observed that this results in shifting of cams C7 and C8 from their left to their right positions, the other cams remaining in their original position. Only those steps in which cam shifts occur are listed in the chart. In Step 21, two shifts of cam C9 occur, first from right to left, then back to the right. Certain shifts of cams C2 and C3 resulting from swinging of yoke 25, which do not have any effect on the cycling of the record player, are omitted.

| | Cam | | | | | | | | |
|---|---|---|---|---|---|---|---|---|---|
| | C1 | C2 | C3 | C4 | C5 | C6 | C7 | C8 | C9 |
| Off | R | R | L | R | R | R | L | L | R |
| "On-Sides 1 and 2" | R | R | L | R | R | R | R | R | R |
| Step 2D | R | R | L | R | L | R | R | R | R |
| Step 2F | R | R | L | L | L | R | R | L | R |
| Step 2I | R | R | L | R | L | R | R | L | R |
| Step 4 | L | L | L | R | L | R | L | L | R |
| Step 6 | L | L | L | L | L | R | L | R | R |
| Step 10 | L | R | L | L | L | R | L | R | R |
| Step 11 | L | R | R | L | L | R | R | R | L |
| Step 14 | R | R | R | R | R | R | R | R | R |
| Step 15 | R | R | R | R | L | R | R | R | R |
| Step 16 | R | R | L | R | L | R | R | R | R |
| Step 17 | R | R | L | R | L | R | L | R | R |
| Step 18B | R | R | L | R | L | L | L | R | R |
| Step 19 | R | R | L | L | L | L | L | R | R |
| Step 20 | R | R | R | L | L | L | R | R | R |
| Step 21 | R | R | R | R | R | L | R | R | L, then R |
| Step 22 | R | R | R | R | L | L | R | R | R |
| Step 23 | R | R | L | R | L | L | R | R | R |
| Step 25A | R | R | L | R | L | L | R | R | R |
| Step 25B | R | R | L | R | L | L | R | L | R |
| Step 25C | R | R | L | L | L | L | R | L | R |
| Step 27 | R | R | R | L | L | L | R | L | R |
| Step 28 | L | L | R | R | L | L | R | L | R |
| Step 32 | R | R | L | R | R | R | L | L | R |

Assuming that only one side (the first side or uppermost side of records) in the supply stack are to be played, control knob K is rotated clockwise to bring index marking 59 on knob K past marking 61 and into register with the "SIDE 1 ONLY" marking 67. Rotating the knob to bring index 59 past marking 61 turns the record player on. Rotating it to bring index 59 on marking 67 effects rotation of cam 964 on shaft 931 to actuate lever 974 to slide cam C7 to the right and to hold it in its right-hand position throughout the operation of the record player. Cam 963 actuates lever 973 to slide cam C8 to the right, and then releases lever 973 to allow it to back off from the left end of cam C8. With cam C7 locked in its right-hand position, wire WC is always held up so that valve C (which controls the turntable turnover from inverted to upright position) cannot be actuated. Accordingly, the turntable remains in inverted position throughout the operation, Steps 17–23 and 25A being cancelled. Thus, after the playing of the first side of each record, the turntable carrier or yoke 25 swings up to transition position, then, without inversion of the turntable, swings to the right to record-dropping position to deposit the played record on deck 19, then swings to the left to pick up the next record.

Assuming that it is desired to repeat both sides of a record on the turntable, knob K is rotated to bring index marking 59 into register with the "REPEAT SIDES 1 AND 2" marking 63. Cam 963 then actuates lever 973 to slide cam C8 to the right and hold it in its right-hand position. Cam 964 actuates lever 974 to slide cam C7 to the right, and then releases lever 974 to allow it to back off from the left end of cam C7. Under these circumstances, cam C8 remains in its right-hand position instead of moving to its left-end position when vacuum is drawn in diaphragm CD3 as in Steps 24 and 25B. Accordingly, Step 25B is cancelled, and Steps 11–25A, 25C, 26 and 27 are repeated continuously. Thus, after the first and second sides of a record have been played, the turntable carrier or yoke 25 swings up to transition position, the turntable is inverted, and the yoke swings back to record-playing position to repeat the playing of the first and second sides.

Assuming that it is desired to repeat the first side only of a record on the turntable, knob K is rotated to bring index marking 59 into register with the "REPEAT SIDE 1" marking 65. Cam 964 actuates lever 974 to slide cam C7 to the right and to hold it there. Cam 963 actuates lever 973 to slide cam C8 to the right and to hold it there. Under these circumstances, cams C7 and C8 are held against movement to the left when the turntable carrier or yoke 25 swings to transition position. Steps 15, 16, 24, 25C, 9A and 11–14 are repeated continuously. Thus, after the first side of the record has been played, the turntable carrier or yoke 25 swings to transition position, then, without inversion of the turntable, swings back to record-playing position to repeat the playing of the first side.

Assuming that it is desired to repeat the second side only of a record on the turntable, knob K is rotated to bring index marking 59 into register with the "REPEAT SIDE 2" marking 69. Cam 962 actuates lever 972 to actuate slide 1001 to hold blocking wire WH in raised position. This results in continuous repetition of Steps 22, 16, 17, 19, 20 and 21. Thus, after the second side of the record has been played (turntable upright), the turntable carrier or yoke 25 swings to transition position, and then returns to playing position without inversion of the turntable for repeating the second side.

The thermal relay operating element TRE is adapted to close the associated contacts TRA if the pump motor PM should remain in operation for an abnormal length of time. Accordingly, if for some reason the pump motor should continue in operation for an abnormal length of time, contacts TRA close to shut off the record player.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A record player comprising a turntable carrier, a turntable carried by the carrier for movement relative to the carrier between an inverted position and an upright position, said turntable having means for gripping a record, and means for moving said carrier to bring the turntable in inverted position over to a stack of records to grip and pick up a record, then moving said carrier to bring the turntable over to a record playing position for playing the upper side of the record on the inverted turntable, and then turning the turntable to upright position for playing the other side of the record.

2. A record player comprising a turntable carrier mounted for swinging movement on a horizontal axis, a turntable carried by said carrier for swinging movement relative to the carrier on a horizontal axis parallel to the carrier axis between an inverted position and an upright position, said turntable having means for gripping a record, and means for swinging said carrier to bring the turntable in inverted position over to a stack of records to grip and pick up a record, then swinging the carrier to bring the turntable over to a playing position for playing the upper side of the record on the inverted turntable, and then turning the turntable to upright position for playing the other side of the record.

3. A record player comprising a turntable carrier mounted for swinging movement on a horizontal axis, a turntable carried by said carrier for swinging movement relative to the carrier on a horizontal axis parallel to the carrier axis between an inverted position and an upright position, said turntable having means for gripping a record, and means for swinging said carrier to bring the turntable in inverted position over to a stack of records to grip and pick up a record, then swinging the carrier to bring the turntable over to a playing position for playing the upper side of the record on the inverted turntable, then turning the turntable to inverted position, and then swinging the carrier to bring the turntable to a record drop position for release of the record from the turntable.

4. A record player comprising a turntable carrier mounted for swinging movement on a horizontal axis, a turntable carried by said carrier for swinging movement relative to the carrier on a horizontal axis parallel to the carrier axis between an inverted and an upright position, said turntable having means for gripping a record, and means for swinging said carrier to bring the turntable in inverted position over to a stack of records to grip and pick up a record, then swinging the carrier to bring the turntable over to a playing position for playing the upper side of the record on the inverted turntable, then swinging the carrier to bring the turntable to a transition position, then turning the turntable to upright position, then swinging the carrier to bring the turntable to playing position for playing the other side of the record, then swinging the carrier to bring the turntable to transition position, then inverting the turntable, and then swinging the carrier to bring the turntable to a record drop position for release of the record from the turntable.

5. A record player comprising a base, a turntable carrier pivoted on the base for swinging movement about a horizontal axis, a turntable carried by the carrier for swinging movement relative to the carrier on a horizontal axis parallel to the carrier axis between an inverted position and an upright position, said turntable having means for gripping a record, said carrier being swingable above the base from one side of the base to the other and adapted to carry the turntable to a record pick-up position on one side, a record playing position above the other side, a transition position between the record pick-up and playing positions and a record drop position on the other side below playing position, and means for swinging the carrier in the direction toward said one side to bring the inverted turntable to record pick-up position for gripping and picking up a record from a stack of records on said one side of the base, then swinging the carrier to bring the turntable to playing position for playing the upper side of the record on the inverted turntable, then swinging the carrier to bring the turntable to transition position, then turning the turntable to upright position, then swinging the carrier to bring the turntable to playing position for playing the other side of the record, then swinging the carrier to bring the turntable to transition position, then inverting the turntable, and then swinging the carrier to bring the turntable to record drop position for release of the record from the turntable and deposit of the record on the base by release of said gripping means.

6. An automatic double side record player comprising an invertible turntable having means for gripping a record, means for moving said turntable to a record pick-up position for gripping and picking up a record from a stack of records, and to a record playing position for playing the record, means for turning out the turntable from inverted to upright position and vice versa, a tone arm, means for moving the tone arm from a retracted position into position to play a record and for retracting the tone arm at the end of play, and programming means for effecting operation of the record player in a sequence including the steps of moving the turntable while inverted to record pick-up position to grip and pick up a record, moving the inverted turntable with the record gripped thereto to a record playing position, moving the tone arm into position to play the first side of the record, retracting the tone arm at the end of playing the first side, turning the turntable to upright position, moving the tone arm into position to play the second side of the record, retracting the tone arm at the end of playing the second side, turning the turntable to inverted position, and releasing said gripping means to release the record, with each successive step being initiated in response to completion of the previous step.

7. An automatic double side record player comprising an invertible turntable having means for gripping a record, means for moving said turntable to a record pick-up position for gripping and picking up a record from a stack of records, to a record playing position for playing the record, and to a record drop position for release of the record from the turntable, means for turning the turntable from inverted to upright position and vice versa, a tone arm, means for moving the tone arm from a retracted position into position to play a record and for retracting the tone arm at the end of play, and programming means for effecting operation of the record player in a sequence including the steps of moving the turntable while inverted to record pick-up position to grip and pick up a record, moving the inverted turntable with the record gripped thereto to record playing position, moving the tone arm into position to play the first side of the record, retracting the tone arm at the end of playing the first side, turning the turntable to upright position, moving the tone arm into position to play the second side of the record, retracting the tone arm at the end of playing the second side, turning the turntable to inverted position, moving the turntable to record drop position, and releasing said gripping means to release the record, with each successive step being initiated in response to completion of the previous step.

8. An automatic double side record player comprising an invertible turntable having means for gripping a record, means for moving said turntable to a record pick-up position for gripping and picking up a record from a stack of records, to a record playing position for playing the record, to a transition position wherein the turntable may be turned from inverted to upright position and vice versa, and to a record drop position for release of the record from the turntable, means for turning the turntable from inverted to upright position and vice versa, a tone arm, means for moving the tone arm from a retracted position into position to play a record and for retracting the tone arm at the end of play, and programming means for effecting operation of the record player in a sequence comprising the steps of moving the turntable while inverted to record pickup position to grip and pick up a record, moving the inverted turntable with the record gripped thereto to a record playing position, moving the tone arm into position to play the first side of the record, retracting the tone arm at the end of playing the first side, moving the turntable to transition position, turning the turntable to upright position, moving the turntable to playing position, moving the tone arm into position to play the second side of the record, retracting the tone arm at the end of playing the second side, moving the turntable to transition position, turning the turntable to inverted position, moving the turntable to record drop position, and releasing said gripping means to release the record, with each successive step being initiated in response to completion of the previous step.

9. An automatic double side record player comprising a turntable carrier, a turntable carried by the carrier for movement relative to the carrier between an inverted position and an upright position, said turntable having means for gripping a record, means for moving said carrier to bring the turntable in inverted position to a record pick-up position for gripping and picking up a record from a stack of records, and to a record playing position for playing the record, means for turning the turntable from inverted to upright position and vice versa, a tone arm, means for moving the tone arm from a retracted position into position to play a record and for retracting the tone arm at the end of play, and programming means for effecting operation of the record player in a sequence including the steps of moving the carrier to bring the turntable while inverted to record pick-up position to grip and pick up a record, moving the carrier to bring the inverted turntable with the record gripped thereto to record playing position, moving the tone arm position to play the first side of the record, retracting the tone arm at the end of playing the first side, turning the turntable to upright position, moving the tone arm into position to play the second side of the record, retracting the tone arm at the end of playing the second side, turning the turntable to inverted position, and releasing said gripping means to release the record, with each successive step being initiated in response to completion of the previous step.

10. An automatic double side record player comprising a turntable carrier mounted for swinging movement on a horizontal axis, a turntable carried by the carrier for swinging movement relative to the carrier on a horizontal axis parallel to the carrier axis between an inverted position and an upright position, said turntable having means for gripping a record, means for swinging said carrier to bring the turntable in inverted position to a record pick-up position for gripping and picking up a record from a stack of records, to a record playing position for playing the record, and to a record drop position for release of the record from the turntable, means for turning the turntable from inverted to upright position and vice versa, a tone arm, means for moving the tone arm from a retracted position into position to play a record and for retracting the tone arm at the end of play, and programming means for effecting operation of the record player in a sequence including the steps of swinging the carrier to bring the turntable while inverted to record pick-up position to grip and pick up a record, swinging the carrier to bring the inverted turntable with the record gripped thereto to record playing position, moving the tone arm into position to play the first side of the record, retracting the tone arm at the end of playing the first side, turning the turntable to upright position, moving the tone arm into position to play the second side of the record, retracting the tone arm at the end of playing the second side, turning the turntable to inverted position, swinging the carrier to bring the turntable to record drop position, and releasing said gripping means to release the record, with each successive step being initiated in response to completion of the previous step.

11. An automatic double side record player comprising a turntable carrier mounted for swinging movement on a horizontal axis, a turntable carried by the carrier for swinging movement relative to the carrier on a horizontal axis parallel to the carrier axis between an inverted position and an upright position, said turntable having means for gripping a record, means for swinging said carrier to bring the turntable in inverted position to a record pick-up position for gripping and picking up a record from a stack of records, to a record playing position for playing the record, to a transition position wherein the turntable may be turned from inverted to upright position and vice versa, and to a record drop position for release of the record from the turntable, means for turning the turntable from inverted to upright position and vice versa, a tone arm, means for moving the tone arm from a retracted position into position to play a record and for retracting the tone arm at the end of play, and programming means for effecting operation of the record player in a sequence comprising the steps of swinging the carrier to bring the turntable while inverted to record pick-up position to grip and pick up a record, swinging the carrier to bring the inverted turntable with the record gripped thereto to record playing position, moving the tone arm into position to play the first side of the record, retracting the tone arm at the end of playing the first side, swinging the carrier to bring the turntable to transition position, turning the turntable to upright position, swinging the carrier to bring the turntable to playing position, moving the tone arm into position to play the second side of the record, retracting the tone arm at the end of playing the second side, swinging the carrier to bring the turntable to transition position, turning the turntable to inverted position, swinging the carrier to bring the turntable to record drop position, and releasing said gripping means to release the record, with each successive step being initiated in response to completion of the previous step.

12. An automatic double side record player comprising a base, a turntable carrier pivoted on the base for swinging movement about a horizontal axis, a turntable carried by the carrier for swing movement relative to the carrier on a horizontal axis parallel to the carrier axis between an inverted and an upright position, said turntable having means for gripping a record, said carrier being swingable above the base from one side of the base to the other and adapted to carry the turntable to a record pick-up position on one side for gripping and picking up a record from a stack of records on said one side of the base, to a record playing position above the other side for playing the record, to a transition position between the record pick-up and playing positions wherein the turntable may be turned from inverted to upright position and vice versa, and to a record drop position on the other side below playing position for release of the record from the turntable, means for swinging the carrier, means for turning the turntable from inverted to upright position and vice versa, a tone arm, means for moving the tone arm from a retracted position into position to play a record and for retracting the tone arm at the end of play, and programming means for effecting operation of the record player in a sequence comprising the steps of swinging the carrier in the direction toward said one side of the turntable while inverted to record pick-up position to grip and pick up a record, swinging the carrier in the opposite direction to bring the inverted turntable with the record gripped thereto to record playing position, moving the tone arm into position to play the first side of the record, retracting the tone arm at the end of playing the first side, swinging the carrier in said one direction to bring the turntable to transition position, turning the turntable to upright position, swinging the carrier in the opposite direction to bring the turntable to playing position, moving the tone arm into position to play the second side of the record, retracting the tone arm at the end of playing the second side, swinging the carrier in said one direction to bring the turntable to transition position, turning the turntable to inverted position, swinging the carrier in the opposite direction to bring the turntable to record drop position, and releasing said gripping means for release of the record from the turntable and deposit of the record on the base, with each successive step being initiated in response to completion of the previous step.

13. A record player comprising a base, a turntable carrier pivoted on the base for swinging movement about a horizontal axis, a turntable carried by the carrier for swinging movement relative to the carrier on a horizontal axis parallel to the carrier axis between an inverted and an upright position, said turntable having means for gripping a record, said carrier being swingable above the base from one side of the base to the other and adapted to carry the turntable to a record pick-up position on one side, a record playing position above the other side, and a record drop position on the other side below playing position, means for swinging the carrier, and stop means for stopping the carrier with the turntable in playing position as the carrier swings toward said other side of the base, said stop means being retractible to an open position to allow the carrier to swing farther downward to bring the turntable to record drop position.

14. A record player as set forth in claim 13 wherein said turntable has means for engaging said stop means to stop the swing of the carrier.

15. A record player as set forth in claim 14 wherein said stop means has an intermediate position for engagement by said stop engaging means on the turntable to stop the swing of the carrier and a closed position for latching engagement with said stop-engaging means to latch the turntable in inverted or upright position when a record is being played.

16. In a double side record player, a turntable carrier pivoted for swinging movement on a horizontal axis, a turntable journalling means pivotally mounted on said carrier for swinging movement relative to the carrier on a horizontal axis parallel to the carrier axis, a turntable journalled for rotation in said journalling means with the axis of rotation of the turntable perpendicular to the pivot axis of said journalling means, means for swinging the carrier on its axis, and means for swinging the journalling means on its pivot axis for turntable turnover.

17. In a double side record player, a turntable carrier comprising a pair of arms pivoted for swinging on a horizontal axis, a cradle extending between the arms and pivoted for swinging movement relative to said carrier on a horizontal axis parallel to the carrier axis, a turntable carried by the cradle and journalled therein for rotation on an axis perpendicular to the cradle axis, means for swinging the carrier on its axis, and means for swinging the cradle on its axis for turntable turnover.

18. In a double side record player, a turntable carrier comprising a pair of arms pivoted for swinging on a horizontal axis, a cradle extending between the arms and pivoted for swinging movement relative to said carrier on a horizontal axis parallel to the carrier axis, a turntable carried by the cradle and journalled therein for rotation on an axis perpendicular to the cradle axis, vacuum-operated mechanism for swinging the carrier on its axis, and vacuum-operated mechanism for swinging the cradle on its axis to swing the turntable between an inverted and an upright position including a parallel motion mechanism adapted to maintain the turntable in inverted position or upright position as the carrier swings.

19. In a double side record player as set forth in claim 18, said parallel motion mechanism comprising a shaft extending on the carrier axis, a pulley on said shaft, a pulley secured to the cradle on the cradle axis, an endless band trained around said pulleys, and means for holding said shaft against rotation during swinging of the carrier.

20. In a record player, a turntable, a drive for the turntable including a drive wheel, means mounting the drive wheel for movement between a retracted position wherein it is out of engagement with the turntable and a turntable-driving position wherein it engages the turntable, means for moving the drive wheel away from its said retracted position to its said turntable-driving position engaging the turntable and back to retracted position, a tone arm, means for moving the tone arm away from a retracted position into position to start the play of a record on the turntable while said drive wheel is retracted and the turntable is accordingly stopped, and means responsive to completion of movement of the tone arm into position to start the play of a record to initiate operation of said drive wheel moving means to effect movement of the drive wheel into engagement with the turntable to initiate rotation of the turntable.

21. In a record player, an invertible turntable, a drive for the turntable including a flywheel on the turntable in a plane offset from the inversion axis of the turntable, a first drive wheel engageable with the flywheel when the turntable is inverted and a second drive wheel engageable with the flywheel when the turntable is upright, means for moving said drive wheels away from a retracted position out of engagement with the flywheel into engagement with the flywheel and back to retracted position, a tone arm, means for moving the tone arm away from a retracted position into position to start the play of a record on the turntable while said drive wheels are retracted and said turntable is accordingly stopped, and means responsive to completion of movement of the tone arm into position to start the play of a record to initiate operation of said drive wheel moving means to effect movement thereof into engagement with the flywheel to initiate rotation of the turntable.

22. In a record player, an invertible turntable having means for gripping a record, means for moving said turntable to a record pick-up position at one location with respect to the record player for gripping and picking up a record from a stack of records and then moving the turntable to a playing position at another location with respect to the record player for playing the record, means for inverting the turntable for playing both sides of the record, a tone arm for playing one side of a record with the turntable inverted and playing the other side of a record with the turntable upright, and a drive for the turntable including a first driver engageable with the turntable when inverted and in playing position and a second driver engageable with the turntable when upright and in playing position.

23. In a record player as set forth in claim 22, said drive being a multi-speed drive for driving the turntable at different record speeds, and means for automatically setting said drive to drive the turntable at the appropriate speed for the record carried by the turntable.

24. In a record player, an invertible turntable having means for gripping a record, means for moving said turntable to a record pick-up position for gripping and picking up a record from a stack of records and to a playing position for playing the record, a tone arm for playing one side of a record with the turntable inverted and playing the other side of a record with the turntable upright, and a drive for the turntable including a flywheel on the turntable in a plane offset from the inversion axis of the turntable, a first drive wheel engageable with the flywheel when the turntable is inverted and in playing position, and a second drive wheel engageable with the flywheel when the turntable is upright and in playing position.

25. In a record player as set forth in claim 24, said drive wheels being movable away from a retracted position out of engagement with the flywheel to a position in engagement with the flywheel and back to retracted position.

26. In a record player as set forth in claim 24, means for moving said drive wheels away from a retracted position out of engagement with the flywheel into engagement with the flywheel and back to retracted position, means for moving the tone arm away from a retracted position into position to start the play of a record on the turntable while said drive wheels are retracted and said turntable is accordingly stopped, and means responsive to completion of movement of the tone arm into position to start the play of a record to initiate operation of said drive wheel moving means to effect movement thereof into engagement with the flywheel to initiate rotation of the turntable.

27. In a record player, an invertible turntable having means for gripping a record, means for moving said turntable to a record pick-up position for gripping and picking up a record from a stack of records and to a playing position for playing the record, a tone arm for playing one side of a record with the turntable inverted and playing the other side of a record with the turntable upright, and a drive for the turntable, said drive including a flywheel on the turntable in a plane offset from the inversion axis of the turntable, a vertical drive shaft, first and second gears on the shaft at elevations corresponding to the elevation of the flywheel when the turntable is inverted and the elevation of the flywheel when the turntable is upright, and first and second idler drive wheels engaging said first and second gears, the first wheel being engageable with the flywheel when the turntable is inverted and in playing position, the second wheel being engageable with the flywheel when the turntable is upright and in playing position.

28. In a record player as set forth in claim 27, said drive wheels being movable away from a retracted position out of engagement with the flywheel to a position in engagement with the flywheel and back to retracted position.

29. In a record player as set forth in claim 27, means for moving said drive wheels away from a retracted position out of engagement with the flywheel into engagement with the flywheel and back to retracted position, means for moving the tone arm away from a retracted position into position to start the play of a record on the turntable while said drive wheels are retracted and said turntable is accordingly stopped, and means responsive to completion of movement of the tone arm into position to start the play of a record to initiate operation of said drive wheel moving means to effect movement thereof into engagement with the flywheel to initiate rotation of the turntable.

30. In a record player as set forth in claim 27, means for driving said shaft at different speeds for driving the turntable at different record speeds, and means for automatically setting said shaft-driving means to drive the turntable at the appropriate speed for the record carried by the turntable.

31. In a record player as set forth in claim 30, said means for setting said shaft-driving means comprising a member movable away from retracted position toward the edge of a record carried by the turntable, and speed-shifting means actuable by said member in accordance with the amount of its movement as determined by the diameter of the record.

32. In a record player as set forth in claim 31, said member also acting to move the tone arm from a retracted position into position to start the play of a record.

33. In a record player, a turntable having a tubular extensible and retractible record centering and gripping means formed of a resilient material, a rod extending through said record centering and gripping means, and vacuum-operated means associated with the turntable for extending and retracting the rod, extension of the rod extending the gripping means for entering the center hole of a record and retraction of the rod bulging out a portion of the gripping means for engaging the opposite face of the record from the turntable radially outwardly of the periphery of its center hole, thereby holding the record on the turntable.

34. In a record player, a turntable having vacuum-grip means for gripping a record and an extensible and retractible record centering and gripping means, vacuum-operated means for extending and retracting said record centering and gripping means, said record centering and gripping means when extended being adapted to enter the center hole of a record and when retracted being adapted to grip the record to the turntable, and means responsive to extension of the record centering and gripping means for transmitting vacuum to said vacuum-grip means.

35. In a record player, a turntable having a center grip comprising a tubular rubber member, and a rod extending through said member and secured at its outer end to the outer end of said member, said rod being movable outward to extend said member for entry thereof in the center hole of a record, and movable inward to cause said member to bulge out and grip the opposite face of the record from the turntable radially outwardly of the periphery of its center hole, thereby holding a record on the turntable.

36. In a record player, a turntable having a tubular spindle and a center grip comprising a tubular rubber member, a piston slidable in said tubular spindle, and a rod operable by said piston extending through said member and secured at its outer end to the outer end of said member, said rod on outward movement acting to extend said member for entry thereof in the center hole of a record and on inward movement acting to cause said member to bulge out and grip the opposite face of the record from the turntable radially outwardly of the periphery of its center hole, thereby holding the record on the turntable.

37. In a record player, a turntable having a tubular spindle, a center grip comprising a tubular rubber member, a suction pad for gripping a record with vacuum, a partition dividing the tubular spindle into an inner chamber and an outer chamber, said pad being in communication with the outer chamber, a piston slidable in the inner chamber, a rod extending from the piston through said partition, said outer chamber and said rubber member and secured at its outer end to the outer end of said rubber member, spring means biasing said rod inward, means for transmitting vacuum to said inner chamber between the piston and partition to cause outward movement of the piston and rod, said rod on outward movement acting to extend said rubber member for entry thereof in the center hole of a record and on inward movement acting to cause said rubber member to bulge out and grip a record to the turntable, and a normally closed valve in said partition operable by said piston on outward movement thereof to transmit vacuum from said inner chamber to said outer chamber and pad.

38. In an automatic record player having vacuum-operated means adapted for operation in a sequence of steps comprising picking up a record from a supply stack, playing a first side of the record, turning the record over, playing the second side, and discarding the record, said vacuum-operated means being connected in a vacuum system including a set of valves for controlling the operation of said means: cam mechanism for actuating the valves including a set of cams each shiftable between first and second positions, certain cams when in one position being adapted to block certain valves against actuation and when in the other position being adapted to permit actuation thereof, and certain cams being adapted to effect actuation of certain valves on being shifted in one direction and to effect deactuation thereof on being shifted in the opposite direction, each cam comprising a bar mounted for endwise sliding movement, said cams being located side-by-side, and said cam mechanism including actuators for the valves extending through slots in the cams, certain slots in certain cams being adapted when these cams are in one position to block certain actuators against actuation to permit actuation thereof when in the other position, certain slots in certain cams being cam slots for camming certain actuators, and other slots in the cams being passage slots for the actuators.

39. In an automatic record player as set forth in claim 38, means for actuating certain cams in response to completion of certain of said steps in said sequence, said cam-actuating means including vacuum-operated means connected into said vacuum system for shifting certain cams, and valve means operable in response to completion of certain of said steps in said sequence for controlling said vacuum-operated cam-shifting means.

40. In an automatic record player, a turntable, a tone arm mounted for swinging movement on a vertical axis, means for swinging said tone arm inward away from a retracted position into position to start the playing of a record on the turntable, said means being engageable with the edge of a record on the turntable to determine the inward swing of the tone arm, an end-of-play switch mounted for movement between a first position and a second position corresponding to first and second sizes of records, means responsive to movement of said tone arm swinging means into engagement with the edge of a record of the second size for moving said switch to its second position, and means swingable with the tone arm for actuating the switch at the end of play of a record.

41. An automatic double side record player as set forth in claim 12 wherein said means for swinging the carrier, said means for turning the turntable and said tone arm moving means are vacuum-operated and are connected in a vacuum system, said programming means comprising a set of valves for controlling the operation of said vacuum-operated means, and cam mechanism for actuating the valves including a set of cams each shiftable between first and second positions, certain cams when in one position being adapted to block certain valves against actuation and when in the other position being adapted to permit actuation thereof, and certain cams being adapted to effect actuation of certain valves on being shifted in one direction and to effect deactuation thereof on being shifted in the opposite direction.

42. An automatic double side record player as set forth in claim 41, each cam comprising a bar mounted for endwise sliding movement, said cams being located side-by-side, and said cam mechanism including actuators for the valves extending through slots in the cams, certain slots in certain cams being adapted when these cams are in one position to block certain actuators against actuation to permit actuation thereof when in the other position, certain slots in certain cams being cam slots for camming certain actuators, and other slots in the cams being passage slots for the actuators.

43. An automatic double side record player as set forth in claim 41 including means for actuating certain cams in response to completion of certain of said steps in said sequence.

44. An automatic double side record player as set forth in claim 43 including means for manually controlling certain cams to vary the sequence to play the first side of a record only, or to repeat the first and second sides, or to repeat the first side only, or to repeat the second side only.

45. An automatic double side record player as set forth in claim 43 wherein said cam-actuating means includes means operable in response to swinging of the carrier and turning of the turntable for actuating certain cams.

46. An automatic double side record player as set forth in claim 45 wherein said cam-actuating means further includes vacuum-operated means connected into said vacuum system for shifting certain cams, and valve means operable in response to completion of certain of said steps in said sequence for controlling said vacuum-operated cam-shifting means.

47. An automatic record player comprising a base, a turntable carrier pivoted on the base for swinging movement about a horizontal axis, a turntable carried by the carrier, said turntable having means for gripping a record, said carrier being swingable above the base from one side of the base to the other and adapted to carry the turntable to a record pick-up position on one side for picking up and gripping a record from a supply stack on said one side of the base and to a record drop position on the other side for accumulation of played records in a played record stack, record centering pins extending up from the base adapted to extend through the center holes of records in the supply stack, and the played record stack, each pin being vertically slidable and engageable by the turntable to push it down, and controls for the record player operable by said pins when pushed downward by the turntable.

48. An automatic record player as set forth in claim 47, said record player being vacuum-operated, and each of said controls being a vacuum valve.

49. In a record player, a turntable having a center grip comprising an extensible and retractable resilient member, and means engaging the outer end of said member for extending and retracting it, said means being movable in an outward direction to extend the resilient member for entry thereof in the center hole of a record, and movable in an inward direction to cause the resilient member to bulge out from the record center hole and grip the opposite face of the record from the turntable radially outwardly of the periphery of its center hole, thereby holding the record on the turntable.

50. In a record player, an invertible turntable having means for gripping a record, means for moving said turntable to a record pick-up position for gripping and picking up a record from a stack of records and to a playing position for playing the record, a tone arm for playing one side of a record with the turntable inverted and playing the other side of a record with the turntable upright, a drive for the turntable including a first driver engageable with the turntable when inverted and in playing position and a second driver engageable with the turntable when upright and in playing position, means for moving said first and second drivers from a retracted position out of engagement with the turntable into engagement with the turntable and back to retracted position, means for moving the tone arm from a retracted position into position to start the play of a record while said first and second drivers are retracted and said turntable is accordingly stopped, and means responsive to completion of movement of the tone arm into position to start the play of a record to initiate operation of said moving means for said first and second drivers to effect movement thereof into position in engagement with the turntable to initiate rotation of the turntable.

References Cited by the Examiner

UNITED STATES PATENTS

| | | | |
|---|---|---|---|
| 2,068,499 | 1/1937 | Downs | 274—10 |
| 2,159,836 | 5/1939 | Alm | 274—10 |
| 2,309,352 | 1/1943 | Offen | 274—5 |
| 2,578,792 | 12/1951 | Faulkner | 274—10 |
| 2,601,301 | 6/1952 | Klien | 274—10 |
| 2,735,683 | 2/1956 | Klien | 274—10 |
| 3,072,411 | 1/1963 | Hultquist | 274—10 |

OTHER REFERENCES

German printed application, Serial No. 1,038,785, September 11, 1958.

NORTON ANSHER, *Primary Examiner.*

H. S. WILLIAMS, *Examiner.*

C. W. ROBINSON, C. B. PRICE, *Assistant Examiners.*